United States Patent
Behzadi et al.

(10) Patent No.: US 12,095,294 B2
(45) Date of Patent: *Sep. 17, 2024

(54) MULTI-DEVICE CHARGING USER INTERFACE

(71) Applicant: Apple Inc., Cupertino, CA (US)

(72) Inventors: Arian Behzadi, San Francisco, CA (US); Joseph Y. Chan, San Francisco, CA (US); Lynne Devine, San Francisco, CA (US); Christopher Patrick Foss, San Francisco, CA (US); Pedro Mari, Santa Cruz, CA (US); Per Haakan Linus Persson, Cupertino, CA (US); Hugo Verweij, San Francisco, CA (US); Corey Keiko Wang, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/197,987

(22) Filed: Mar. 10, 2021

(65) Prior Publication Data

US 2021/0294470 A1 Sep. 23, 2021

Related U.S. Application Data

(63) Continuation of application No. 15/831,173, filed on Dec. 4, 2017, now Pat. No. 10,951,043.

(Continued)

(51) Int. Cl.
*G06F 3/04817* (2022.01)
*G06F 1/26* (2006.01)
(Continued)

(52) U.S. Cl.
CPC ............ *H02J 7/0042* (2013.01); *G06F 1/263* (2013.01); *G06F 1/28* (2013.01); *G06F 3/016* (2013.01);
(Continued)

(58) Field of Classification Search
CPC ...... H02J 7/0042; H02J 7/0049; H02J 7/0048; H02J 7/02; H02J 50/80; H02J 50/00;
(Continued)

(56) References Cited

U.S. PATENT DOCUMENTS 6,414,466 B1 7/2002 Ida
6,809,724 B1 10/2004 Shiraishi et al.
(Continued)

FOREIGN PATENT DOCUMENTS

| AU | 2016219716 A1 | 9/2016 |
|---|---|---|
| CN | 1629776 A | 6/2005 |

(Continued)

OTHER PUBLICATIONS

Advisory Action received for U.S. Appl. No. 15/831,173, mailed on Jan. 9, 2020, 4 pages.

(Continued)

*Primary Examiner* — Stephen S Hong
*Assistant Examiner* — Carl E Barnes, Jr.
(74) *Attorney, Agent, or Firm* — DLA Piper LLP (US)

(57) ABSTRACT

The present disclosure generally relates to user interfaces for charging electronic devices. At a first device with a display, detect that at least one of the first device or a second device has entered a wireless charging state. In response to detecting that at least one of the first device or the second device has entered a wireless charging state, and in accordance with a determination that the first device and the second device are being wirelessly charged by the same wireless charging device, display, on the display, an indication of charge status for the second device.

24 Claims, 47 Drawing Sheets

Related U.S. Application Data

(60) Provisional application No. 62/556,387, filed on Sep. 9, 2017, provisional application No. 62/514,924, filed on Jun. 4, 2017.

(51) Int. Cl.

| | | |
|---|---|---|
| *G06F 1/28* | (2006.01) | |
| *G06F 3/01* | (2006.01) | |
| *G06F 3/0481* | (2022.01) | |
| *G06F 3/0482* | (2013.01) | |
| *G06F 3/04842* | (2022.01) | |
| *H02J 7/00* | (2006.01) | |
| *H02J 50/00* | (2016.01) | |
| *H02J 50/10* | (2016.01) | |
| *H02J 50/40* | (2016.01) | |
| *H02J 50/80* | (2016.01) | |
| *G06F 3/0488* | (2022.01) | |
| *G06T 13/80* | (2011.01) | |
| *H02J 7/02* | (2016.01) | |

(52) U.S. Cl.
CPC ........ *G06F 3/0481* (2013.01); *G06F 3/04817* (2013.01); *G06F 3/0482* (2013.01); *G06F 3/04842* (2013.01); *H02J 7/0049* (2020.01); *H02J 50/00* (2016.02); *H02J 50/40* (2016.02); *H02J 50/80* (2016.02); *G06F 3/0488* (2013.01); *G06T 13/80* (2013.01); *G06T 2200/24* (2013.01); *H02J 7/0048* (2020.01); *H02J 7/02* (2013.01); *H02J 50/10* (2016.02); *H02J 2310/22* (2020.01)

(58) Field of Classification Search
CPC ........ H02J 50/40; H02J 50/10; H02J 2310/22; G06F 1/263; G06F 1/28; G06F 3/016; G06F 3/0481; G06F 3/04817; G06F 3/0482; G06F 3/04842; G06F 3/0488; G06T 13/80; G06T 2200/24

See application file for complete search history.

(56) References Cited

U.S. PATENT DOCUMENTS

| | | | |
|---|---|---|---|
| 7,574,661 B2 | 8/2009 | Matsuura et al. | |
| 8,768,419 B2 | 7/2014 | Sivaraman et al. | |
| 8,774,868 B2 | 7/2014 | Niu et al. | |
| 9,075,612 B2 | 7/2015 | Yang et al. | |
| 9,268,387 B2 | 2/2016 | Yu | |
| 9,477,283 B2 | 10/2016 | Gerber et al. | |
| 9,606,706 B2 | 3/2017 | Vyas et al. | |
| 9,954,991 B2 | 4/2018 | Wang et al. | |
| 10,027,153 B2 | 7/2018 | Toya et al. | |
| 10,416,745 B2 | 9/2019 | Vyas et al. | |
| 2004/0070511 A1 | 4/2004 | Kim | |
| 2004/0236975 A1 | 11/2004 | Gaskins et al. | |
| 2005/0066209 A1 | 3/2005 | Kee et al. | |
| 2008/0079589 A1 | 4/2008 | Blackadar | |
| 2008/0258679 A1 | 10/2008 | Manico et al. | |
| 2009/0098914 A1 | 4/2009 | Martin-Cocher et al. | |
| 2009/0146608 A1 | 6/2009 | Lee | |
| 2009/0156268 A1 | 6/2009 | Kim et al. | |
| 2009/0164152 A1 | 6/2009 | Creus et al. | |
| 2009/0168088 A1 | 7/2009 | Rosenblatt | |
| 2009/0287433 A1 | 11/2009 | Houston et al. | |
| 2009/0307511 A1 | 12/2009 | Fiennes et al. | |
| 2010/0188041 A1 | 7/2010 | Mizuo | |
| 2010/0201533 A1 | 8/2010 | Kirby et al. | |
| 2010/0317408 A1 | 12/2010 | Ferren et al. | |
| 2011/0001457 A1 | 1/2011 | Mueller | |
| 2011/0059769 A1 | 3/2011 | Brunolli | |
| 2011/0071780 A1 | 3/2011 | Tarkoma | |
| 2011/0301890 A1 | 12/2011 | Shirriff et al. | |
| 2011/0316769 A1 | 12/2011 | Boettcher et al. | |
| 2012/0001592 A1 | 1/2012 | Fukaya | |
| 2012/0015695 A1 | 1/2012 | Hackborn et al. | |
| 2012/0043821 A1 | 2/2012 | Lee et al. | |
| 2012/0047380 A1 | 2/2012 | Nurmi | |
| 2012/0071149 A1 | 3/2012 | Bandyopadhyay et al. | |
| 2012/0112539 A1 | 5/2012 | Yamamoto | |
| 2012/0154303 A1 | 6/2012 | Lazaridis et al. | |
| 2012/0239949 A1 | 9/2012 | Kalyanasundaram et al. | |
| 2012/0272230 A1 | 10/2012 | Lee | |
| 2012/0317432 A1 | 12/2012 | Assad et al. | |
| 2013/0088411 A1 | 4/2013 | Reeves et al. | |
| 2013/0111579 A1 | 5/2013 | Newman et al. | |
| 2013/0130745 A1 | 5/2013 | Niu et al. | |
| 2013/0138989 A1 | 5/2013 | Jang et al. | |
| 2013/0169219 A1 | 7/2013 | Gray | |
| 2013/0244633 A1 | 9/2013 | Jacobs et al. | |
| 2013/0332749 A1 | 12/2013 | Kida et al. | |
| 2013/0339772 A1 | 12/2013 | Yu | |
| 2013/0339884 A1* | 12/2013 | Wilson | G06F 3/0481 |
| | | | 715/764 |
| 2014/0015478 A1 | 1/2014 | Von Novak | |
| 2014/0068306 A1 | 3/2014 | Oh et al. | |
| 2014/0068314 A1 | 3/2014 | Kim et al. | |
| 2014/0089842 A1 | 3/2014 | Lin et al. | |
| 2014/0117921 A1 | 5/2014 | Suomela | |
| 2014/0239733 A1 | 8/2014 | Mach et al. | |
| 2014/0278166 A1 | 9/2014 | Takahashi | |
| 2014/0287724 A1 | 9/2014 | Takenouchi et al. | |
| 2014/0313867 A1 | 10/2014 | Lee et al. | |
| 2014/0330764 A1 | 11/2014 | Rhines et al. | |
| 2014/0364173 A1* | 12/2014 | Tuli | H04W 52/0267 |
| | | | 455/573 |
| 2015/0007049 A1 | 1/2015 | Langlois | |
| 2015/0062052 A1 | 3/2015 | Bernstein et al. | |
| 2015/0102992 A1 | 4/2015 | Klement et al. | |
| 2015/0133076 A1 | 5/2015 | Brough | |
| 2015/0156307 A1 | 6/2015 | Kim et al. | |
| 2015/0185849 A1 | 7/2015 | Ramsay et al. | |
| 2015/0263548 A1 | 9/2015 | Cooper et al. | |
| 2015/0277559 A1 | 10/2015 | Vescovi et al. | |
| 2015/0346933 A1 | 12/2015 | Vyas et al. | |
| 2016/0013678 A1* | 1/2016 | Bell | H02J 50/20 |
| | | | 320/108 |
| 2016/0041597 A1 | 2/2016 | Graham et al. | |
| 2016/0062540 A1 | 3/2016 | Yang et al. | |
| 2016/0064958 A1 | 3/2016 | Jung et al. | |
| 2016/0072317 A1 | 3/2016 | Guz et al. | |
| 2016/0190861 A1 | 6/2016 | Cha | |
| 2016/0191357 A1 | 6/2016 | Orner et al. | |
| 2016/0209906 A1 | 7/2016 | Chae et al. | |
| 2016/0259535 A1 | 9/2016 | Fleizach et al. | |
| 2016/0301791 A1 | 10/2016 | Kim et al. | |
| 2016/0380464 A1 | 12/2016 | Chin et al. | |
| 2017/0012446 A1 | 1/2017 | Lim et al. | |
| 2017/0047765 A1 | 2/2017 | Jung et al. | |
| 2017/0093079 A1 | 3/2017 | Wagman et al. | |
| 2017/0115713 A1 | 4/2017 | Shin et al. | |
| 2017/0133881 A1* | 5/2017 | Cho | G06F 1/00 |
| 2017/0177054 A1 | 6/2017 | Vyas et al. | |
| 2017/0179749 A1 | 6/2017 | Mansour et al. | |
| 2018/0123379 A1 | 5/2018 | Ha et al. | |
| 2018/0145545 A1 | 5/2018 | Azami et al. | |
| 2018/0181185 A1 | 6/2018 | Graham et al. | |
| 2018/0217679 A1 | 8/2018 | Kwon et al. | |
| 2018/0351373 A1 | 12/2018 | Behzadi et al. | |
| 2019/0130087 A1 | 5/2019 | Mori et al. | |
| 2020/0004310 A1 | 1/2020 | Vyas et al. | |
| 2020/0169107 A1 | 5/2020 | Joshi et al. | |
| 2020/0358302 A1 | 11/2020 | Kramar et al. | |
| 2020/0371577 A1 | 11/2020 | Graham et al. | |
| 2021/0141437 A1 | 5/2021 | Graham et al. | |
| 2021/0167621 A1 | 6/2021 | Yazami et al. | |
| 2022/0147135 A1 | 5/2022 | Graham et al. | |

(56) References Cited

U.S. PATENT DOCUMENTS

| | | | |
|---|---|---|---|
| 2023/0253809 A1 | 8/2023 | Kramar et al. | |
| 2024/0078002 A1 | 3/2024 | Chao et al. | |

FOREIGN PATENT DOCUMENTS

| | | | | |
|---|---|---|---|---|
| CN | 101329595 | A | 12/2008 | |
| CN | 101877745 | A | 11/2010 | |
| CN | 101902062 | A | 12/2010 | |
| CN | 101969511 | A | 2/2011 | |
| CN | 103199311 | A | 7/2013 | |
| CN | 103327159 | A | 9/2013 | |
| CN | 103677520 | A | 3/2014 | |
| CN | 103677559 | A | 3/2014 | |
| CN | 203520050 | U | 4/2014 | |
| CN | 103838992 | A | 6/2014 | |
| CN | 103902010 | A | 7/2014 | |
| CN | 204105251 | U | 1/2015 | |
| CN | 104428972 | A | 3/2015 | |
| CN | 106617580 | A | 5/2017 | |
| EP | 2051157 | A1 | 4/2009 | |
| EP | 2610701 | A1 | 7/2013 | |
| JP | 11-312029 | A | 11/1999 | |
| JP | 2000-209660 | A | 7/2000 | |
| JP | 2001-185236 | A | 7/2001 | |
| JP | 2004-320909 | A | 11/2004 | |
| JP | 2007-243726 | A | 9/2007 | |
| JP | 2007-267221 | A | 10/2007 | |
| JP | 2009-142149 | A | 6/2009 | |
| JP | 2010-103956 | A | 5/2010 | |
| JP | 2010-178498 | A | 8/2010 | |
| JP | 2012-16170 | A | 1/2012 | |
| JP | 2012-68494 | A | 4/2012 | |
| JP | 2012-100491 | A | 5/2012 | |
| JP | 2012-518981 | A | 8/2012 | |
| JP | 2013-17282 | A | 1/2013 | |
| JP | 2013017282 | A * | 1/2013 | ............ H01M 10/46 |
| JP | 2014-017989 | A | 1/2014 | |
| JP | 2014-49061 | A | 3/2014 | |
| JP | 2015-188275 | A | 10/2015 | |
| KR | 10-2011-0121638 | A | 11/2011 | |
| KR | 10-2011-0127243 | A | 11/2011 | |
| KR | 10-2015-0065498 | A | 6/2015 | |
| KR | 10-2015-0123437 | A | 11/2015 | |
| KR | 10-2017-0054944 | A | 5/2017 | |
| KR | 10-2018-0041718 | A | 4/2018 | |
| TW | 200532429 | A | 10/2005 | |
| TW | 201214268 | A | 4/2012 | |
| WO | 2004/077291 | A1 | 9/2004 | |
| WO | 2010/099242 | A2 | 9/2010 | |
| WO | 2013/126078 | A1 | 8/2013 | |
| WO | 2015/183336 | A1 | 12/2015 | |
| WO | 2019/031811 | A1 | 2/2019 | |

OTHER PUBLICATIONS

Applicant Initiated Interview Summary received for U.S. Appl. No. 15/831,173, mailed on Dec. 30, 2019, 4 pages.
Applicant Initiated Interview Summary received for U.S. Appl. No. 15/902,401, mailed on Oct. 28, 2019, 4 pages.
Applicant-Initiated Interview Summary received for U.S. Appl. No. 15/831,173, mailed on Jul. 10, 2020, 4 pages.
Athukorala et al., "How Carat Affects User Behavior: Implications for Mobile Battery Awareness Applications", Proceedings of the SIGCHI Conference on Human Factors in Computing Systems, CHI 2014, Apr. 26-May 1, 2014, pp. 1029-1038.
Certificate of Examination received for Australian Patent Application No. 2017100760 mailed on Feb. 9, 2018, 2 pages.
Decision to Grant received for European Patent Application No. 14790403.1, mailed on Oct. 18, 2018, 2 pages.
Decision to Grant received for European Patent Application No. 18197727.3, mailed on Mar. 12, 2020, 2 pages.
Extended European Search Report received for European Patent Application No. 18197727.3, mailed on Dec. 4, 2018, 9 pages.
Extended European Search Report received for European Patent Application No. 20162687.6, mailed on Jun. 17, 2020, 7 pages.
Final Office Action received for U.S. Appl. No. 14/503,078, mailed on Nov. 15, 2016, 12 pages.
Final Office Action received for U.S. Appl. No. 14/817,572, mailed on Mar. 23, 2017, 14 pages.
Final Office Action received for U.S. Appl. No. 15/831,173, mailed on Oct. 4, 2019, 90 pages.
Howcast, "How to Eject an iPod from a Computer", Online available at: https://www.youtube.com/watch?v=DUmBOycraQk, Feb. 9, 2010, 1 page.
Intention to Grant received for European Patent Application No. 14790403.1, mailed on Jun. 1, 2018, 5 pages.
Intention to Grant received for European Patent Application No. 18197727.3, mailed on Nov. 7, 2019, 7 pages.
International Preliminary Report on Patentability received for PCT Patent Application No. PCT/US2014/058466, mailed on Dec. 15, 2016, 11 pages.
International Preliminary Report on Patentability received for PCT Patent Application No. PCT/US2015/043487, mailed on Feb. 16, 2017, 13 Pages.
International Preliminary Report on Patentability received for PCT Patent Application No. PCT/US2018/013730, mailed on Oct. 1, 2019, 14 pages.
International Search Report and Written Opinion received for PCT Patent Application No. PCT/US2014/058466, mailed on Jun. 24, 2015, 16 pages.
International Search Report and Written Opinion received for PCT Patent Application No. PCT/US2015/043487, mailed on Jan. 29, 2016, 19 pages.
International Search Report and Written Opinion received for PCT Patent Application No. PCT/US2018/013730, mailed on Jul. 9, 2018, 20 pages.
Invitation to Pay Addition Fees and Partial International Search Report received for PCT Patent Application No. PCT/US2018/013730, mailed on May 15, 2018, 14 pages.
Invitation to Pay Additional Fees and Partial Search Report received for PCT Patent Application No. PCT/US2014/058466, mailed on Mar. 3, 2015, 6 pages.
Invitation to Pay Additional Fees and Partial Search Report received for PCT Patent Application No. PCT/US2015/043487, mailed on Nov. 9, 2015, 4 pages.
Non-Final Office Action received for U.S. Appl. No. 14/817,572, mailed on Sep. 12, 2016, 9 pages.
Non-Final Office Action received for U.S. Appl. No. 14/503,078, mailed on Mar. 29, 2016, 11 pages.
Non-Final Office Action received for U.S. Appl. No. 15/452,536, mailed on Dec. 20, 2018, 10 pages.
Non-Final Office Action received for U.S. Appl. No. 15/831,173, mailed on Jan. 28, 2019, 44 pages.
Non-Final Office Action received for U.S. Appl. No. 15/831,173, mailed on Mar. 23, 2020, 93 pages.
Non-Final Office Action received for U.S. Appl. No. 15/902,401, mailed on Jul. 19, 2019, 11 pages.
Notice of Acceptance received for Australian Patent Application No. 2018279782, mailed on Oct. 31, 2020, 3 pages.
Notice of Allowance received for Japanese Patent Application No. 2018-551208, mailed on Jul. 31, 2020, 4 pages.
Notice of Allowance received for Taiwanese Patent Application No. 103135094, mailed on Oct. 28, 2016, 2 pages.
Notice of Allowance received for Taiwanese Patent Application No. 104107332, mailed on Jun. 21, 2019, 5 pages.
Notice of Allowance received for U.S. Appl. No. 14/503,078, mailed on Feb. 1, 2017, 8 pages.
Notice of Allowance received for U.S. Appl. No. 14/817,572, mailed on Nov. 30, 2017, 26 pages.
Notice of Allowance received for U.S. Appl. No. 15/452,536, mailed on May 7, 2019, 8 pages.
Notice of Allowance received for U.S. Appl. No. 15/831,173, mailed on Dec. 23, 2020, 6 pages.
Notice of Allowance received for U.S. Appl. No. 15/831,173, mailed on Nov. 4, 2020, 10 pages.

(56) References Cited

OTHER PUBLICATIONS

Notice of Allowance received for U.S. Appl. No. 15/902,401, mailed on Dec. 4, 2019, 8 pages.
Office Action received for Australian Patent Application No. 2017100760, mailed on Aug. 10, 2017, 4 pages.
Office Action received for Australian Patent Application No. 2017100760, mailed on Jan. 30, 2018, 3 pages.
Office Action received for Australian Patent Application No. 2018279782, mailed on Jun. 24, 2020, 5 pages.
Office Action received for Chinese Patent Application No. 201580047640.0, mailed on Aug. 5, 2019, 18 pages.
Office Action received for Danish Patent Application No. PA201770089, mailed on Apr. 25, 2017, 10 pages.
Office Action received for Danish Patent Application No. PA201870024, mailed on Dec. 21, 2018, 5 pages.
Office Action received for Danish Patent Application No. PA201870024, mailed on Oct. 2, 2019, 2 pages.
Office Action received for German Patent Application No. 212015000194.6, mailed on Mar. 16, 2017, 2 pages.
Office Action received for Taiwanese Patent Application No. 103135094, mailed on Feb. 25, 2016, 20 pages.
Office Action received for Taiwanese Patent Application No. 104107332, mailed on Oct. 29, 2018, 12 pages.
Oliner et al., "Carat: Collaborative Energy Diagnosis for Mobile Devices", SenSys' 13, Available at <https://amplab.cs.berkeley.edu/wp-content/uploads/2013/10/oliner-Carat-SenSys13.pdf>, Nov. 11, 2013, 16 pages.
Search Report received for Danish Patent Application No. PA201870024, mailed on Apr. 11, 2018, 10 pages.
Supplemental Notice of Allowance received for U.S. Appl. No. 15/902,401, mailed on Feb. 3, 2020, 2 pages.
Supplemental Notice of Allowance received for U.S. Appl. No. 15/902,401, mailed on Feb. 13, 2020, 2 pages.
Written Opinion received for PCT Patent Application No. PCT/US2018/013730, mailed on May 9, 2019, 13 pages.
Non-Final Office Action received for U.S. Appl. No. 16/570,113, mailed on Apr. 20, 2021, 28 pages.
Office Action received for Chinese Patent Application No. 201580047640.0, mailed on Mar. 3, 2021, 11 pages (3 pages of English Translation and 8 pages of Official Copy).
Office Action received for Japanese Patent Application No. 2020-141884, mailed on Sep. 27, 2021, 10 pages (5 pages of English Translation and 5 pages of Official Copy).
Corrected Notice of Allowance received for U.S. Appl. No. 17/157,391, mailed on Dec. 30, 2021, 2 pages.
Office Action received for Australian Patent Application No. 2021200894, mailed on Dec. 20, 2021, 6 pages.
Non-Final Office Action received for U.S. Appl. No. 17/157,391, mailed on Aug. 23, 2021, 12 pages.
Office Action received for Chinese Patent Application No. 201580047640.0, mailed on Jul. 6, 2021, 10 pages (5 pages of English Translation and 5 pages of Official Copy).
Office Action received for Korean Patent Application No. 10-2021-7012459, mailed on Aug. 18, 2021, 5 pages (2 pages of English Translation and 3 pages of Official Copy).
Office Action received for Australian Patent Application No. 2021200894, mailed on Jul. 13, 2022, 4 pages.
Decision to Grant received for European Patent Application No. 20162687.6, mailed on Sep. 23, 2021, 2 pages.
Final Office Action received for U.S. Appl. No. 16/570,113, mailed on Oct. 5, 2021, 18 pages.
Notice of Allowance received for Chinese Patent Application No. 201580047640.0, mailed on Sep. 18, 2021, 2 pages (1 page of English Translation and 1 page of Official Copy).
Office Action received for European Patent Application No. 18702867.5, mailed on Sep. 13, 2021, 4 pages.
Corrected Notice of Allowance received for U.S. Appl. No. 16/841,352, mailed on Dec. 2, 2020, 2 pages.
International Search Report and Written Opinion received for PCT Patent Application No. PCT/US2020/024292, mailed on Jun. 12, 2020, 11 pages.
Notice of Allowance received for Korean Patent Application No. 10-2019-7035420, mailed on Jan. 22, 2021, 4 pages (1 page of English Translation and 3 pages of Official Copy).
Notice of Allowance received for U.S. Appl. No. 16/841,352, mailed on Oct. 27, 2020, 13 pages.
Office Action received for Chinese Patent Application No. 201580047640.0, mailed on Oct. 16, 2020, 20 pages (6 pages of English Translation and 14 pages of Official Copy).
Applicant Initiated Interview Summary received for U.S. Appl. No. 17/157,391, mailed on Nov. 23, 2021, 2 pages.
International Preliminary Report on Patentability received for PCT Patent Application No. PCT/US2020/024292, mailed on Nov. 18, 2021, 8 pages.
Notice of Allowance received for U.S. Appl. No. 16/570,113, mailed on Dec. 14, 2021, 7 pages.
Notice of Allowance received for U.S. Appl. No. 17/157,391, mailed on Dec. 17, 2021, 8 pages.
Applicant-Initiated Interview Summary received for U.S. Appl. No. 16/570,113, mailed on Oct. 14, 2021, 2 pages.
Board Decision received for Chinese Patent Application No. 201580047640.0, mailed on Jun. 29, 2021, 2 pages (1 page of English Translation and 1 page of Official Copy).
Intention to Grant received for European Patent Application No. 20162687.6, mailed on May 6, 2021, 8 pages.
Non-Final Office Action received for U.S. Appl. No. 16/688,529, mailed on Feb. 28, 2022, 11 pages.
Applicant-Initiated Interview Summary received for U.S. Appl. No. 16/688,529, mailed on May 16, 2022, 2 pages.
Office Action received for Japanese Patent Application No. 2020-141884, mailed on May 20, 2022, 10 pages (5 pages of English Translation and 5 pages of Official Copy).
Notice of Allowance received for Korean Patent Application No. 10-2021-7012459, mailed on Jan. 17, 2022, 5 pages (1 page of English Translation and 4 pages of Official Copy).
Notice of Allowance received for U.S. Appl. No. 16/688,529, mailed on Jan. 6, 2023, 9 pages.
Office Action received for Japanese Patent Application No. 2020-141884, mailed on Jan. 5, 2023, 8 pages (4 pages of English Translation & 4 pages of Official Copy).
Supplemental Notice of Allowance received for U.S. Appl. No. 16/688,529, mailed on Jan. 17, 2023, 2 pages.
Advisory Action received for U.S. Appl. No. 16/688,529, mailed on Nov. 9, 2022, 5 pages.
Notice of Acceptance received for Australian Patent Application No. 2021200894, mailed on Nov. 14, 2022, 3 pages.
Notice of Allowance received for U.S. Appl. No. 17/583,657, mailed on Nov. 16, 2022, 8 pages.
Applicant-Initiated Interview Summary received for U.S. Appl. No. 16/688,529, mailed on Nov. 1, 2022, 2 pages.
Office Action received for European Patent Application No. 20719061.2, mailed on Oct. 19, 2022, 4 pages.
Notice of Allowance received for Chinese Patent Application No. 201880001496.0, mailed on Apr. 25, 2023, 5 pages (1 page of English Translation and 4 pages of Official Copy).
Final Office Action received for U.S. Appl. No. 16/688,529, mailed on Sep. 7, 2022, 11 pages.
Non-Final Office Action received for U.S. Appl. No. 17/583,657, mailed on Sep. 13, 2022, 13 pages.
Intention to Grant received for European Patent Application No. 18702867.5, mailed on Jun. 21, 2023, 9 pages.
Examiner's Pre-Review Report received for Japanese Patent Application No. 2020-141884, mailed on Jul. 31, 2023, 6 pages (3 pages of English Translation and 3 pages of Official Copy).
Office Action received for Australian Patent Application No. 2021200894, mailed on Apr. 26, 2022, 3 pages.
Notice of Allowance received for Japanese Patent Application No. 2020-141884, mailed on Feb. 26, 2024, 26 pages (1 page of English Translation and 25 pages of Official Copy).
Office Action received for Australian Patent Application No. 2023201077, mailed on Feb. 16, 2024, 4 pages.

(56) References Cited

OTHER PUBLICATIONS

Office Action received for European Patent Application No. 18702867.5, mailed on Feb. 20, 2024, 4 pages.
Intention to Grant received for European Patent Application No. 18702867.5, mailed on Dec. 18, 2023, 9 pages.
Notice of Allowance received for Chinese Patent Application No. 202111429825.1, mailed on Feb. 9, 2024, 2 pages (1 page of English Translation and 1 page of Official Copy).
Notice of Allowance received for Chinese Patent Application No. 202111432087.6, mailed on Feb. 9, 2024, 2 pages (1 page of English Translation and 1 page of Official Copy).
Notice of Allowance received for U.S. Appl. No. 18/135,045, mailed on Feb. 16, 2024, 10 pages.
Office Action received for Chinese Patent Application No. 201880001496.0, mailed on Feb. 18, 2023, 13 pages (5 pages of English Translation and 8 pages of Official Copy).
Office Action received for Chinese Patent Application No. 202111429825.1, mailed on Oct. 19, 2023, 11 pages (5 pages of English Translation and 6 pages of Official Copy).
Office Action received for Chinese Patent Application No. 202111430197.9, mailed on Mar. 6, 2024, 13 pages (3 pages of English Translation and 10 pages of Official Copy).
Office Action received for Chinese Patent Application No. 202111430197.9, mailed on Oct. 13, 2023, 20 pages (7 pages of English Translation and 13 pages of Official Copy).
Office Action received for Chinese Patent Application No. 202111432087.6, mailed on Oct. 12, 2023, 10 pages (4 pages of English Translation and 6 pages of Official Copy).
Xu-Guang et al., "Design and Development of the Electronic Circuit of Mechanical Current Meters", Journal of Ocean Technology, vol. 34, No. 1, Feb. 2015, pp. 21-26 (Official Copy Only). {See Communication Under Rule 37 CFR § 1.98(a) (3)}.
Extended European Search Report received for European Patent Application No. 24156496.2, mailed on Jun. 12, 2024, 10 pages.
Supplemental Notice of Allowance received for U.S. Appl. No. 18/135,045, mailed on May 22, 2024, 4 pages.
Office Action received for Australian Patent Application No. 2023201077, mailed on Jun. 4, 2024, 3 pages.
Office Action received for Japanese Patent Application No. 2023-075768, mailed on Jun. 3, 2024, 8 pages (4 pages of English Translation and 4 pages of Official Copy).

\* cited by examiner

MULTI-DEVICE CHARGING USER INTERFACE

CROSS REFERENCE TO RELATED APPLICATIONS

This application is a continuation of U.S. patent application Ser. No. 15/831,173, entitled "MULTI-DEVICE CHARGING USER INTERFACE," filed on Dec. 4, 2017, which claims priority to U.S. Patent Application No. 62/514,924, entitled "MULTI-DEVICE CHARGING USER INTERFACE," filed on Jun. 4, 2017, and U.S. Patent Application No. 62/556,387, entitled "MULTI-DEVICE CHARGING USER INTERFACE," filed on Sep. 9, 2017, the contents of which are hereby incorporated by reference in their entirety.

This application relates to U.S. Patent Application No. 62/514,875, entitled "SYNCHRONIZING COMPLEMENTARY NOTIFICATIONS ACROSS RELATED COMPUTING DEVICES CONNECTED TO A WIRELESS CHARGING APPARATUS," filed on Jun. 4, 2017, the content of which is hereby incorporated by reference in its entirety.

FIELD

The present disclosure relates generally to computer user interfaces, and more specifically to techniques for charging multiple electronic devices.

BACKGROUND

Many modern electronic devices operate off of a rechargeable battery. The charge level of the battery of a device decreases as the device is operated, and therefore the device needs to be recharged occasionally for continued use. Furthermore, some users have multiple electronic devices and/or devices that require charging via a cable. Accordingly, techniques for charging multiple electronic devices wirelessly are desired.

BRIEF SUMMARY

Some techniques for charging multiple electronic devices, however, are generally cumbersome and inefficient. For example, some existing techniques for determining the charge level of one or more devices (e.g., while the one or more devices are charging) use a complex and time-consuming user interface, which may include multiple key presses or keystrokes. Existing techniques require more time than necessary, wasting user time and device energy. This former consideration is particularly important for providing a user-friendly interface.

Accordingly, the present technique provides electronic devices with faster, more efficient methods and interfaces for charging multiple electronic devices. Such methods and interfaces optionally complement or replace other methods for charging multiple electronic devices. Such methods and interfaces reduce the cognitive burden on a user and produce a more efficient human-machine interface. Such methods and interfaces improve the user experience, conserve power, and increase the time between battery charges.

In some embodiments, a computer-implemented method performed at a first device with a display includes: detecting that at least one of the first device or a second device has entered a wireless charging state; and in response to detecting that at least one of the first device or the second device has entered a wireless charging state, and in accordance with a determination that the first device and the second device are being wirelessly charged by the same wireless charging device, displaying, on the display, an indication of charge status for the second device.

In some embodiments, a non-transitory computer-readable storage medium stores one or more programs configured to be executed by one or more processors of an electronic device with a display, where the electronic device is a first device and the one or more programs include instructions for: detecting that at least one of the first device or a second device has entered a wireless charging state; and in response to detecting that at least one of the first device or the second device has entered a wireless charging state, and in accordance with a determination that the first device and the second device are being wirelessly charged by the same wireless charging device, displaying, on the display, an indication of charge status for the second device.

In some embodiments, a transitory computer-readable storage medium stores one or more programs configured to be executed by one or more processors of an electronic device with a display, where the electronic device is a first device and the one or more programs include instructions for: detecting that at least one of the first device or a second device has entered a wireless charging state; and in response to detecting that at least one of the first device or the second device has entered a wireless charging state, and in accordance with a determination that the first device and the second device are being wirelessly charged by the same wireless charging device, displaying, on the display, an indication of charge status for the second device.

In some embodiments, an electronic device, includes a display, one or more processors, and memory storing one or more programs configured to be executed by the one or more processors, the one or more programs including instructions for: detecting that at least one of the electronic device or a second device has entered a wireless charging state; and in response to detecting that at least one of the electronic device or the second device has entered a wireless charging state, and in accordance with a determination that the electronic device and the second device are being wirelessly charged by the same wireless charging device, displaying, on the display, an indication of charge status for the second device.

In some embodiments, an electronic device includes: a display; means for detecting that at least one of the electronic device or a second device has entered a wireless charging state; and means for, responsive to detecting that at least one of the electronic device or the second device has entered a wireless charging state, and in accordance with a determination that the electronic device and the second device are being wirelessly charged by the same wireless charging device, displaying, on the display, an indication of charge status for the second device.

In some embodiments, a computer-implemented method performed at a device includes: while the device is wirelessly charging and at a first charge level, receiving a first user input representing a request for a charge level; in response to receiving the first user input, outputting a first non-visual indication of the first charge level of the device; while the device is wirelessly charging at a second charge level different than the first charge level, receiving a second user input representing a request for a charge level; and in response to receiving the second user input, outputting a second non-visual indication of the second charge level of the device, where the second non-visual indication is different than the first non-visual indication.

In some embodiments, a non-transitory computer-readable storage medium stores one or more programs configured to be executed by one or more processors of an electronic device, the one or more programs including instructions for: while the device is wirelessly charging and at a first charge level, receiving a first user input representing a request for a charge level; in response to receiving the first user input, outputting a first non-visual indication of the first charge level of the device; while the device is wirelessly charging at a second charge level different than the first charge level, receiving a second user input representing a request for a charge level; and in response to receiving the second user input, outputting a second non-visual indication of the second charge level of the device, where the second non-visual indication is different than the first non-visual indication.

A transitory computer-readable storage medium stores one or more programs configured to be executed by one or more processors of an electronic device, the one or more programs including instructions for: while the device is wirelessly charging and at a first charge level, receiving a first user input representing a request for a charge level; in response to receiving the first user input, outputting a first non-visual indication of the first charge level of the device; while the device is wirelessly charging at a second charge level different than the first charge level, receiving a second user input representing a request for a charge level; and in response to receiving the second user input, outputting a second non-visual indication of the second charge level of the device, where the second non-visual indication is different than the first non-visual indication.

In some embodiments, an electronic device includes: one or more processors; and memory storing one or more programs configured to be executed by the one or more processors, the one or more programs including instructions for: while the device is wirelessly charging and at a first charge level, receiving a first user input representing a request for a charge level; in response to receiving the first user input, outputting a first non-visual indication of the first charge level of the device; while the device is wirelessly charging at a second charge level different than the first charge level, receiving a second user input representing a request for a charge level; and in response to receiving the second user input, outputting a second non-visual indication of the second charge level of the device, where the second non-visual indication is different than the first non-visual indication.

In some embodiments, an electronic device includes: means for, while the device is wirelessly charging and at a first charge level, receiving a first user input representing a request for a charge level; means for, responsive to receiving the first user input, outputting a first non-visual indication of the first charge level of the device; means for, while the device is wirelessly charging at a second charge level different than the first charge level, receiving a second user input representing a request for a charge level; and means for, responsive to receiving the second user input, outputting a second non-visual indication of the second charge level of the device, where the second non-visual indication is different than the first non-visual indication.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for charging electronic devices, thereby increasing the effectiveness, efficiency, and user satisfaction with such devices. Such methods and interfaces may complement or replace other methods for charging electronic devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
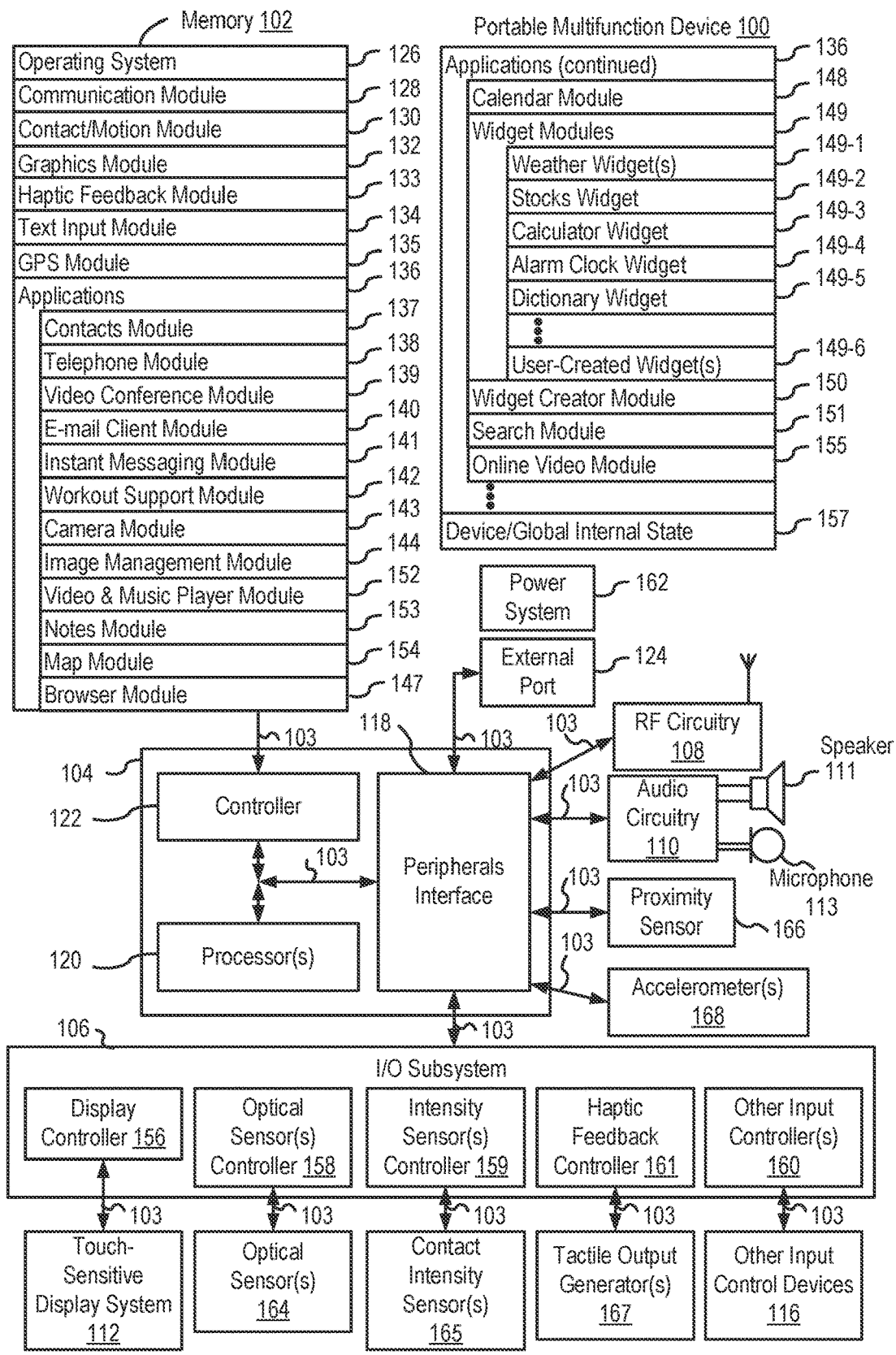
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for charging multiple devices. In one example, when multiple devices are being charged by the same charging device, the charge levels of all of the devices being charged are displayed at the same time on one device. In another example, a device provides a non-visual indication of the charge level of the device itself and/or the charge level of another device (e.g., another device that is simultaneously being charged). Such techniques can reduce the cognitive burden on a user who charges multiple devices, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for charging electronic devices. FIGS. 6A-6AG illustrate exemplary user interfaces for charging electronic devices. FIGS. 7A-7E are a flow diagram illustrating methods of charging electronic devices in accordance with some embodiments. The user interfaces in FIGS. 6A-6AG are used to illustrate the processes described below, including the processes in FIGS. 7A-7E. FIGS. 8A-8E also illustrate exemplary user interfaces for charging electronic devices. FIGS. 9A-9B are a flow diagram illustrating methods of charging electronic devices in accordance with some embodiments. The user interfaces in FIGS. 8A-8E are used to illustrate the processes described below, including the processes in FIGS. 9A-9B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
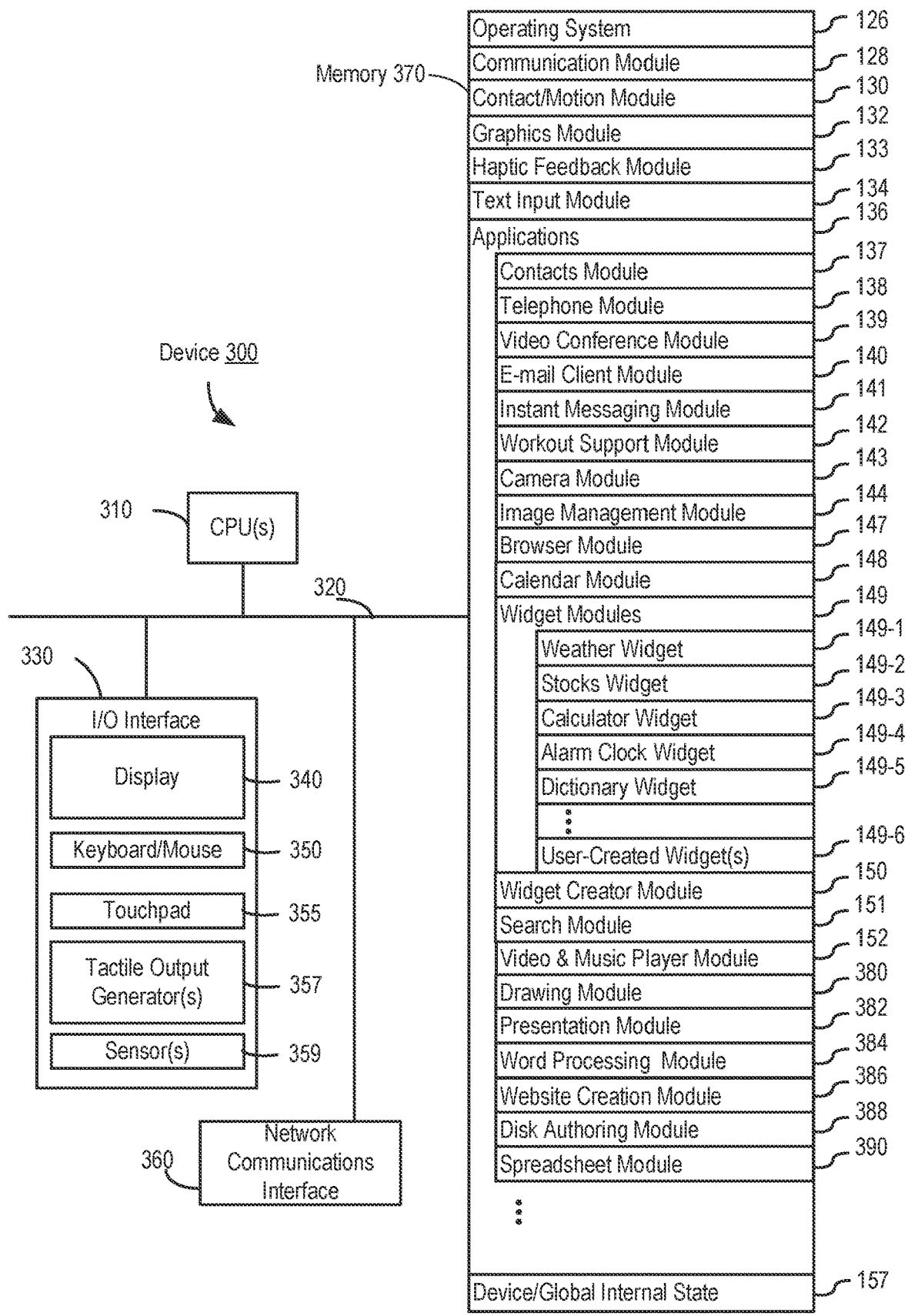
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
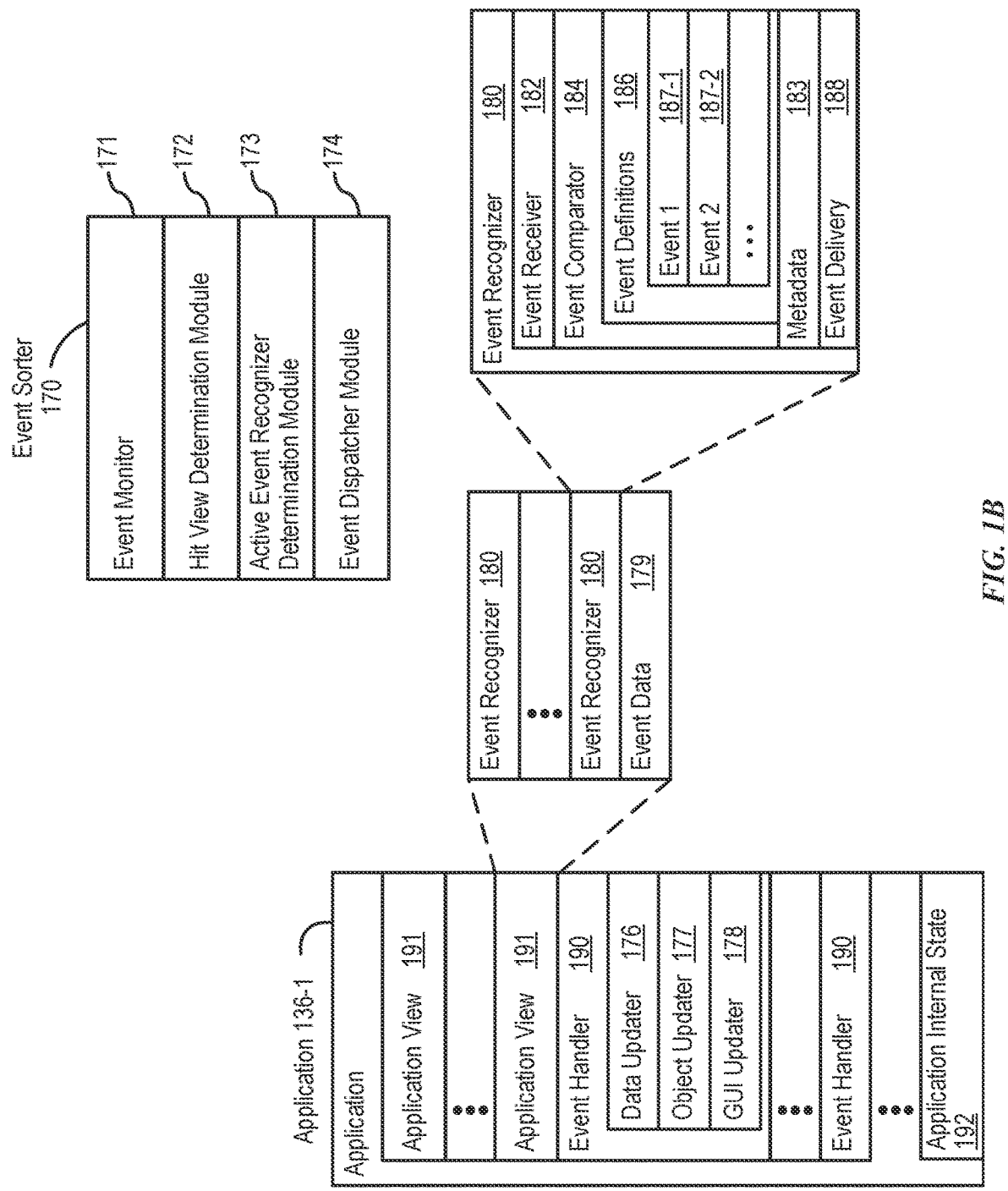
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
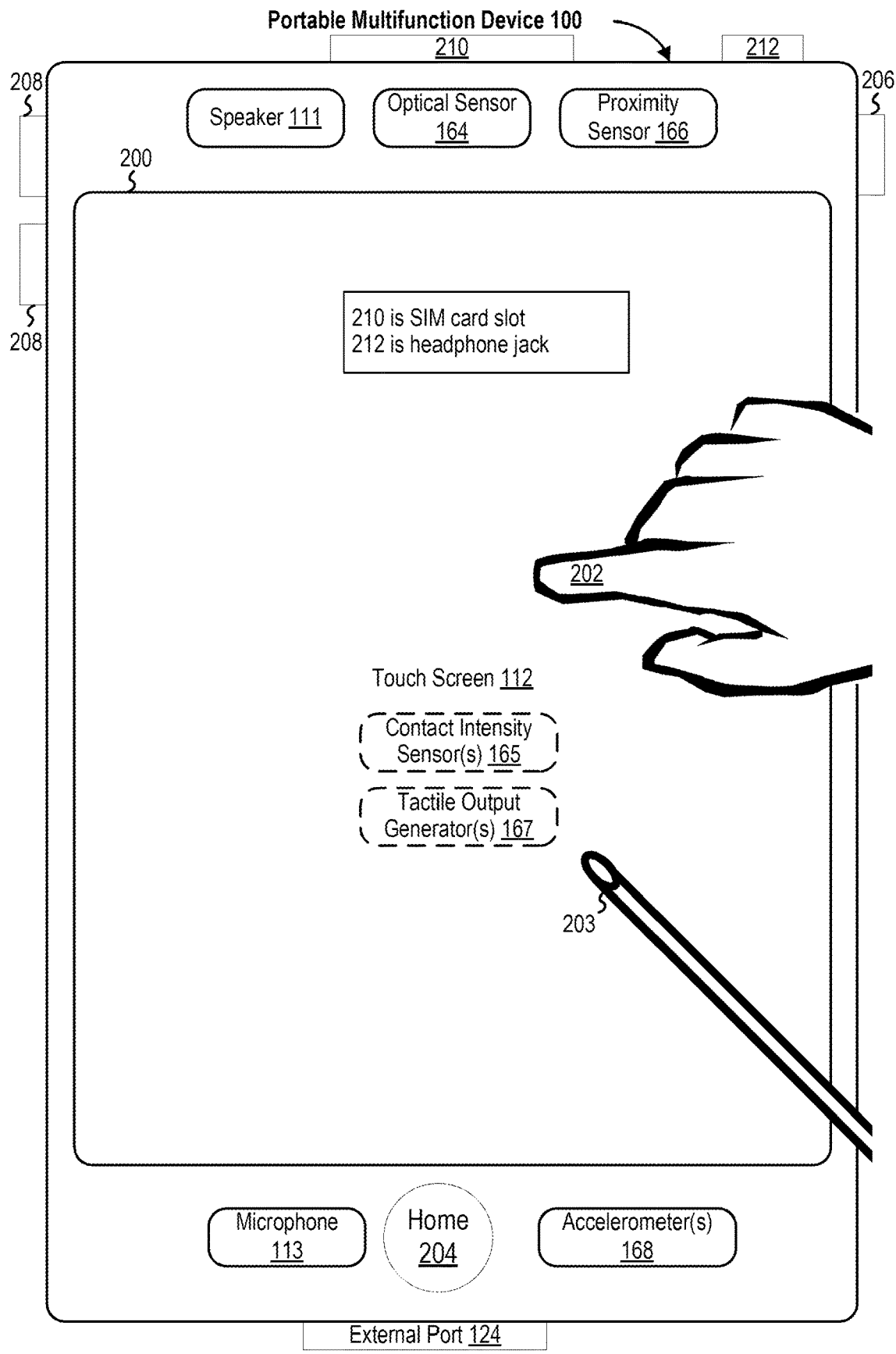
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
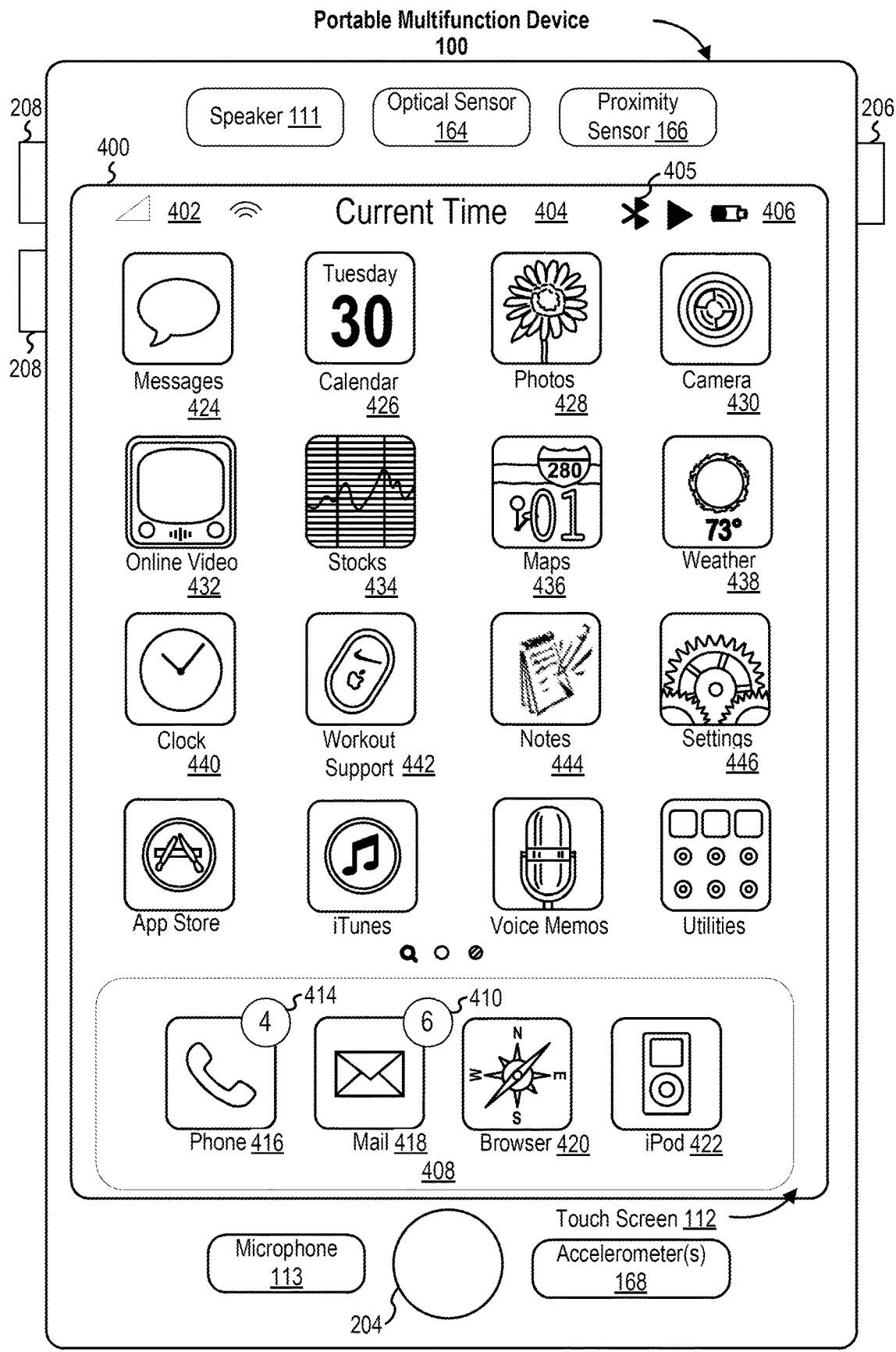
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
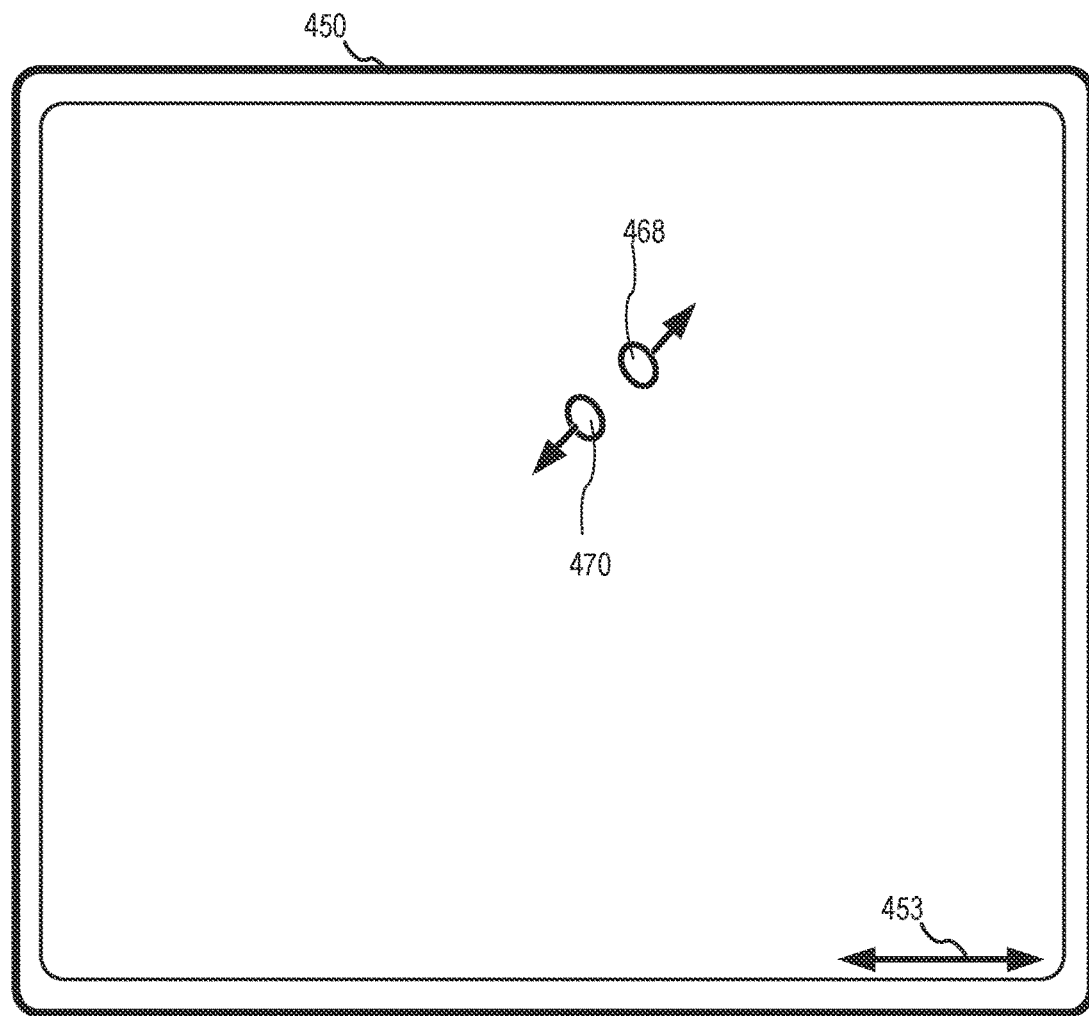
FIG. 4B illustrates an exemplary user interface for a multifunction device with a touch-sensitive surface that is separate from the display in accordance with some embodiments.
Figure 4B:
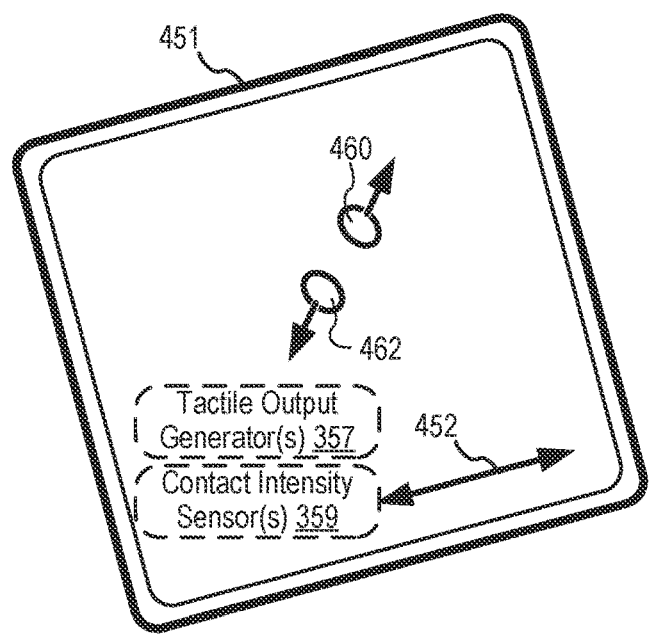

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
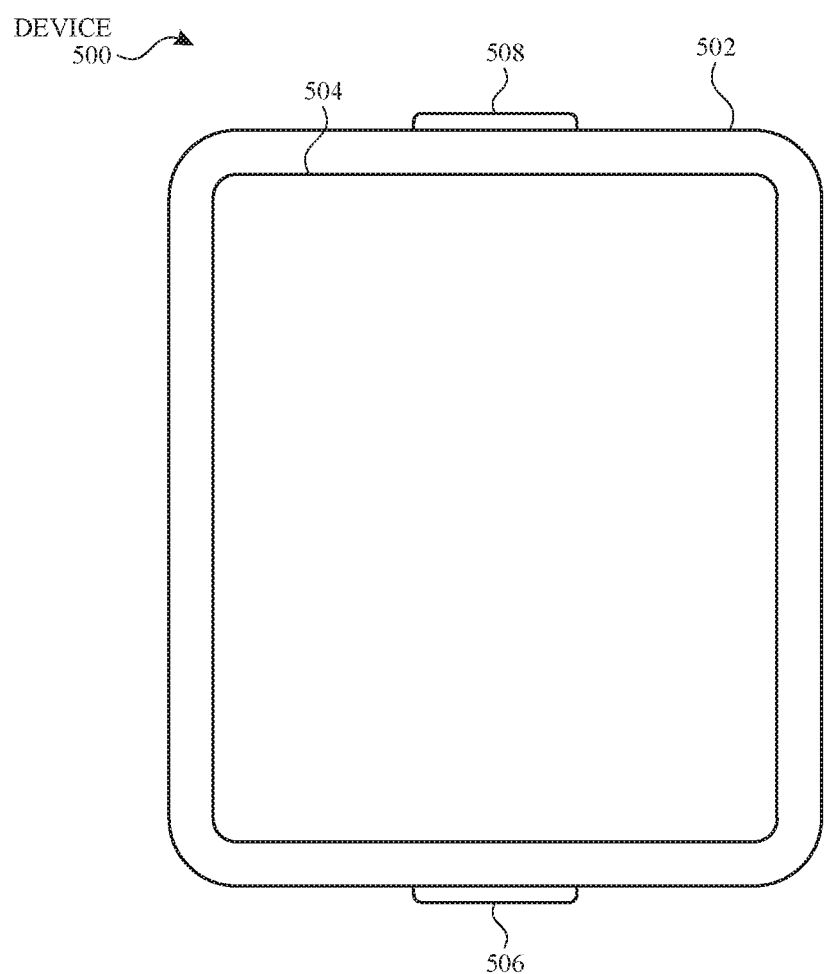
FIG. 5A illustrates a personal electronic device in accordance with some embodiments.
Figure 6A:
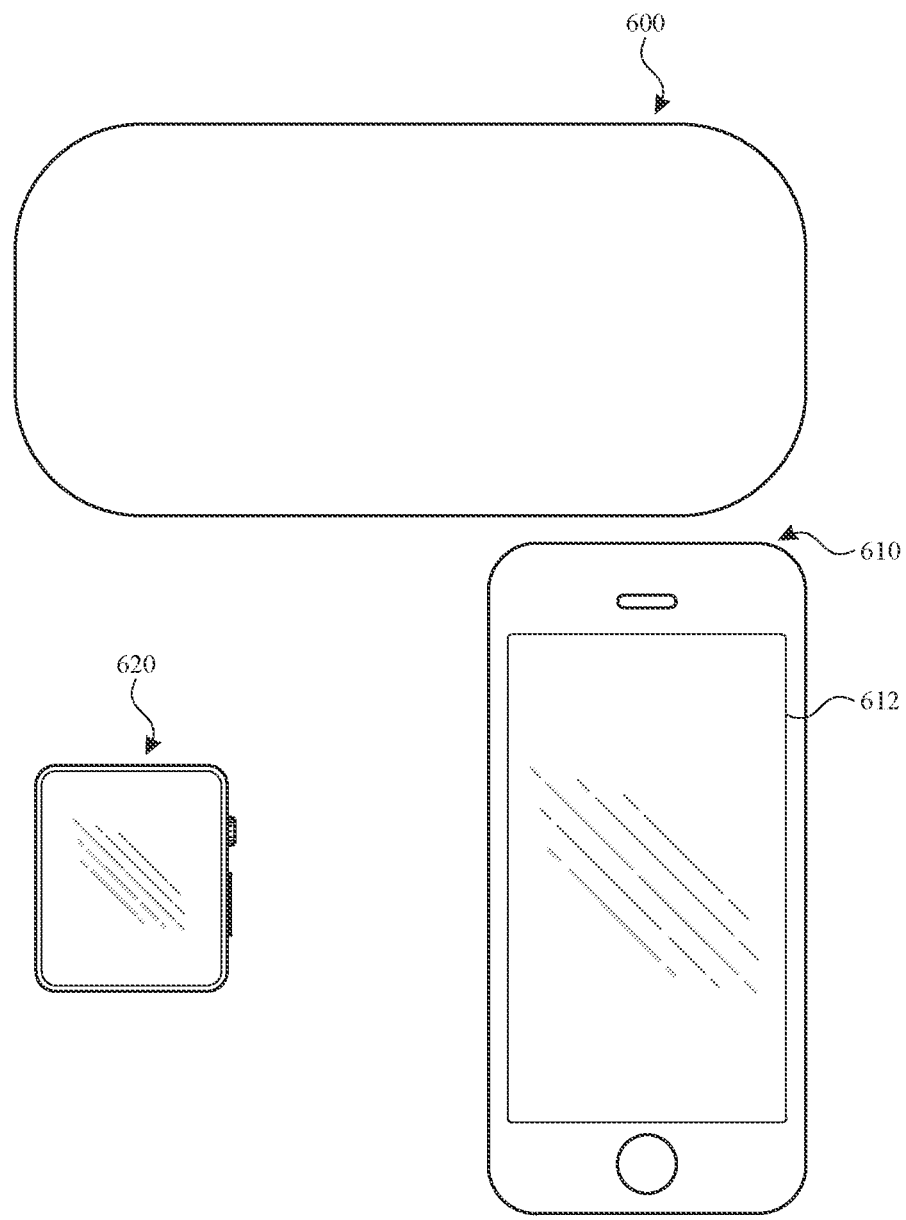
FIGS. 6A-6AG illustrate exemplary user interfaces for charging electronic devices in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
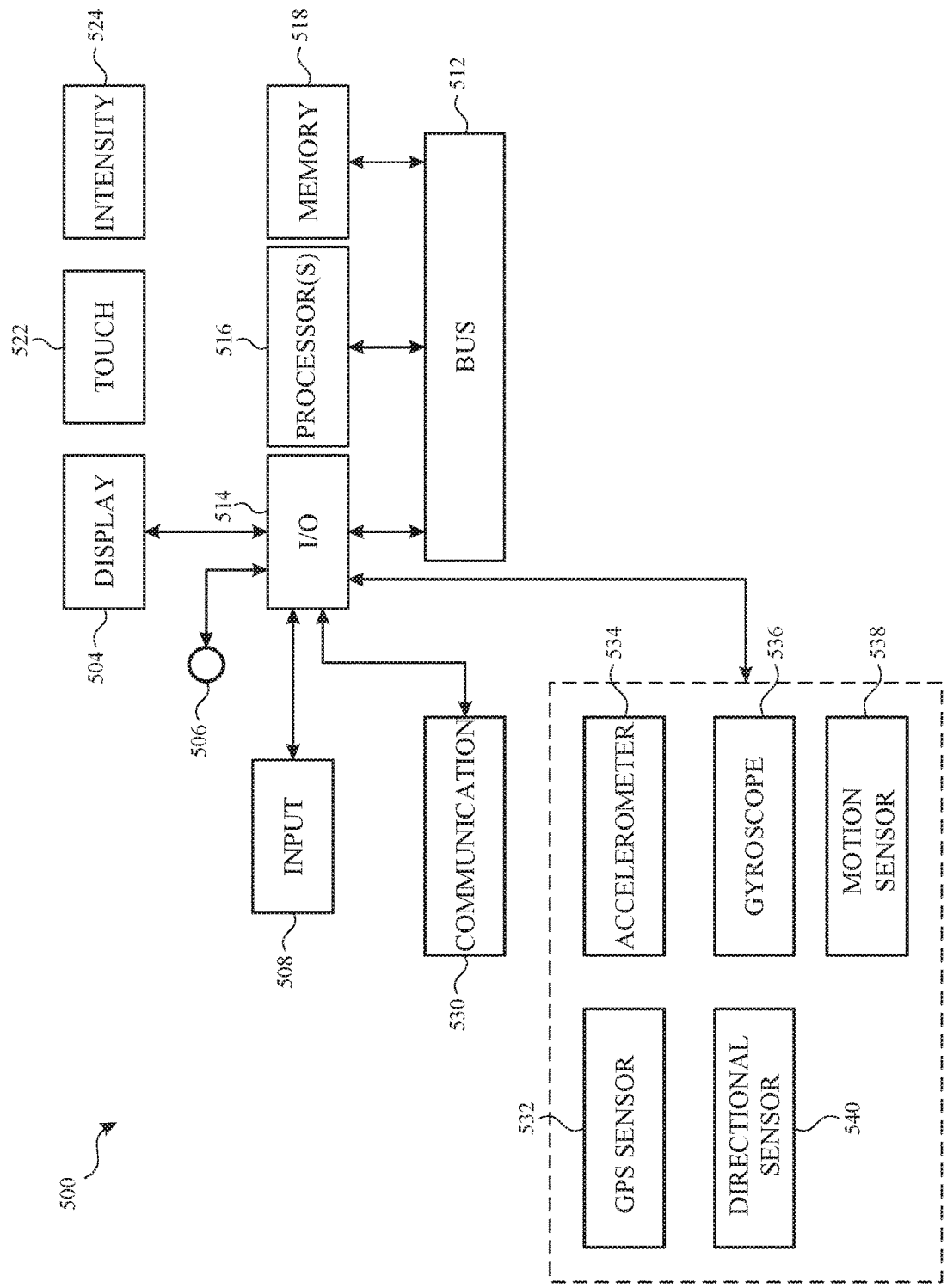
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7A-7E and 9A-9B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6AG illustrate exemplary user interfaces for charging multiple electronic devices, in accordance with some embodiments. The user interfaces in these figures are used to illustrate the processes described below, including the processes in FIGS. 7A-7E.

FIG. 6A illustrates a primary device 610 (e.g., a smartphone), a secondary device 620 (e.g., a smartwatch), and a charging device 600. In some embodiments, primary device 610 is portable multifunction device 100, device 300, device 500, or other electronic device with a display (e.g., an electronic watch, tablet computer). In some embodiments, secondary device 620 is portable multifunction device 100, device 300, device 500, or other electronic device, with or without a display (e.g., a smartphone, an electronic watch, a tablet computer, battery-operated earphones (e.g., AirPods®, etc.). In some embodiments, secondary device 620 includes a case, dock, or the like through which secondary device 620 interfaces with charging device 600.

In some embodiments, primary device 610 and secondary device 620 are paired in the sense that they are configured to exchange information (e.g., via a wireless communication link such as Bluetooth® or via pulses transmitted by charging coils of charging device 600 (e.g., as a backup communication method)). In some embodiments, primary device 610 and/or secondary device 620 are included in a set of devices associated with each other (e.g., associated with the same iCloud® account, or paired together). In some embodiments, the set of devices associated with each other includes one or more of: devices that are paired with at least one other device in the set, and devices that are associated with the same user account (e.g., iCloud®). In some embodiments, the devices are otherwise configured to exchange data. For example, the devices are logged onto the same WiFi network.

Charging device 600 is configured to charge primary device 610 and secondary device 620. Optionally, charging device 600 is configured to wirelessly charge primary device 610 and/or secondary device 620. In some embodiments, charging device 600 includes a substantially flat surface (e.g., a mat) upon which primary device 610 and secondary device 620 can be placed for wireless charging. Primary device 610 and secondary device 620 are configured to enter a wireless charging state upon being placed on charging device 600. Optionally, charging device 600 is capable of wireless and/or wired communication. In one example, charging device 600 is capable of wireless communication with primary device 610, secondary device 620, and/or other electronic devices via a Bluetooth® and/or near-field communication (NFC) protocol or through a wireless network. In some embodiments, charging device 600 is wireless charging apparatus 1002 (discussed below) or includes one or more features or elements of wireless charging apparatus 1002.

Figure 6B:
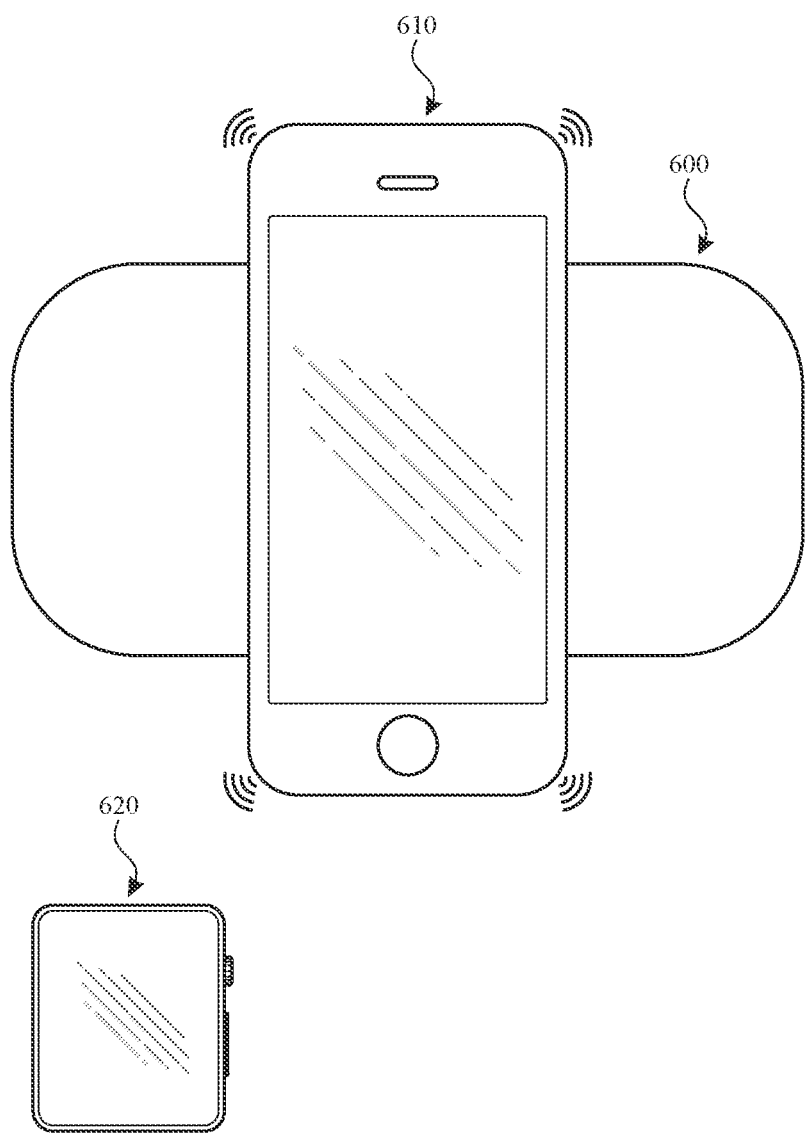

FIGS. 6B-6F illustrate one embodiment of a user interface when primary device 610 is placed on charging device 600 for charging. FIG. 6B illustrates that primary device 610 has been placed on charging device 600. When primary device 610 is placed on charging device 600, primary device 610 detects that it has entered a wireless charging state (e.g., primary device 610 has just begun charging in response to being placed down on the charging mat). In response to detecting that it has entered a wireless charging state, primary device 610 provides an indication of charge status (e.g., a visual or other type of indication that a charging state of primary device 610 has changed).

Figure 6C:
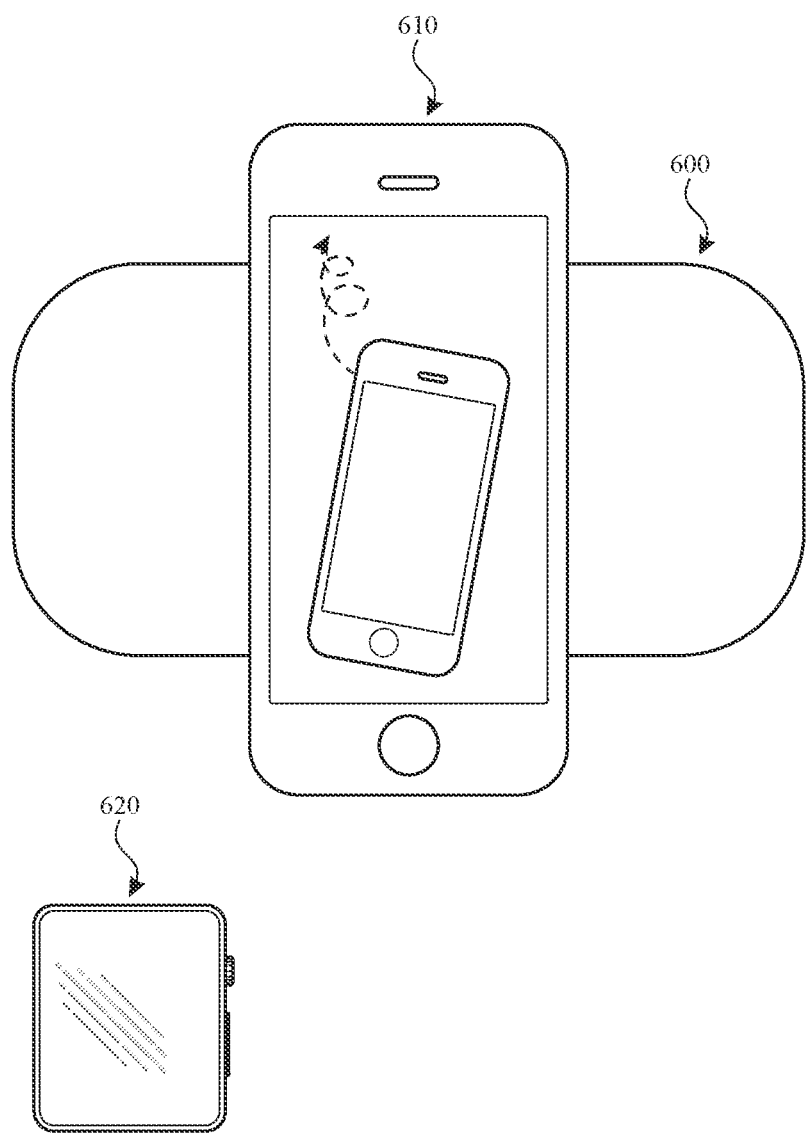

In the illustrated embodiment, the indication of charge status for primary device 610 includes a haptic output (e.g., primary device 610 provides a haptic output when it is placed down on charging device 600), as shown in FIG. 6B. Primary device 610 is also displaying a visual indication (e.g., an animation or graphical interface object(s)) that it has entered a wireless charging state. FIG. 6C illustrates an exemplary animation in which a graphic representation of primary device 610 (e.g., an iPhone®) spins, flips, twists, and/or twirls to indicate that primary device 610 has entered a charging state. In another embodiment, primary device 610 displays charge status indicator 644 shown in FIG. 6F (discussed in greater detail below) and/or pulses or flashes the battery icon 644-2 in charge status indicator 644 or setting status indicator 645 to indicate that primary device 610 has entered the charging state.

Figure 6D:
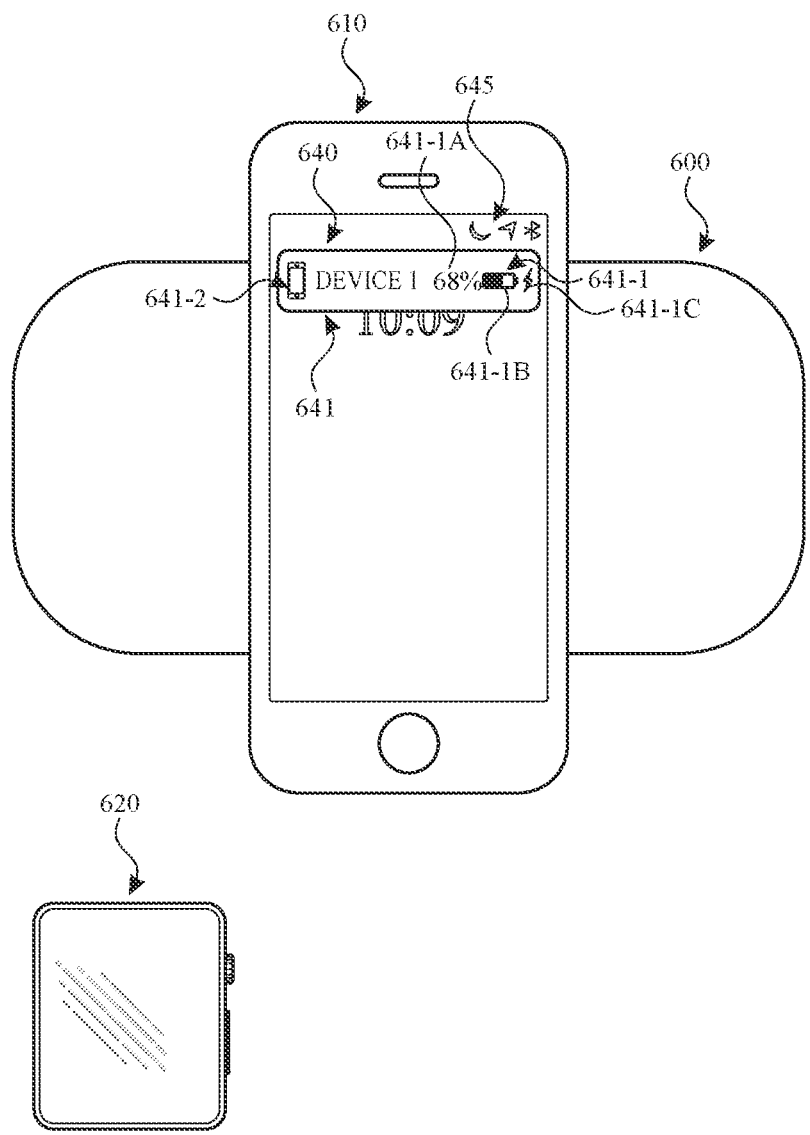

Following the animation shown in FIG. 6C, primary device 610 displays a charge status interface 640 with charge status indicator 641, as shown in FIG. 6D. Charge status indicator 641 includes a charging status platter that shows the charge level of primary device 610.

In the embodiment illustrated in FIG. 6D, charge status indicator 641 includes battery indicator 641-1, which includes a textual indication 641-1A of the charge level of the battery of primary device 610 as a percentage (68%), a graphical indication 641-1B of charge level (a battery icon that is partially filled in proportion to the level of charge of primary device 610), and a current status indication 641-1C that primary device 610 is currently charging (a lightning bolt). Charge status indicator 641 also includes a graphical identifier 641-2 of primary device 610 that includes a name associated with primary device 610 (Device 1) and a representative image of primary device 610 (a thumbnail image of an iPhone®). In some embodiments, charge status indicator 641 includes one or more of the features included in battery indicator 641-1 and graphical identifier 641-2.

In some embodiments, displaying charge status indicator 641 includes a fly-in animation of the charging status platter. In some embodiments, the graphical indication of charge level includes a partially filled ring. In some embodiments, the indication of charge level includes an animation representative of charge level (e.g., ripples and/or impact effect indicative of charge level (e.g., that vary based on charge level), referred to herein as a "Ripple" effect) or a color-based indication representative of charge level (e.g., green for full charge, yellow for some charge, and red for low/no charge).

Optionally, charge status indicator 641 is displayed so long as primary device 610 is charging, and is removed (e.g., ceased to be displayed) after primary device 610 is no longer charging (e.g., removed from charging device 600). Optionally, charge status interface 640 includes setting status indicator 645, which indicates the status of various device settings (e.g., do-not-disturb, GPS, Bluetooth®, etc.).

Figure 6E:
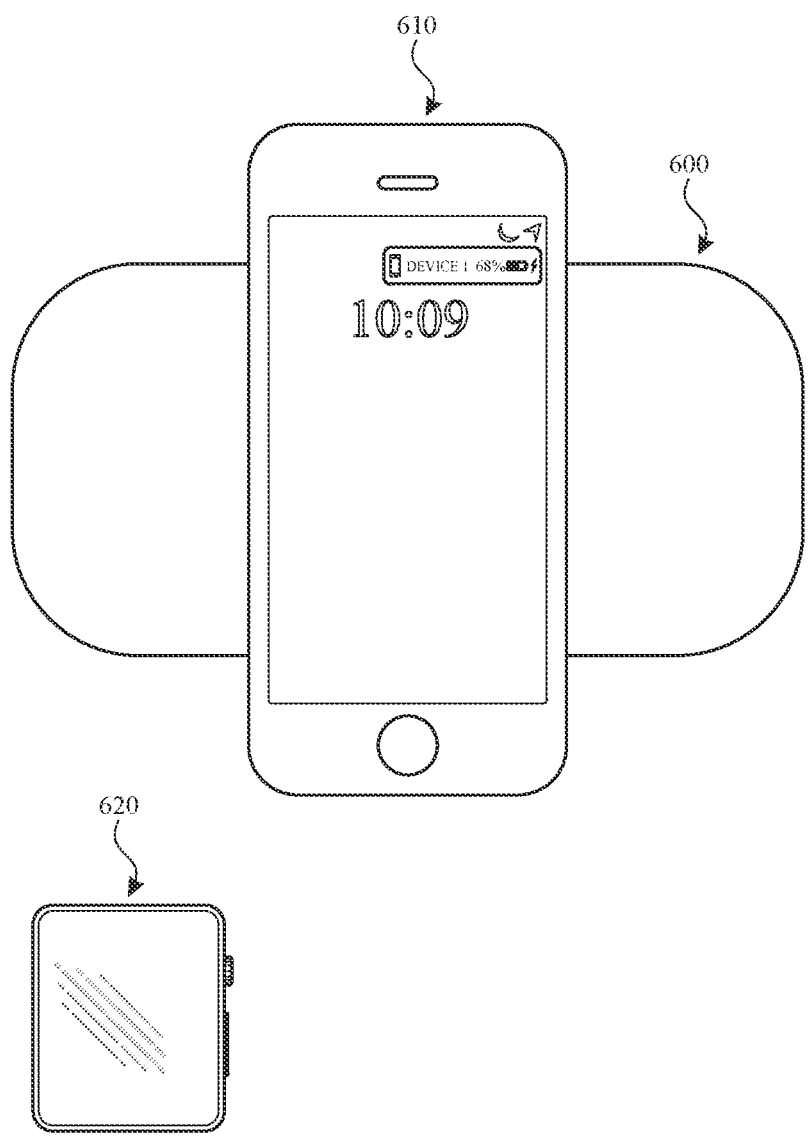
Figure 6F:
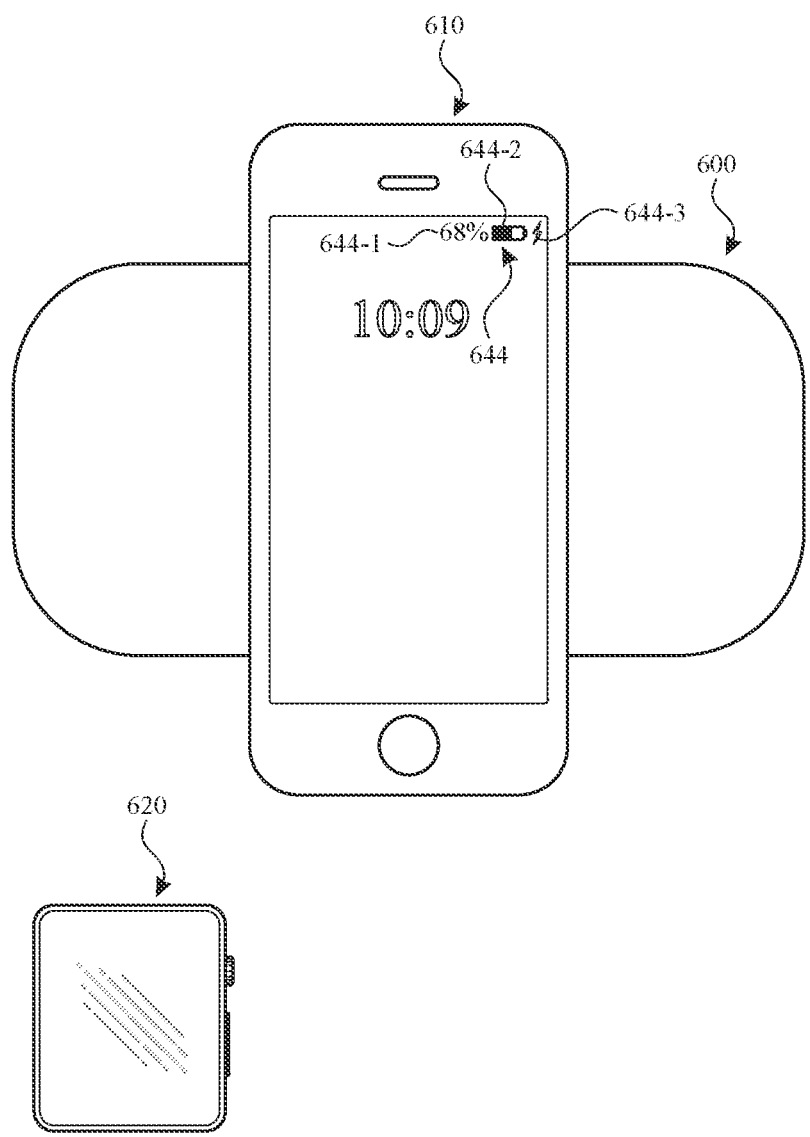

After charge status interface 640 has been displayed (e.g., for a predetermined amount of time), primary device 610 animatedly displays a transition to another, more compact, charge status indicator 644 shown in FIG. 6F. FIG. 6E illustrates an exemplary transition in which charge status indicator 641 is reduced in size and setting status indicator 645 translates off the right edge of display 612. Charge status indicator 644 includes the same features of battery indicator 641-1 described above and indicates the charging status for primary device 610. In some embodiments, charge status indicator 644 includes one or more items from setting status indicator 645 (e.g., Bluetooth® status) and one or more charge level indicators (e.g., textual indication 641-1A and battery icon 641-1B).

Figure 6G:
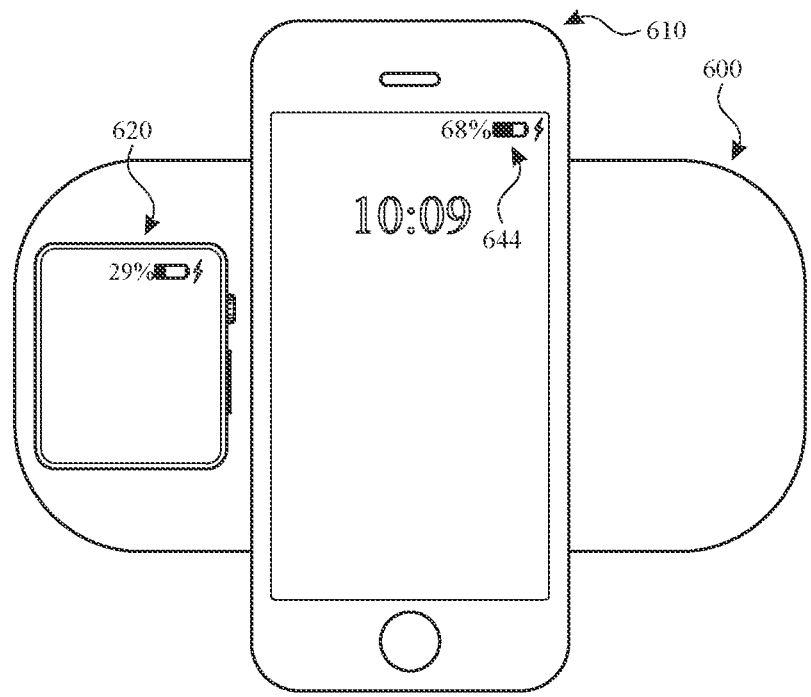

Next, as shown in FIG. 6G, secondary device 620 is placed on charging device 600, along with primary device 610, and enters a wireless charging state. In response to secondary device 620 being placed on charging device 600, primary device 610 detects that secondary device 620 has entered a wireless charging state. Optionally, primary device 610 receives data from secondary device 620 via a communication link (e.g., Bluetooth® or pulses transmitted through charging coils of charging device 600), where the data indicates that secondary device 620 has entered a wireless charging state and/or represents the charge status of secondary device 620. In some embodiments, secondary device 620 is placed on charging device 600 prior to primary device 610 being placed on charging device 600.

Figure 6H:
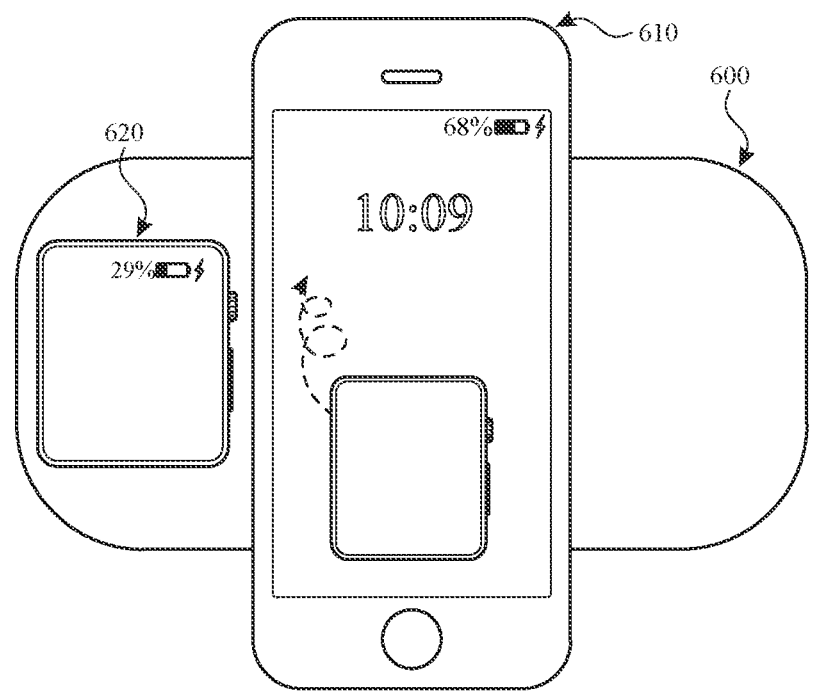

In response to detecting that at least one of primary device 610 or secondary device 620 has entered a wireless charging state (e.g., has been placed on charging device 600) and determining that both primary device 610 and secondary device 620 are being wirelessly charged by the same charging device 600, primary device 610 displays an indication of charge status for secondary device 620. In the illustrated embodiment, primary device 610 indicates that the charging state of secondary device 620 has changed (e.g., secondary device 620 has entered a charging state) by displaying an animation of a graphic representation of secondary device 620 spinning, flipping, twisting, and/or twirling, as indicated in FIG. 6H.

Figure 6I:
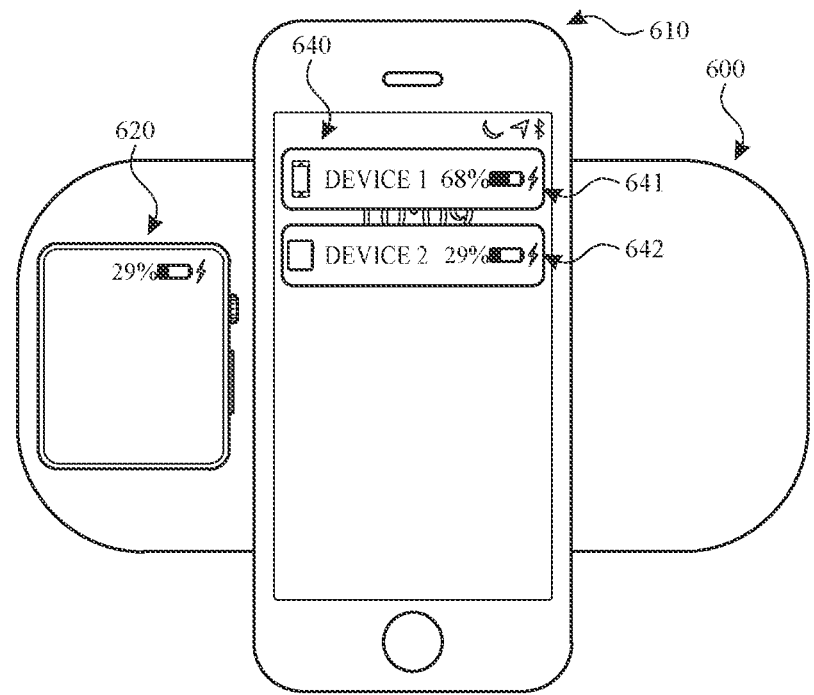

Following the animation, primary device 610 displays charge status interface 640 with charge status indicator 641 for primary device 610 and charge status indicator 642 for secondary device 620, as shown in FIG. 6I. Similar to charge status indicator 641 for primary device 610, the charge status indicator for secondary device 620 includes an identifier of secondary device 620 (representative image and name) and indicates the level of charge of secondary device 620 (in both text and graphical form) and that secondary device 620 is currently charging (lightning bolt). In some embodiments, secondary device 620 also outputs (e.g., displays) an indication of its charge level (e.g., a visual or non-visual indication of charge level).

In some embodiments, displaying an indication of charge status for secondary device 620 includes a fly-in animation of charge status indicator 641 and/or charge status indicator 642. In some embodiments, primary device 610 displays charge status indicator 644 and/or pulses or flashes the battery icon 644-2 in charge status indicator 644 or setting status indicator 645 to indicate that secondary device 620 has entered the charging state.

In some embodiments, upon primary device 610 entering a wireless charging state or detecting another device entering a wireless charging state while primary device 610 is placed on charging device 600, primary device 610 displays an indication (e.g., a platter) of charge status for each device that is being wirelessly charged by charging device 600. In this sense, primary device 610 is a "hero device" that displays a multi-device charge status interface that includes a charging status platter for each device currently being charged on charging device 600.

In some embodiments, primary device 610 displays the charge status indicators (e.g., 641 and 642) in a particular order. In FIG. 6I, charge status indicator 641 and charge status indicator 642 are displayed in an ordered arrangement (e.g., a vertical list) on display 612. In some embodiments, the charge status indicators are displayed in a horizontal list. In some embodiments, the ordered arrangement is a predetermined arrangement based on a type of device associated with each respective charge status indicator (e.g., phone always first, then a watch, then earphones (e.g., iPhone®, then Apple Watch®, then AirPods®)). In some embodiments, the ordered arrangement is based at least in part on an order in which each respective device entered a wireless charging state (e.g., first-in, first-out (FIFO) list of charge status indicators for respective devices). In some embodiments, the charge status indicator of the device displaying the charge status interface (e.g., primary device 610) is always displayed first (e.g., on top or on the far left), followed by indicators listed in a first-in, first-out order.

In some embodiments, the charge status interface 640 depends on certain conditions (e.g., primary device 610 displays a different charge status interface based on certain conditions). In one example, primary device 610 determines whether it is in a low disturbance condition (e.g., in a do-not-disturb mode, or in a dark room). In accordance with a determination that it is not in a low disturbance condition, primary device 610 displays the indication of charge status for secondary device 620 as described above (e.g., displays the indication normally). Alternatively, in accordance with a determination that primary device 610 is in a low disturbance condition, primary device 610 displays a low disturbance indication of charge status for secondary device 620 (e.g., charge status indicator 642 or 644 with a red-shifted and/or lower amount of light output).

As described above, in some embodiments, primary device 610 is included in a set of devices associated with each other. In one such example, primary device 610 determines whether secondary device 620 is included in the set of devices associated with each other. In accordance with a determination that secondary device 620 is included in the set of devices associated with each other, primary device 610 displays an indication of charge status for secondary device 620 as described above. Alternatively, in accordance with a determination that secondary device 620 is not included in the set of devices associated with each other, primary device 610 forgoes displaying the indication of charge status for secondary device 620 (e.g., charge status indicator 642).

Figure 6J:
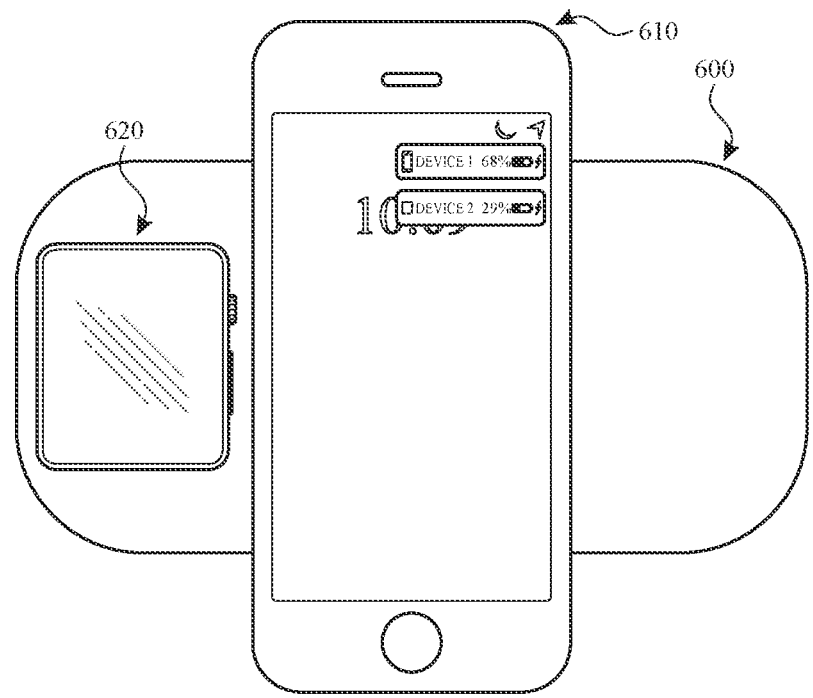
Figure 6K:
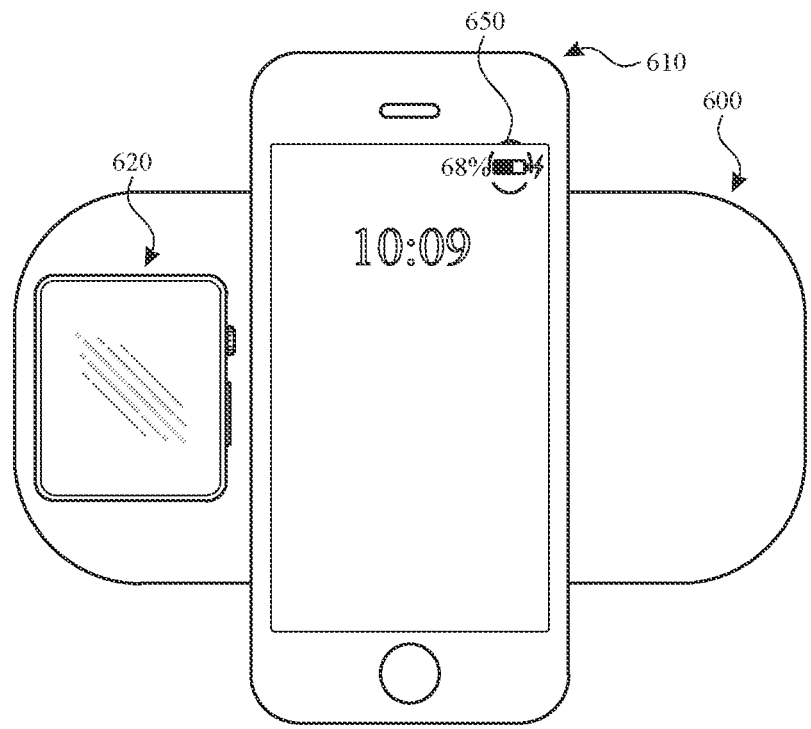

Turning now to FIGS. 6J-6K, after displaying charge status indicators 641 and 642, primary device 610 displays an animated transition from charge status interface 640 to charge status indicator 644 of primary device 610, similar to the transition described above with reference to FIGS. 6D-6F.

Figure 6L:
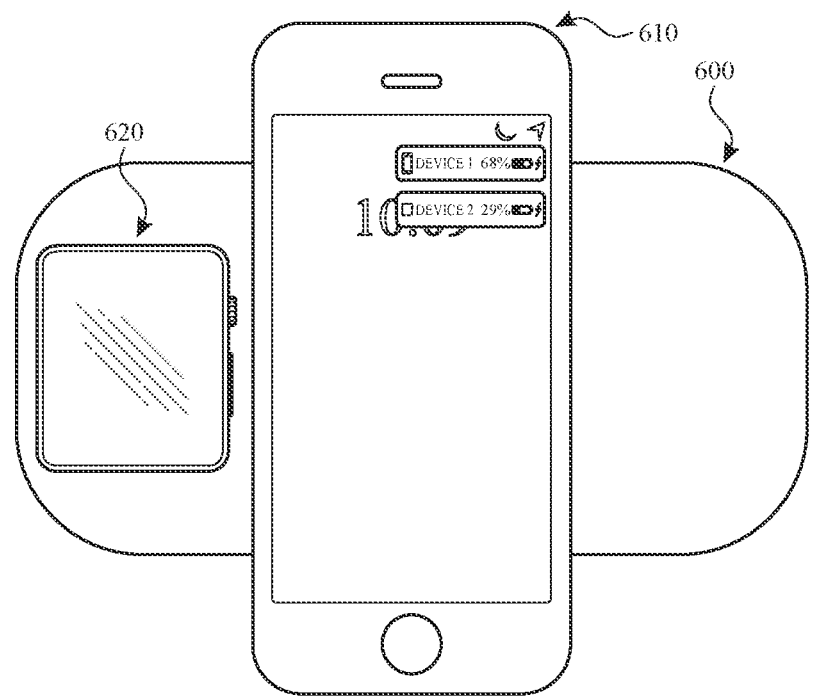
Figure 6M:
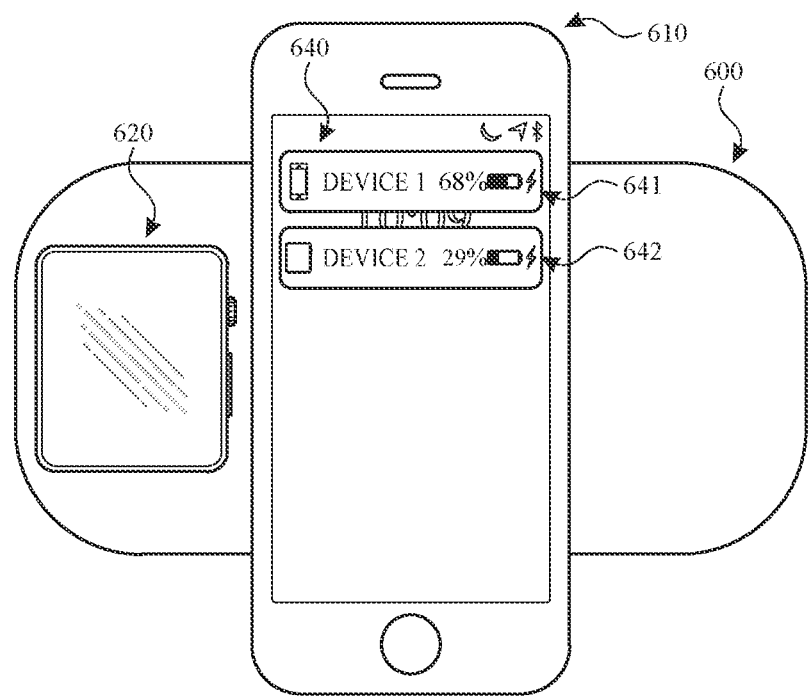

Next, as shown in FIG. 6K, user input 650 (e.g., a tap) is detected on battery icon 644-2 in charge status indicator 644 (e.g., battery icon 644-2 and/or charge status indicator 644 is a selectable affordance). In response, primary device 610 displays charge status interface 640 with charge status indicator 641 and charge status indicator 642 (e.g., with charge status indicators for all of the devices currently being charged on charging device 600). In the illustrated embodiment, displaying charge status interface 640 in response to user input 650 includes an animation in which charging status indicator 644 (including battery icon 644-2) is removed from display 612 and charge status interface 640 transitions onto display 612. As shown in FIGS. 6K-6M, the animation is the reverse of the animation illustrated by FIGS. 6I-6K.

Figure 6N:
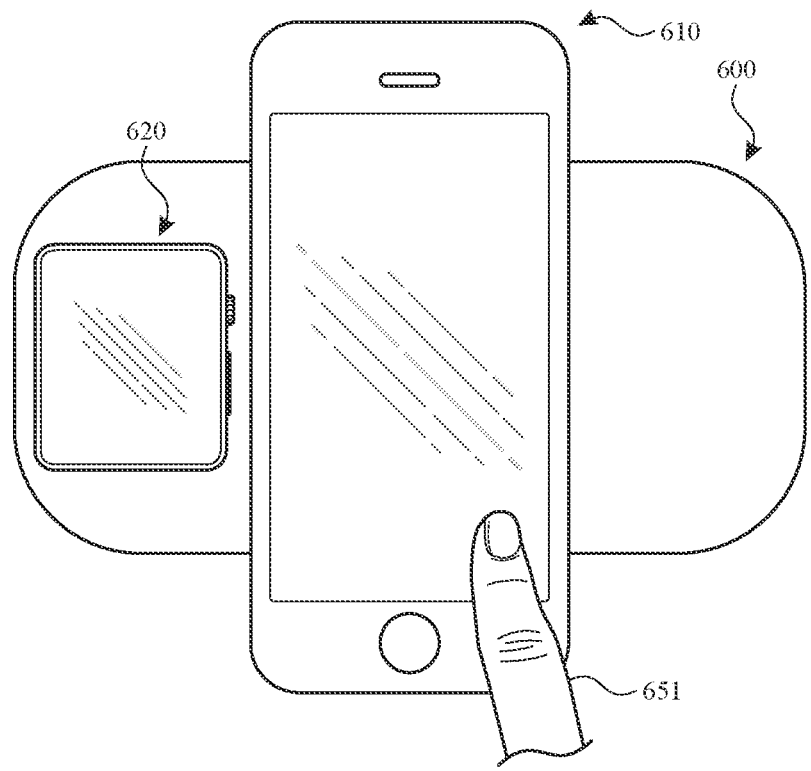

Next, referring to FIG. 6N, device 600 ceases to display charge status interface 640, including the indication of charge status for secondary device 620 (e.g., charge status indicator 642). In the illustrated embodiment, display 612 of primary device 610 enters a mode (e.g., sleep mode) in which display 612 is inactive (e.g., turned off or not currently displaying any content). In some embodiments, display 612 becomes inactive if no inputs or alerts (e.g., emails, text messages, phone calls, etc.) are received or detected for a predetermined amount of time.

Figure 6O:
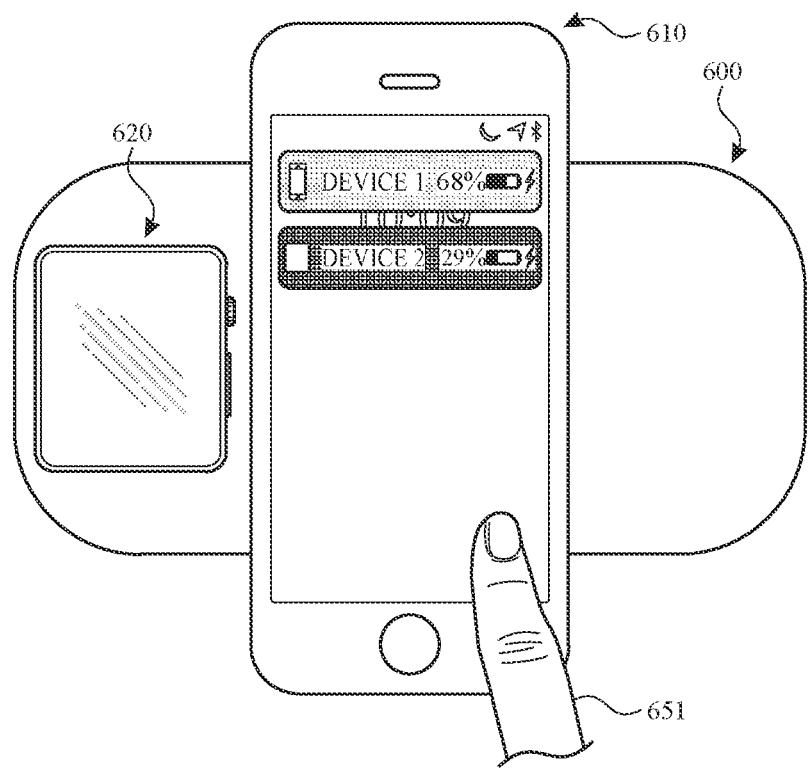
Figure 6P:
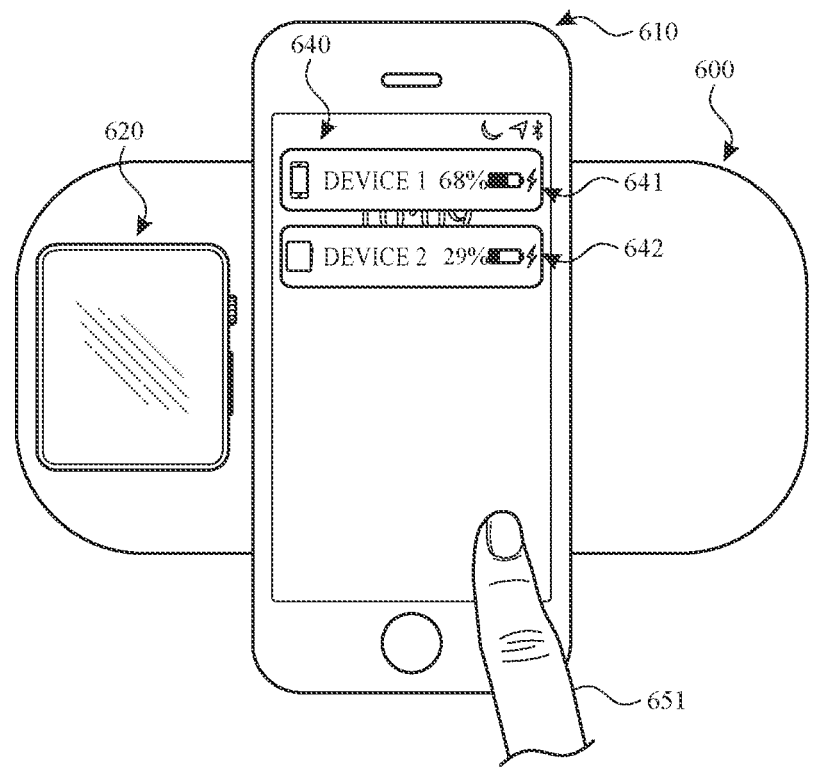

While display 612 is inactive, primary device 610 receives user input 651 (e.g., a touch input such as a tap). In response to receiving user input 651, primary device 610 displays an indication of charge status for primary device 610 and/or an indication of charge status for secondary device 620. In the illustrated embodiment, in response to receiving user input 651, primary device 610 determines whether user input 651 is detected for a threshold amount of time (e.g., determines if user input 651 is a tap and hold). In accordance with a determination that user input 651 is detected for a threshold amount of time, primary device 610 displays charge status interface 640, including charge status indicator 641 associated with primary device 610 and charge status indicator 642 associated with secondary device 620. FIGS. 6N-6P illustrate an exemplary transition from inactive display 612 to charge status interface 640 in which charge status indicators 641 and 642 gradually appear on interface 640 in response to user input 651. In some embodiment, primary device 610 displays charge status indicator 644 and/or flashes battery icon 644-2 in response to user input 651. In this way, primary device 610 allows a user to "check in" on the status of the devices being charged on charging device 600. In some embodiments, primary device 610 provides charge status information periodically by lighting up display 612 at regular intervals to show charge information (e.g., display is activated at predetermined intervals of time to display charge status interface 640).

When user input 651 is removed from display 612, primary device 610 ceases displaying charge status interface 640 (e.g., display 612 returns to an inactive state). Alternatively, in accordance with a determination that user input 651 is not detected for a threshold amount of time, primary device 610 forgoes displaying charge status interface 640.

Figure 6Q:
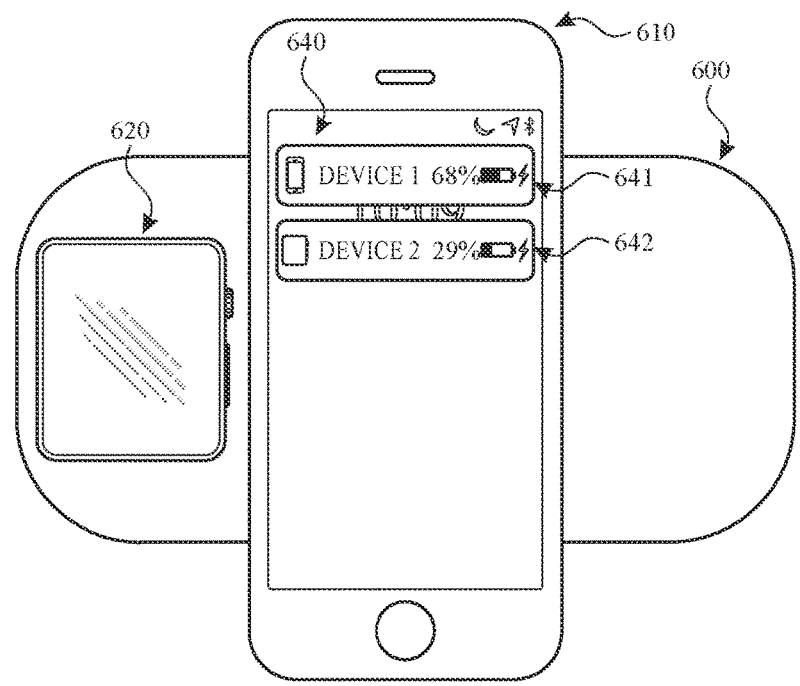

Turning now to FIG. 6Q, primary device 610 and secondary device 620 are charging on charging device 600, and primary device 610 is displaying charging interface 640. While primary device 610 and secondary device 620 are charging on charging device 600, and primary device 610 is displaying charging interface 640, third device 630A (e.g., tablet computer) is added to charging device 600 and enters a wireless charging state, as shown in FIG. 6R.

In response to third device 630A entering a wireless charging state, a determination is made (e.g., by primary device 610, third device 630A, and/or charging device 600) whether third device 630A is a preferred device (e.g., a new primary or hero device). In the illustrated embodiment, whether third device 630A is a preferred device is based on the display size of third device 630A (e.g., the display size of third device 630A relative to the display size of primary device 610). Since third device 630A has a larger display than primary device 610 and secondary device 620, third device 630A is a preferred device. Accordingly, charging status interface 640 ceases being displayed on primary device 610 and is displayed at the preferred device, third device 630A.

Figure 6R:
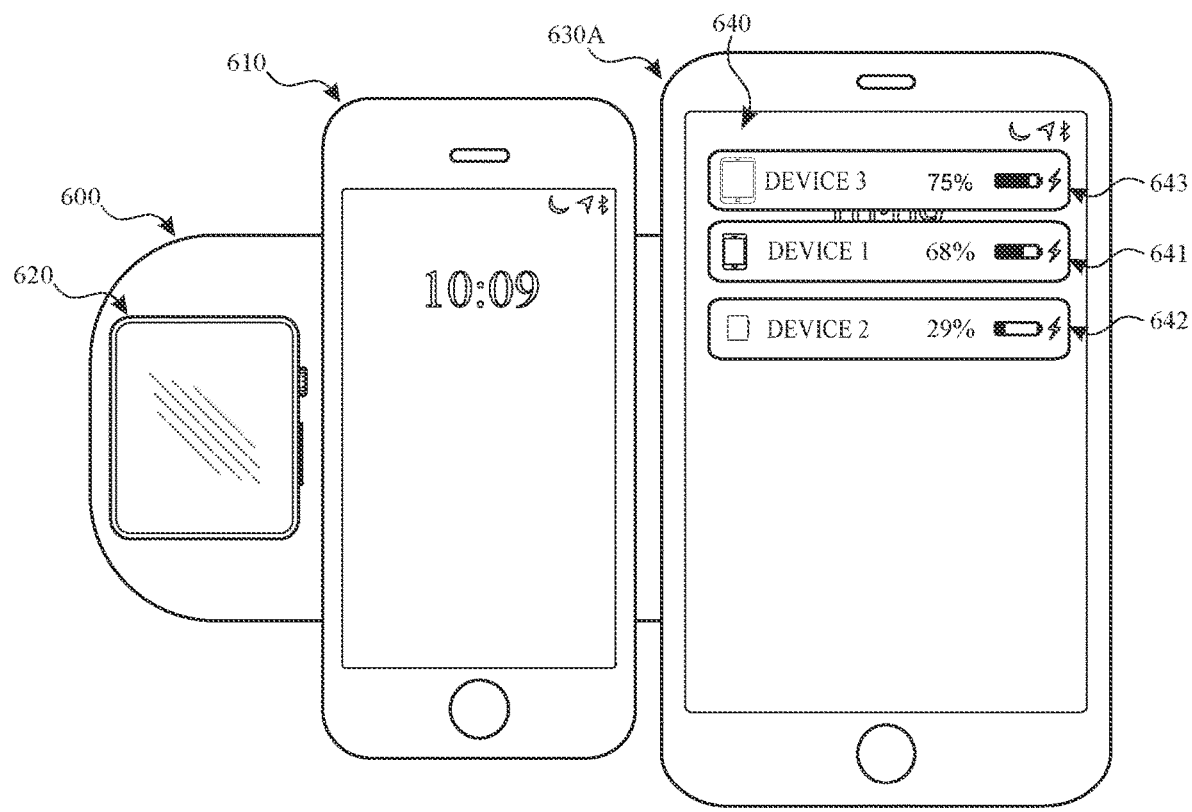

As shown in FIG. 6R, charge status interface 640 on third device 630A includes charge status indicator 643 for third device 630A. Since third device 630A is a preferred device, charge status indicator 643 is displayed above charge status indicators 641 and 642 for primary and secondary devices 610 and 620.

In some embodiments, primary device 610 detects that third device 630A has entered a wireless charging state and determines a display size of third device 630A (e.g., primary device 610 receives display size information from third device 630A, or otherwise accesses information regarding the display size of third device 630A). In accordance with a determination that the display size of third device 630A is larger than the display size of primary device 610, primary device 610 determines that third device 630A is a preferred device and transmits its charge level to third device 630A (e.g., for display on third device 630A). In some embodiments, transmitting the charge level to third device 630A includes sending a charge status directly (e.g., via the charging device 600 or Bluetooth® communication) or indirectly (e.g., via an external network or server, such as via iCloud®).

In some embodiments, a preferred device is determined based on a predetermined hierarchy of devices. For example, primary device 610 can maintain a list that indicates a hierarchy of devices (from most preferred to least preferred): third device 630A, primary device 610, and secondary device 620. Thus, a determination of whether a device is a preferred device comprises determining whether the device is higher up on the hierarchy—in this example, third device 630 is a preferred device relative to primary device 610.

Figure 6S:
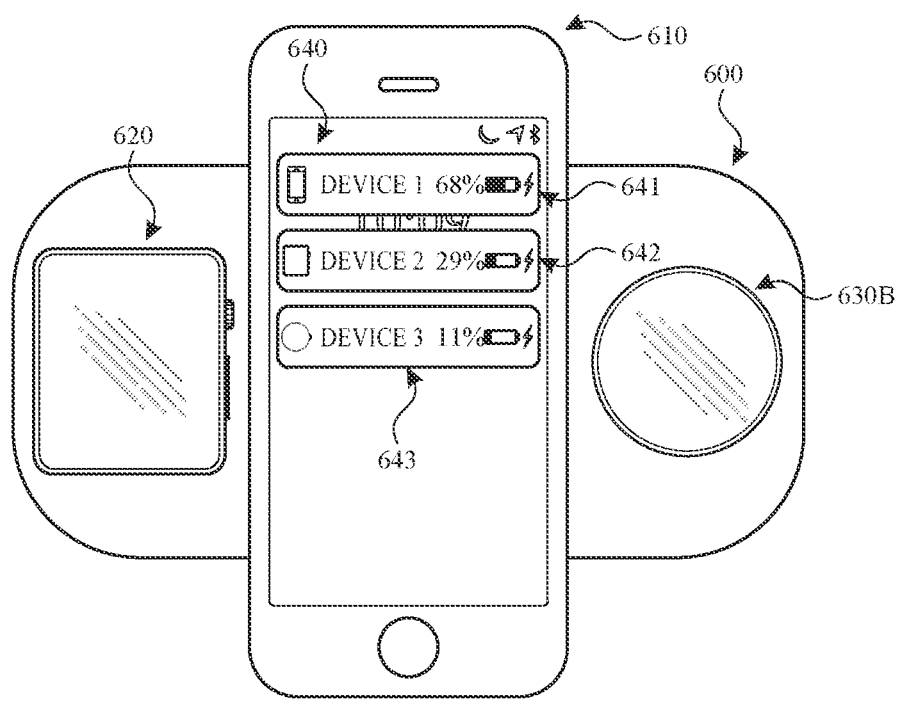

Turning now to FIG. 6S, an alternative embodiment is illustrated in which a different third device (e.g., third device 630B) is added to charging device 600 instead of third device 630A described above. In response to detecting that third device 630B has entered a wireless charging state, primary device 610 determines that third device 630B is not a preferred device (e.g., the display size of third device 630B is not larger than the display size of primary device 610) and displays an indication of charge status (e.g., charge status indicator 643) for third device 630B on display 612. In some embodiments, displaying an indication of charge status for third device 630B includes displaying charge status indicator 644 and/or pulsing a battery icon (e.g., 644-2).

Figure 6T:
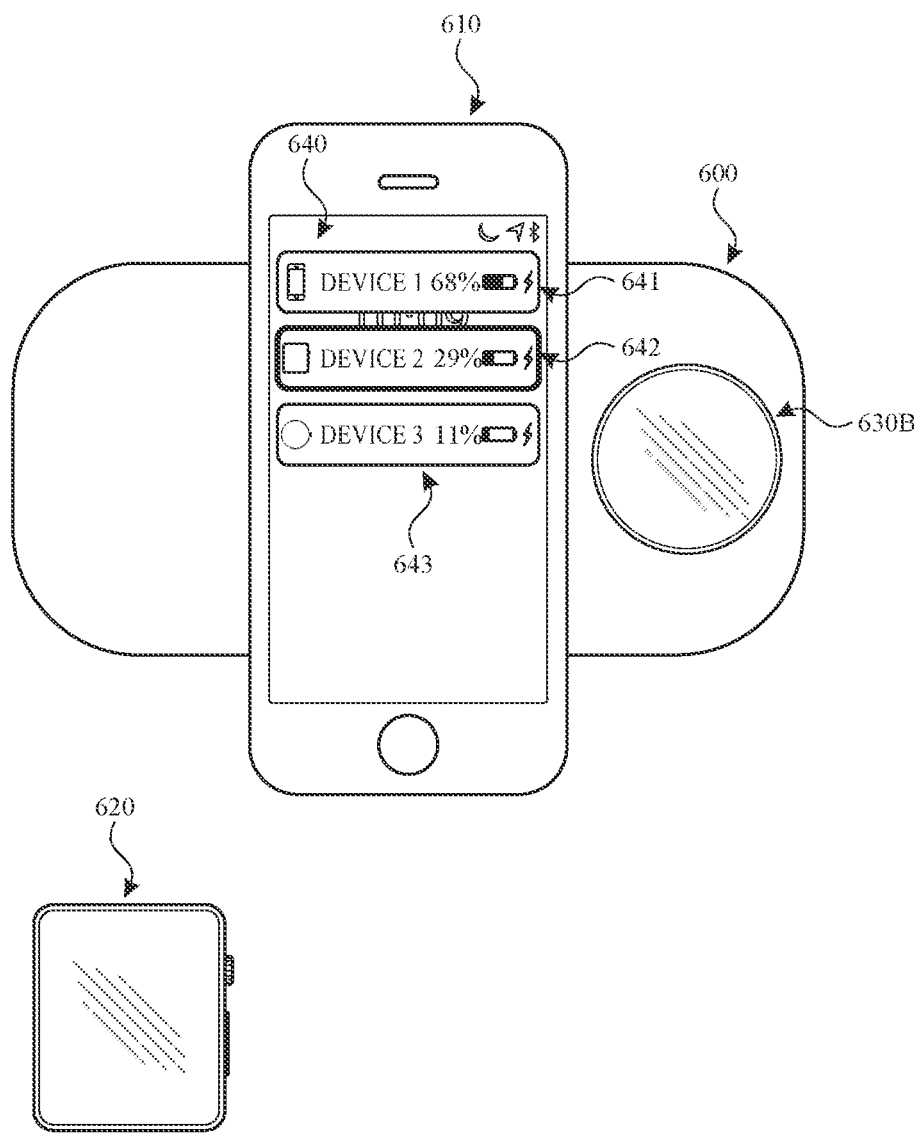
Figure 6U:
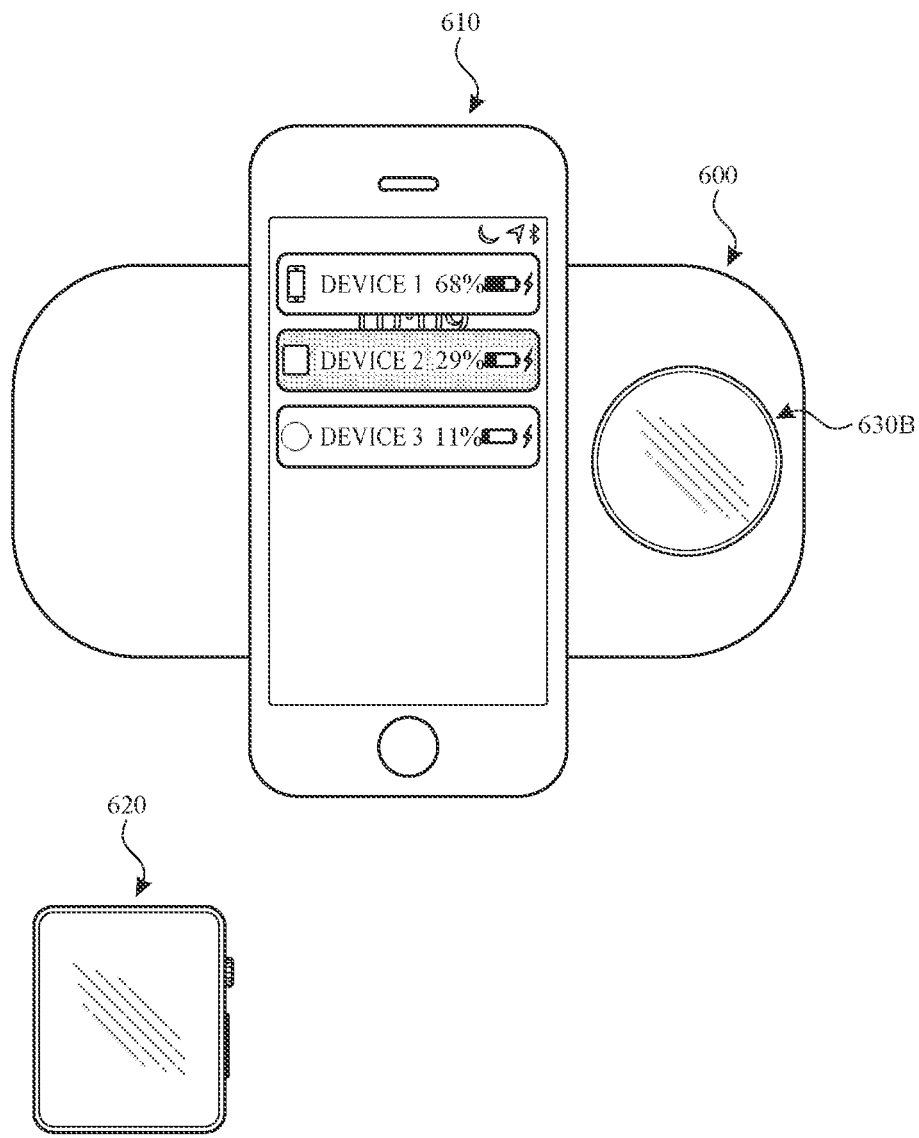

While devices 600, 610, 620, and 630B are configured as shown in FIG. 6S, secondary device 620 is removed from charging device 600. Primary device 610 detects that secondary device 620 has exited a wireless charging state (e.g., by receiving data from secondary device 620), and in response, displays an indication that secondary device 620 is no longer being charged. In some embodiments, primary device 610 flashes the battery icon in charge status indicator 644. In the embodiment illustrated in FIGS. 6T-6V, primary device 610 removes charge status indicator 642 for secondary device 620 and continues to display charge status indicator 641 and charge status indicator 643, indicating that primary device 610 and third device 630 are still charging. FIGS. 6T-6U illustrate an exemplary animation for removing charge status indicator 642 that highlights (e.g., blinks) charge status indicator 642 (FIG. 6T) and then provides the visual effect that charge status indicator 642 disappears (FIG. 6U).

Figure 6V:
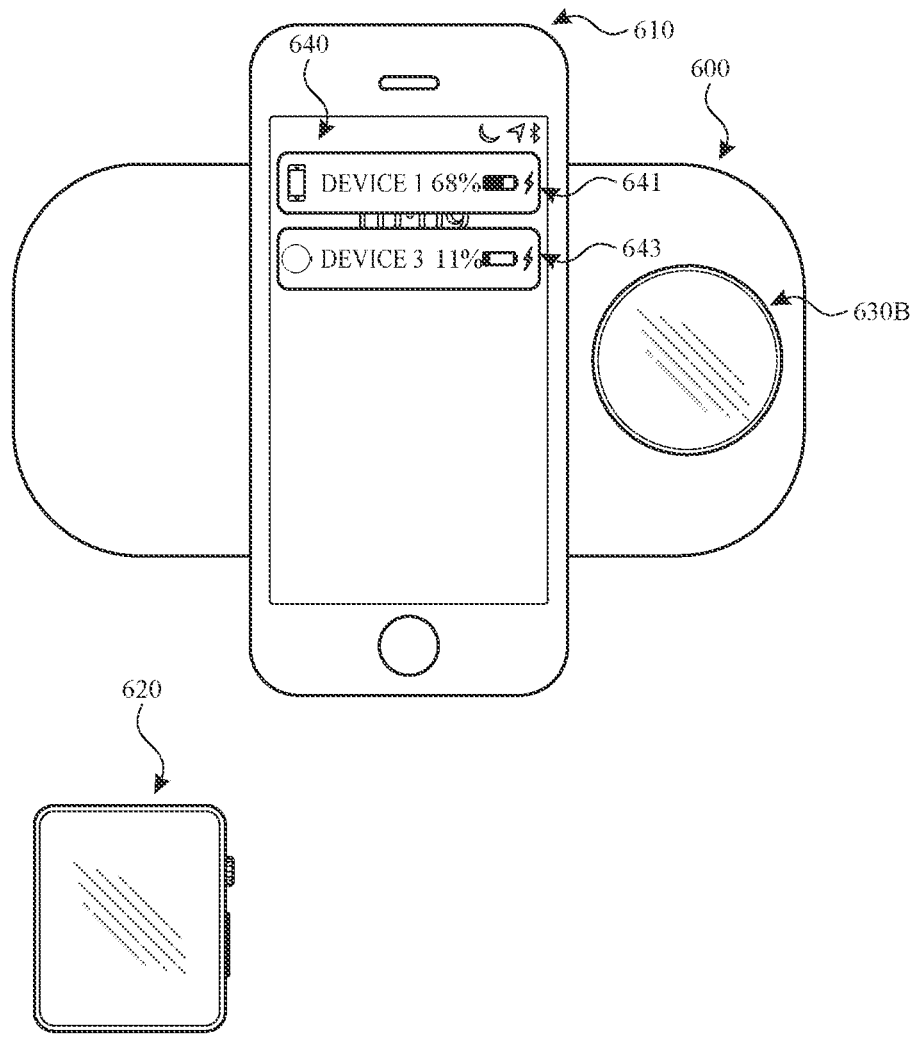
Figure 6W:
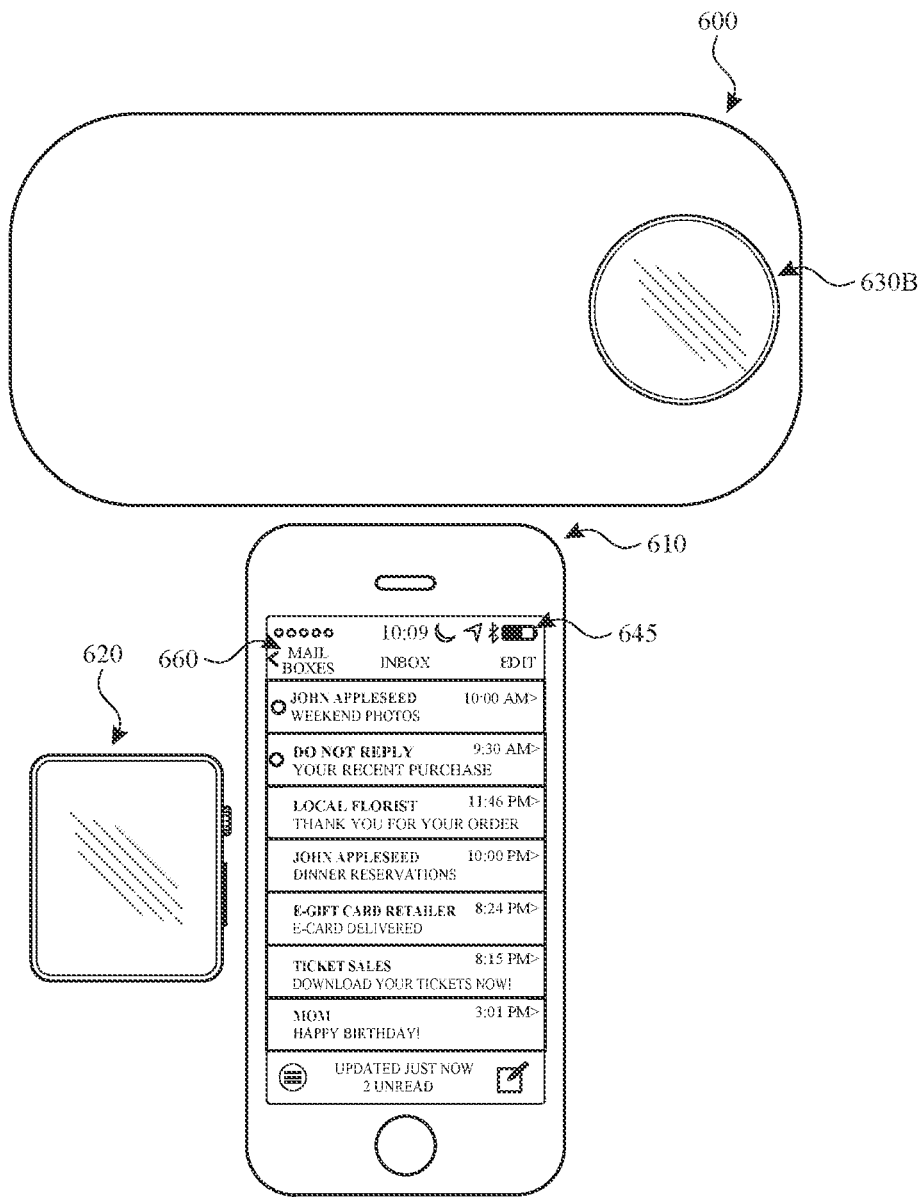
Figure 6X:
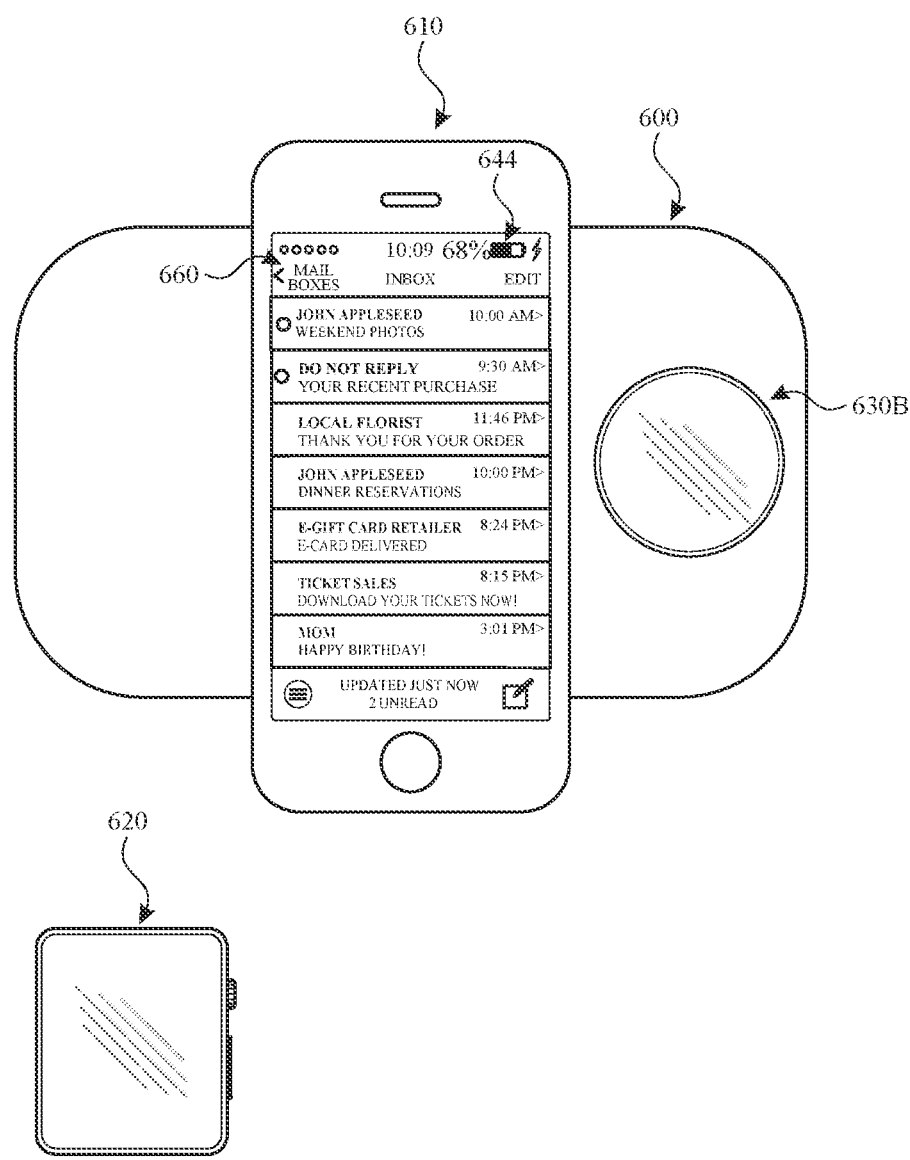
Figure 6Y:
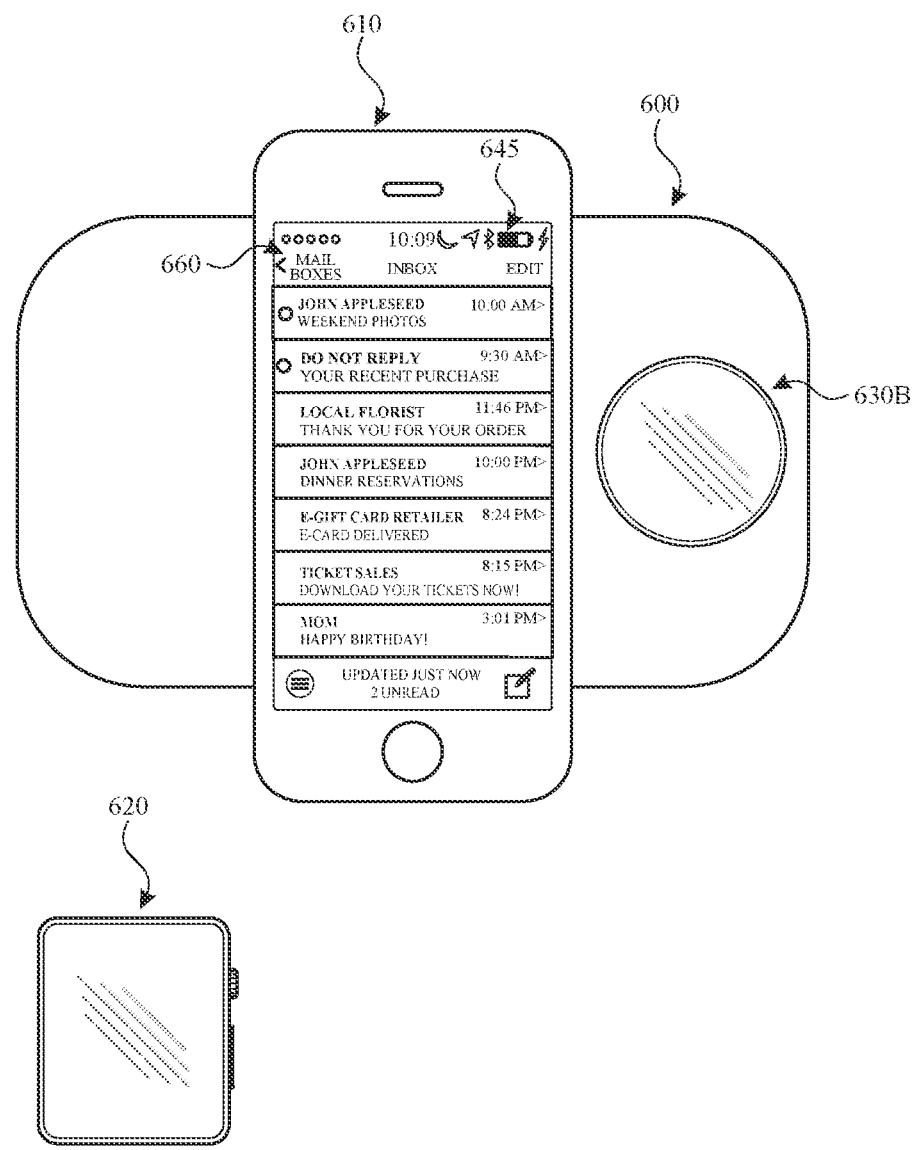

Transitioning now from the configuration shown in FIG. 6V, primary device 610 is removed from charging device 600. In response to being removed from charging device 600, primary device 610 exits the wireless charging state and ceases displaying charge status interface 640, as shown in FIG. 6W. In addition, primary device 610 displays (e.g., in response to user selection of an email application icon) an interface 660 of an active application (e.g., an interface for an Inbox of the email application). In FIG. 6X, primary device 610 is placed back on charging device 600 while displaying interface 660, and in response, provides an indication of charge status (e.g., displays, enlarges, and/or pulses charge status indicator 644 and/or battery icon 644-2) while also displaying interface 660 of the active application. In this way, primary device 610 provides an indication of charge status (e.g., that primary device 610 has entered a wireless charging state) with minimal interference to interface 660 of the active application (e.g., without displaying charge status indicator 641 over top of interface 660 of the active application). In some embodiments, primary device 610 subsequently ceases to display charge status indicator 644, but maintains display of battery icon 644-2, as shown in FIG. 6Y. In some embodiments, primary device 610 displays an indication of charge status (e.g., charge status indicator 644 instead of charge status indicator 642) of secondary device 620 while also displaying interface 660 of the active application in response to secondary device 620 being placed on charging device 600 while the active application is displayed.

Figure 6Z:
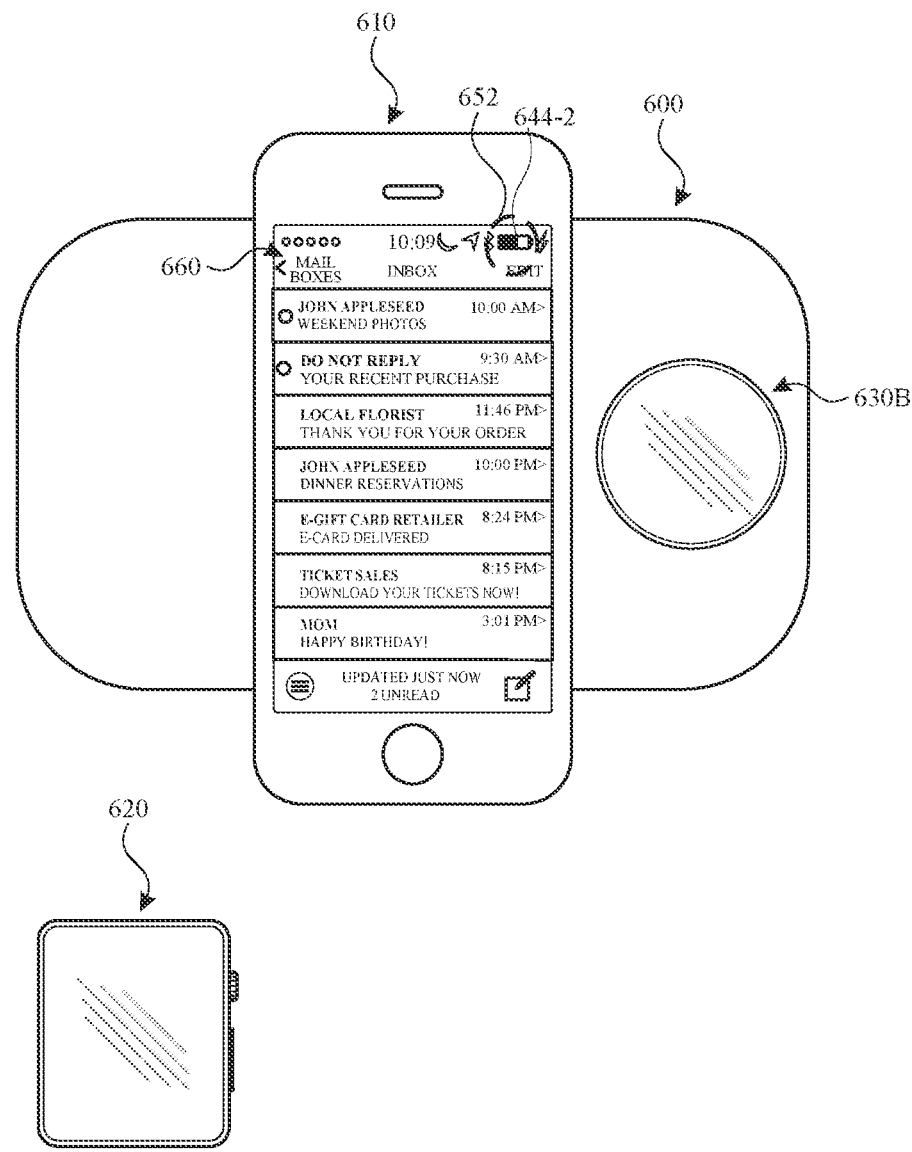
Figure 6A:
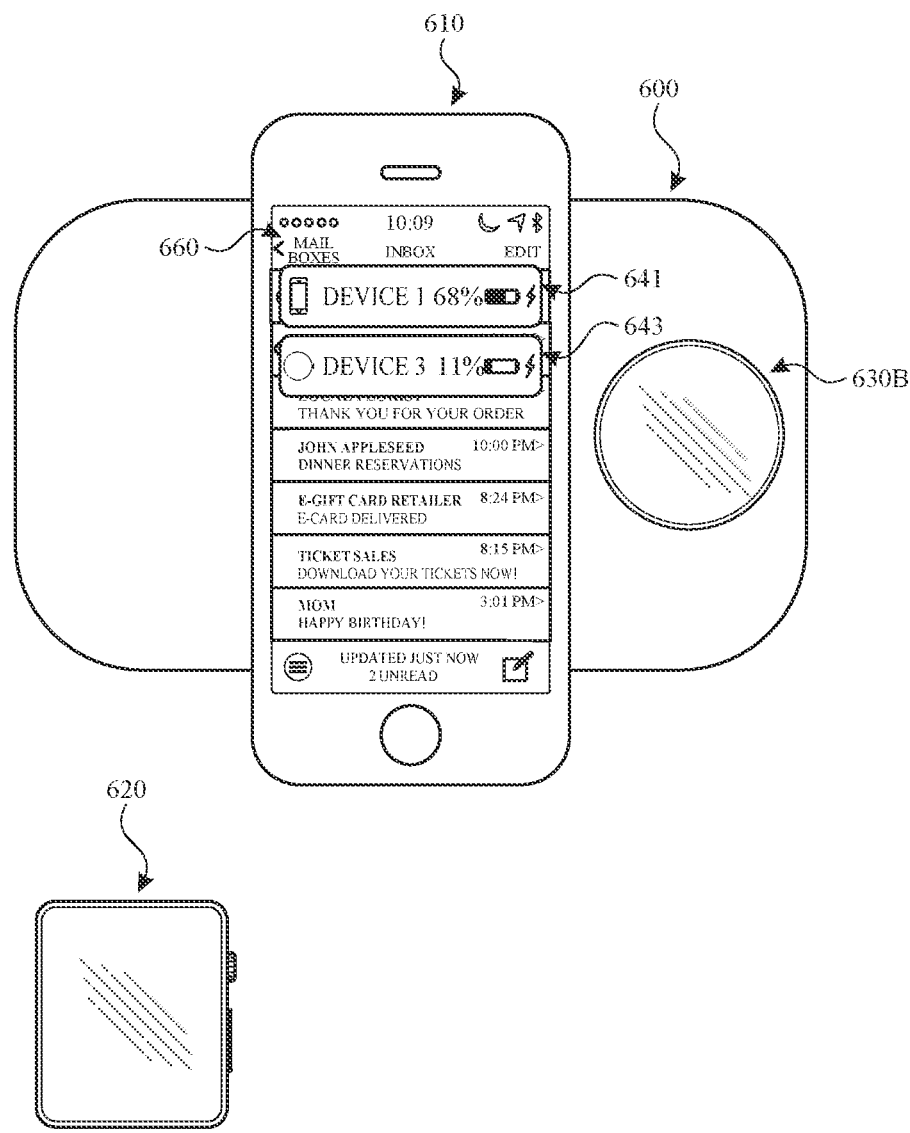
Figure 6A:
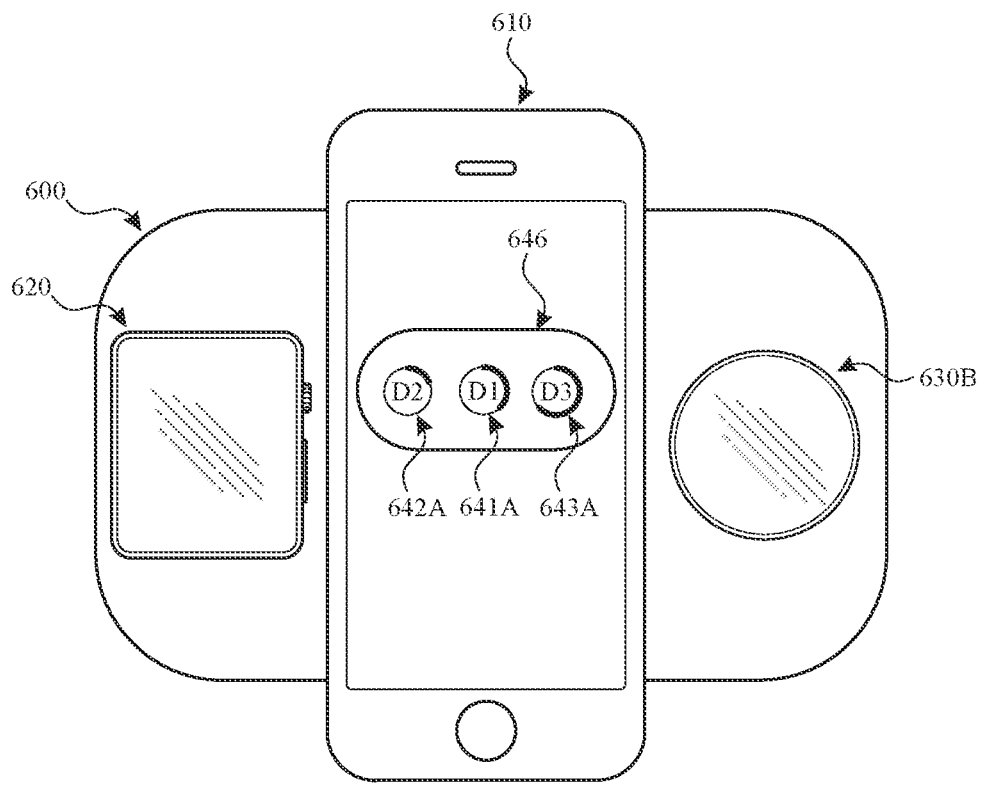
Figure 6A:
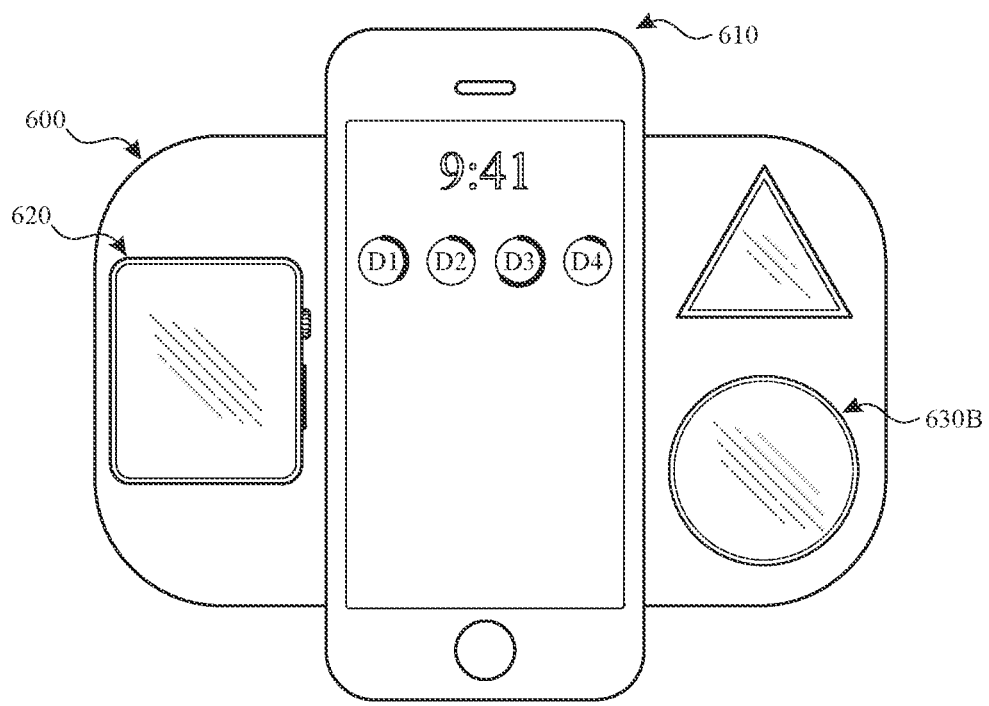
Figure 6A:
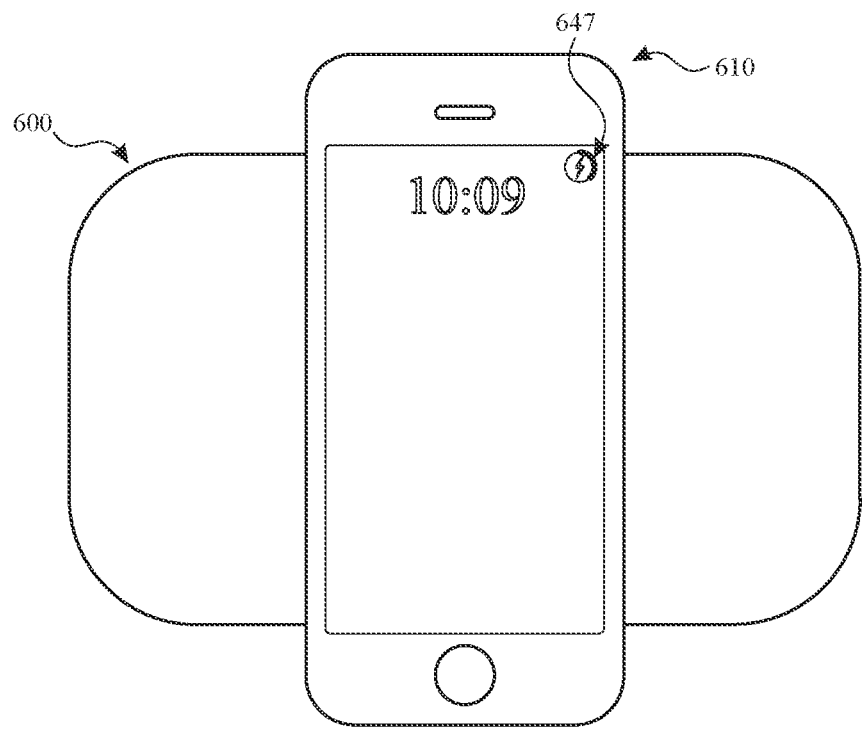
Figure 6A:
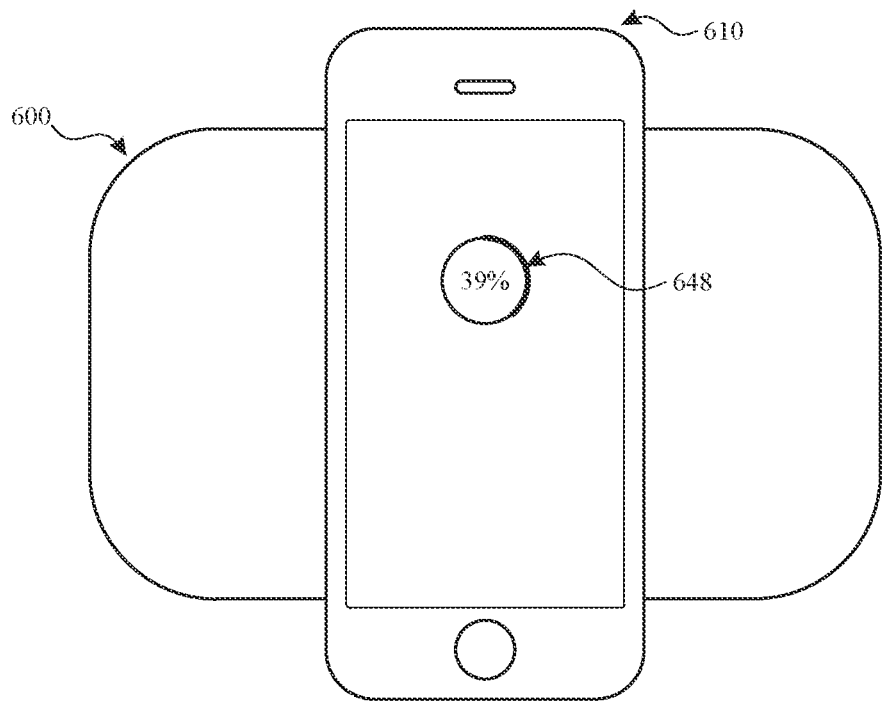
Figure 6A:
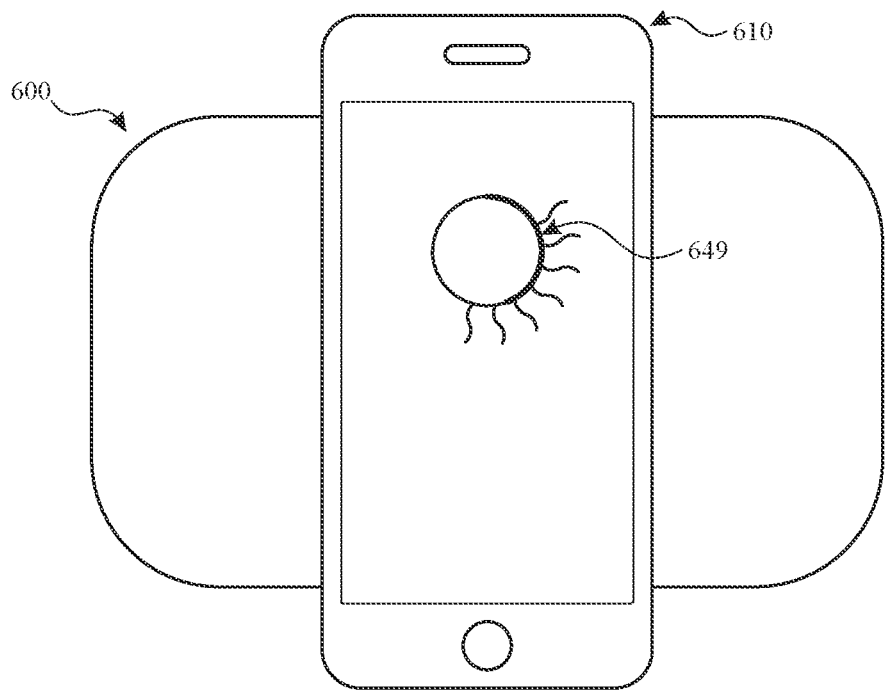
Figure 6A:
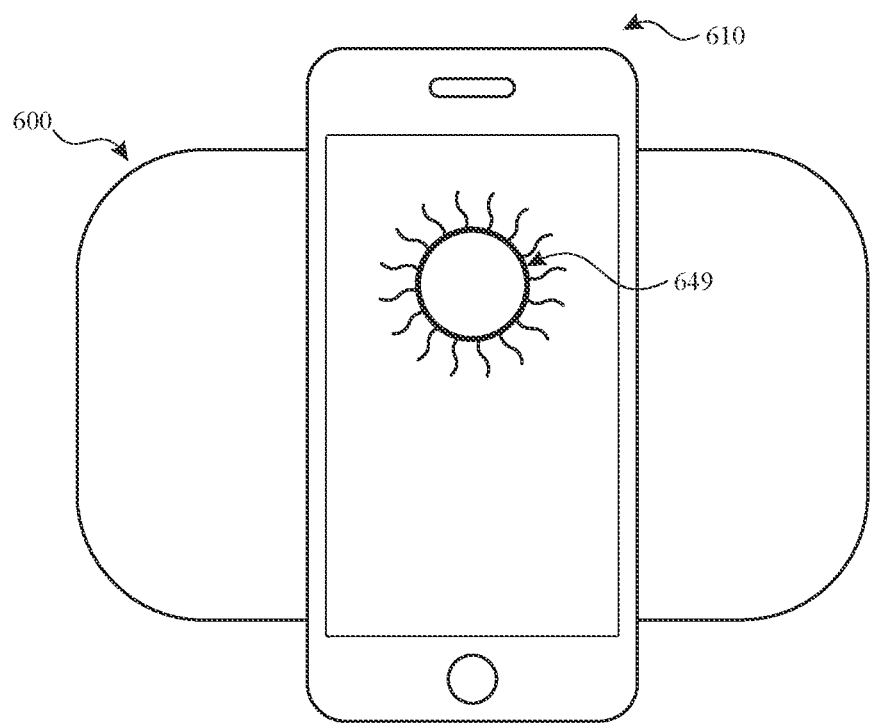
Figure 7A:
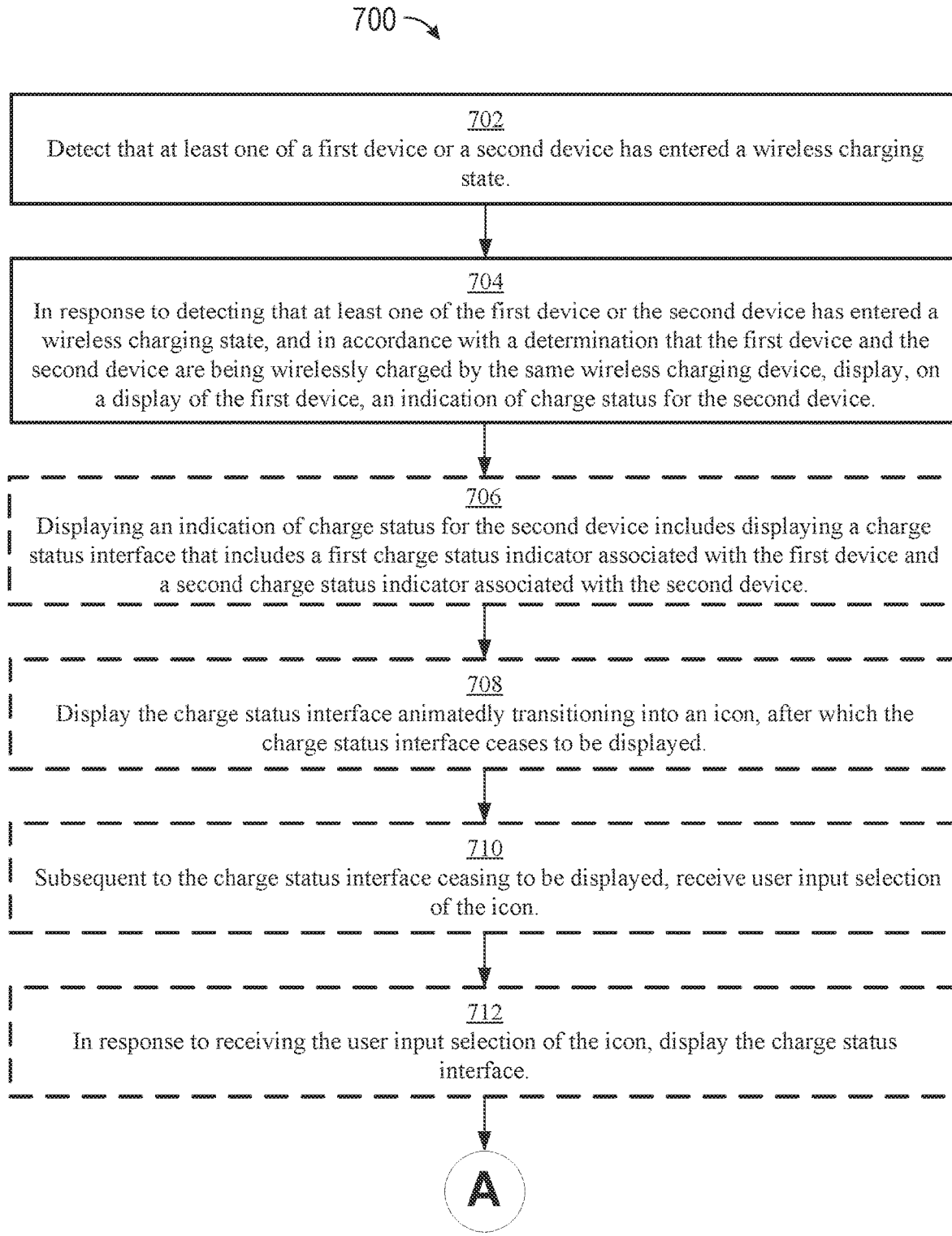
FIGS. 7A-7E are a flow diagram illustrating methods of charging electronic devices in accordance with some embodiments.
Figure 7B:
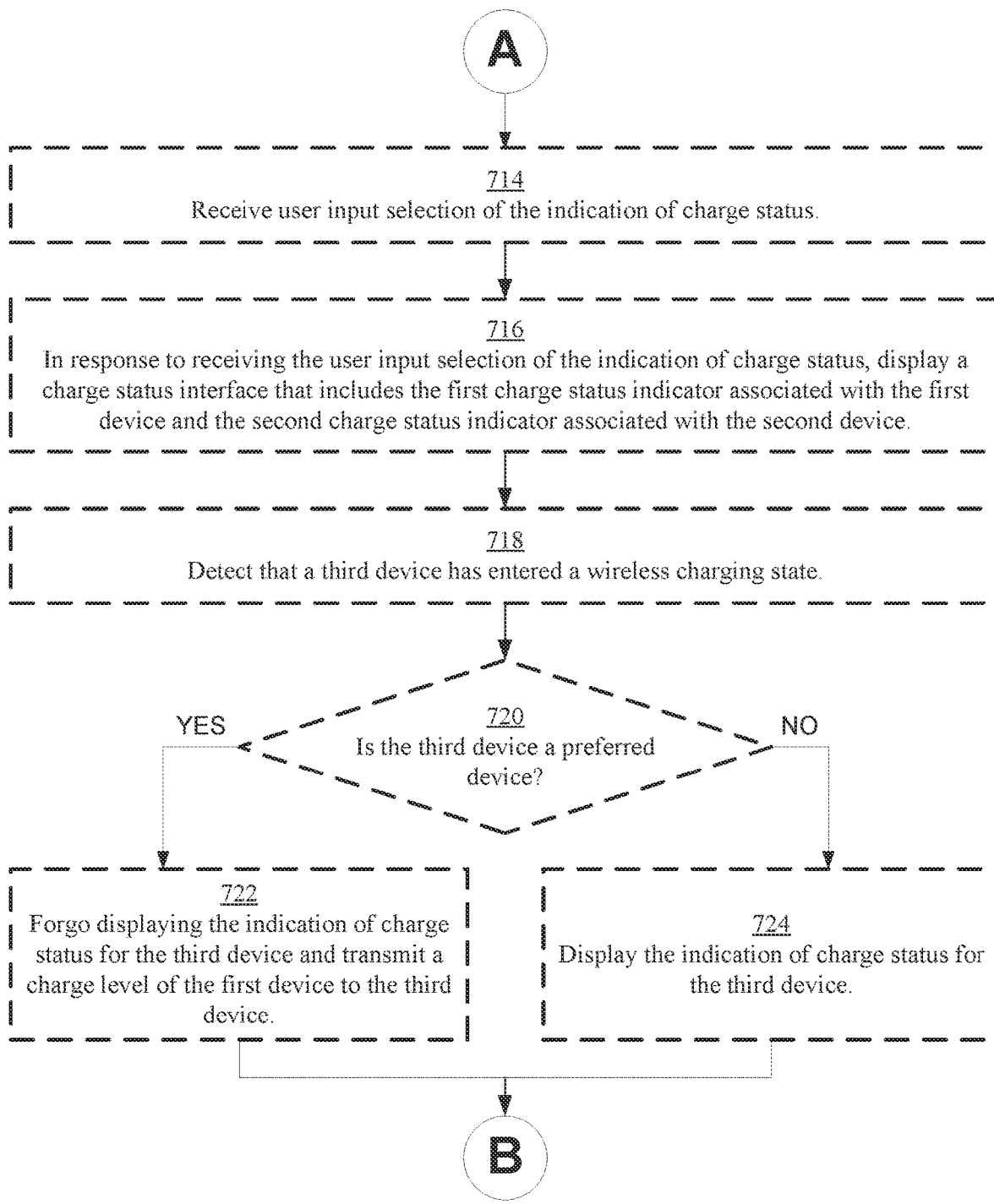
Figure 7C:
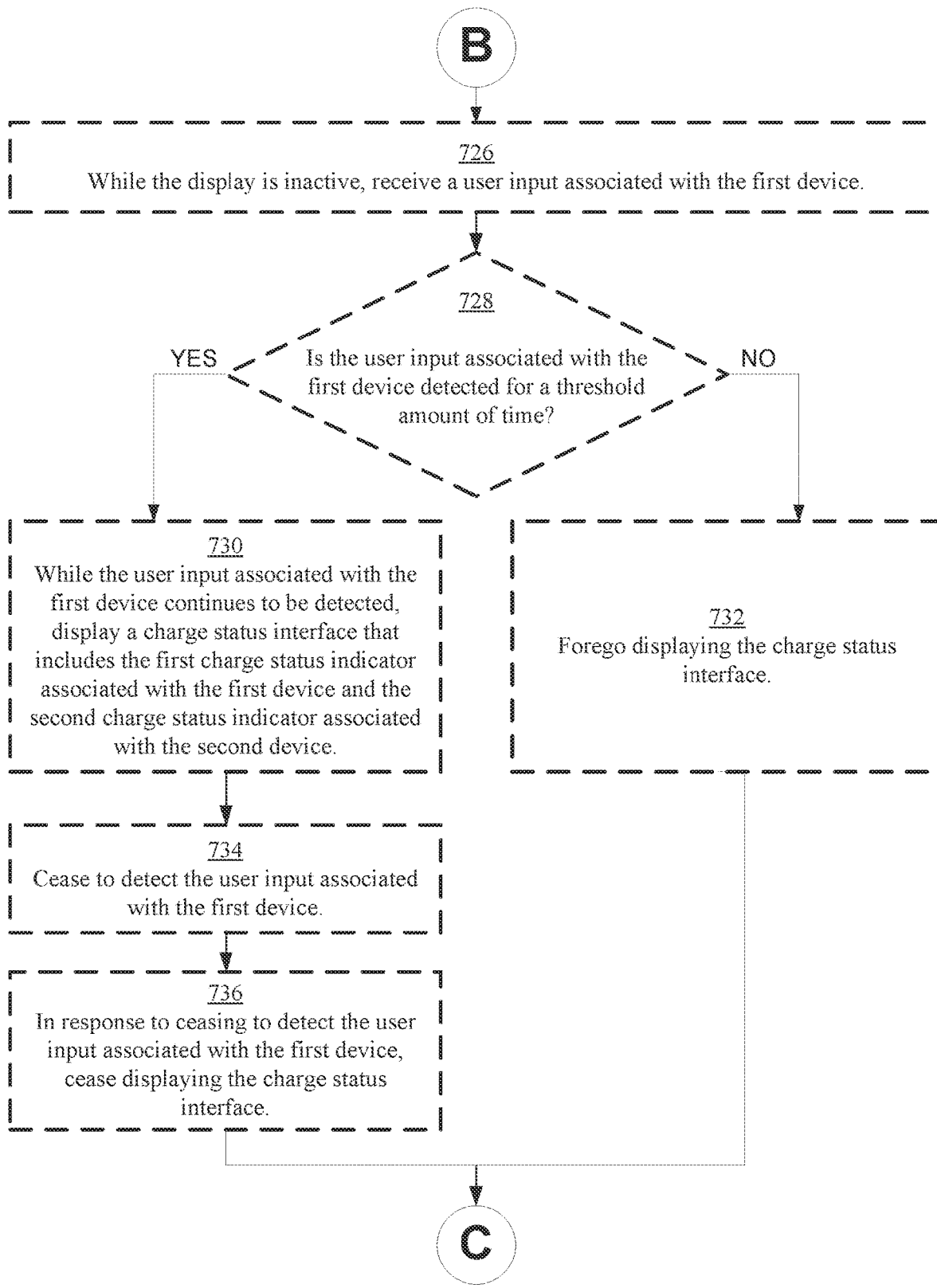
Figure 7D:
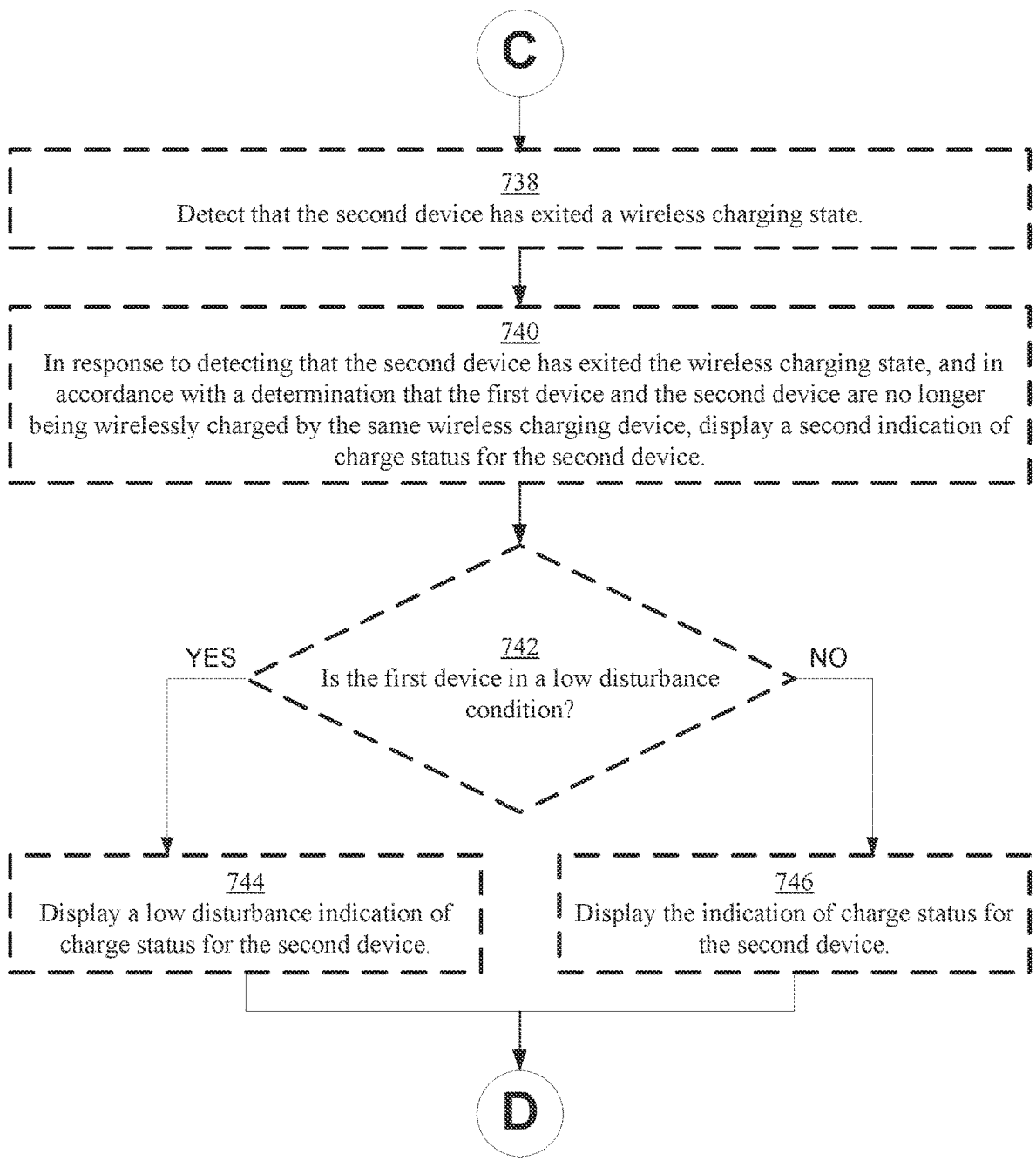
Figure 7E:
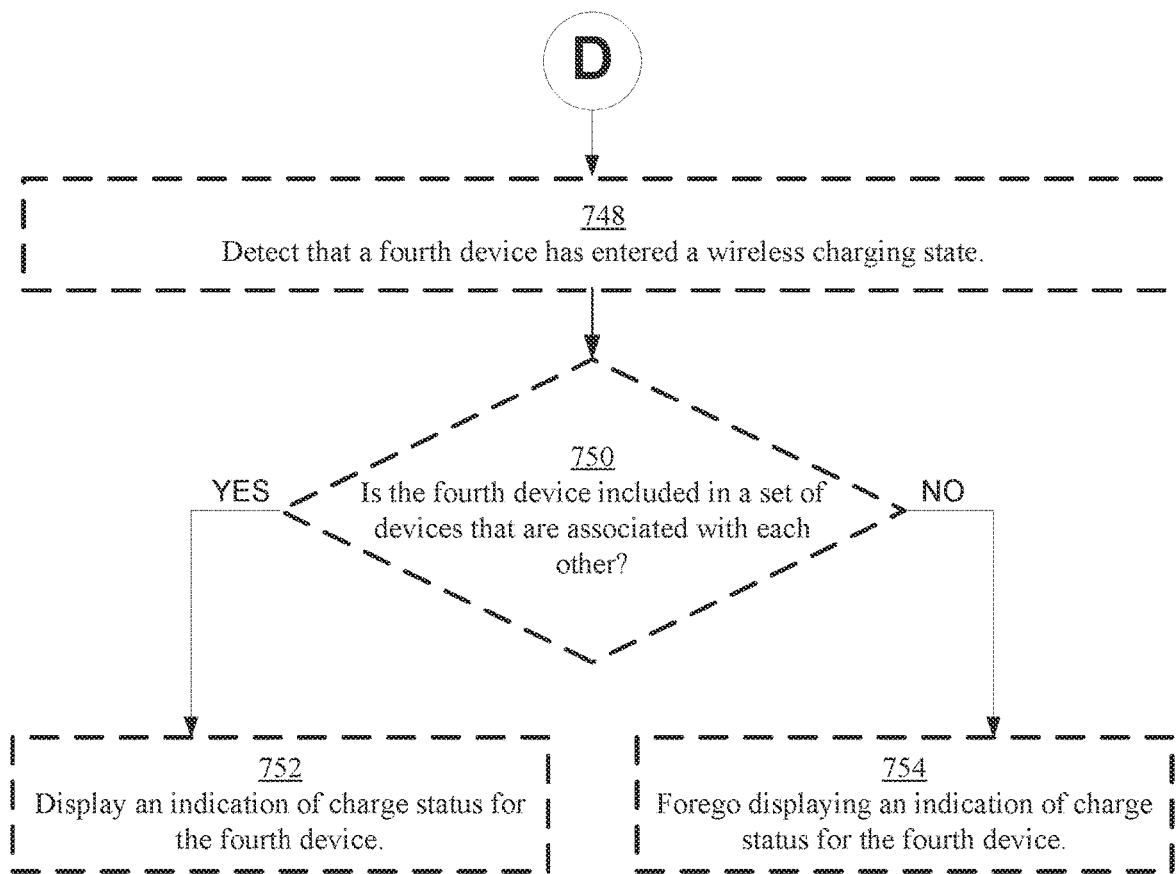

Next, in FIG. 6Z, primary device 610 detects an input 652 on battery icon 644-2. In response, primary device 610 displays charge status indicator 641 and charge status indicator 643 corresponding to primary device 610 and third device 630B, respectively. As shown in the embodiment illustrated in FIG. 6AA, charge status indicator 641 and charge status indicator 643 are visually overlaid on interface 660 of the active application. In some embodiments, primary device 610 displays charge status indicator 641 and charge status indicator 643 overlaid on interface 660 of the active application directly in response to being placed on charging device 600 with third device 630B (e.g., instead of displaying charge status indicator 644 as described with reference to FIG. 6X).

Turning now to FIGS. 6AB-6AG, some embodiments of multi-device charge status interfaces and charge status indicators are described. In FIG. 6AB, primary device 610 indicates the physical positions of the devices on charging device 600 by displaying visual representations (e.g., charge status indicators 641A, 642A, and 643A) of the devices positioned relative to a visual representation (e.g., 646) of the charging device. The positioning of the visual representations reflects the actual physical positioning of the devices on charging device 600. The indications of the physical positions include identifying information of the devices (D1, D2, D3). Thus, a user can look at display 612 of primary device 610 and discern the identity and positioning of each device that is currently wirelessly charging. In addition, charge status indicators 641A, 642A, and 643A indicate the charge level of the respective devices with a ring that is filled in proportion to the percentage charge. FIG. 6AC illustrates an embodiment of a multi-device charge status interface when four devices are being charged by charging device 600.

In FIG. 6AD, charge status indicator 647 includes a lightning bolt icon and a ring that is filled in proportion to the percentage charge. Charge status indicator 648 in FIG. 6AE includes text indicating the percentage charge and a ring that is filled in proportion to the percentage charge. Charge status indicator 649 in FIGS. 6AF-6AG includes a ring that is filled in proportion to the percentage charge and an animated ripple effect (e.g., Ripple effect), where a magnitude of the animated ripple effect is proportional to the percentage charge. In FIG. 6AF, the device is only partially charged, which is indicated by the ring being partially filled and a relatively small ripple effect partially surrounding the ring. By contrast, in FIG. 6AG, the device is fully charged, which is indicated by the ring being completely filled and a relatively large ripple effect completely surrounding the ring.

FIGS. 7A-7E are a flow diagram illustrating a method for charging electronic devices in accordance with some embodiments. Method 700 is performed at a first device (e.g., 100, 300, 500, or 610) with a display (e.g., 612). Optionally, the first device includes a touch-sensitive surface (e.g., a touch-sensitive display). Some operations in method 700 are, optionally, combined, the order of some operations is, optionally, changed, and some operations are, optionally, omitted.

As described below, method 700 provides an intuitive way for charging electronic devices (e.g., determining the charge level of one or more devices). The method reduces the cognitive burden on a user for charging electronic devices, thereby creating a more efficient human-machine interface. For battery-operated computing devices, enabling a user to charge electronic devices faster and more efficiently improves the user experience, conserves power, and increases the time between battery charges.

At block 702, the first device detects that at least one of the first device (e.g., 610) or a second device (e.g., 620) has entered a wireless charging state. In some embodiments, in response to detecting that the first device has entered a wireless charging state, the first device provides a haptic output (e.g., 800). Providing a haptic output in response to detecting that the first device has entered a wireless charging state provides the user with feedback that the first device has successfully started charging and reduces the number of inputs by providing charging information without the user having to activate or view the display. Providing improved feedback to the user and reducing the number of inputs needed to perform an operation enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 704, in response to detecting that at least one of the first device or the second device has entered a wireless charging state, and in accordance with a determination that the first device and the second device are being wirelessly charged by the same wireless charging device (e.g., 600), the first device displays, on the display, an indication of charge status for the second device (e.g., 642). In some embodiments, displaying an indication of charge status for the second device includes displaying a visual indication (e.g., 642) that the at least one of the first device or the second device has entered a wireless charging state. In some embodiments, the first device displays, on the display, a charge status indicator, where the indication of charge status for the second device is an animation associated with the charge status indicator (e.g., FIG. 6H). Displaying an indication of charge status for the second device on the display of the first device provides improved feedback to the user about the charge status of the second device by allowing charge status to be provided on a device that is better suited for providing charge status information, especially when the second device (e.g., a pair of earbuds) does not include a display or has limited means for providing charge status. It also reduces the number of inputs needed to obtain the charge status of the second device by reducing or eliminating the need to provide a separate input at the second device to obtain the charge level of the second device. The benefits of providing improved feedback to the user and reducing the number of inputs required to perform an operation are described above.

Optionally, at block 706, displaying an indication of charge status for the second device includes displaying a charge status interface (e.g., 640) that includes a first charge status indicator (e.g., 641) associated with the first device and a second charge status indicator (e.g., 642) associated with the second device. Displaying charge status indicators of both the first device and the second device provides improved feedback by allowing for charge status of multiple devices to be displayed on a single device. Displaying the indication of charge status of multiple devices on a single display reduces the number of inputs needed to obtain the charge status of each device by reducing or eliminating the need to provide separate inputs at each device to obtain the individually charge levels. The benefits of providing improved feedback to the user and reducing the number of inputs required to perform an operation are described above.

In some embodiments, displaying the charge status interface includes displaying the first charge status indicator and the second charge status indicator in an ordered arrangement (e.g., vertically) on the display. In some embodiments, the ordered arrangement is a predetermined arrangement based on a type of device associated with each respective charge status indicator. In some embodiments, the ordered arrangement is based at least in part on an order in which each respective device entered a wireless charging state. Ordering the arrangement based on the order in which each respective device entered a wireless charging state improves feedback to the user by placing the information that is likely to be most relevant (e.g., the charge level of the most recently charged device) in a more prominent position. The benefits of providing improved visual feedback to the user are described above.

In some embodiments, displaying the charge status interface includes displaying, on the display, the first charge status indicator that includes a charge level for the first device (e.g., 641-1A or 641-1B) and an indication that the first device is currently charging (e.g., 641-1C). In some embodiments, displaying the charge status interface includes displaying, on the display, the second charge status indicator that includes a charge level for the second device and an indication that the second device is currently charging. In some embodiments, displaying a charge level for a device includes displaying one or more of: a textual indication of charge level (e.g., 644-1), a graphical indication of charge level (e.g., 644-2), an animation representative of charge level (e.g., 649), and a color-based indication representative of charge level.

Optionally, at block 708, the first device displays, on the display, the charge status interface animatedly transitioning into an icon (e.g., 644-2), after which the charge status interface ceases to be displayed (e.g., FIGS. 6I-6K). Optionally, at block 710, subsequent to the charge status interface ceasing to be displayed, the first device receives user input selection of the icon (e.g., 650). Optionally, at block 712, in response to receiving the user input selection of the icon, the first device displays, on the display, the charge status interface (e.g., FIGS. 6K-6M). Ceasing to display the charge status interface and then displaying it again in response to selection of an icon allow a user to easily access charge status information without cluttering the user interface with persistent charge status information, which may interfere with other information on the display. Providing additional control options without cluttering the interface with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to detecting that at least one of the first device or the second device has entered a wireless charging state, the first device displays, on the display, an interface of an active application (e.g., 660), and displaying the indication of charge status includes concurrently displaying, on the display, the indication of charge status (e.g., 644) and the interface of the active application. Optionally, the indication of charge status is visually overlaid on the interface of the active application (e.g., FIG. 6AA).

In some embodiments, the indication of charge status is a selectable affordance (e.g., 644-2). Optionally, at block 714, the first device receives user input selection of the indication of charge status (e.g., 652). Optionally, at block 716, in response to receiving the user input selection of the indication of charge status, the first device displays, on the display, a charge status interface that includes the first charge status indicator (e.g., 641) associated with the first device and the second charge status indicator (e.g., 642) associated with the second device.

Optionally, at block 718, the first device detects that a third device (e.g., 630A or 630B) has entered a wireless charging state. In some embodiments, in response to detecting that the third device has entered a wireless charging state, and in accordance with a determination that the first device and the third device are being wirelessly charged by the same wireless charging device, the first device displays, on the display, an indication (e.g., 643) of charge status for the third device. Optionally, at block 720, in response to detecting that the third device has entered a wireless charging state, the first device determines whether the third device is a preferred device. In some embodiments, determining whether the third device is a preferred device comprises determining whether the third device is a device that includes a larger display than the display of the first device. Optionally, at block 722, in accordance with a determination that the third device is a preferred device, the first device forgoes displaying the indication of charge status for the third device (e.g., FIG. 6R) and transmits a charge level of the first device to the third device (e.g., for display on the third device). Optionally, at block 724, in accordance with a determination that the third device is not a preferred device, the first device displays, on the display, the indication of charge status for the third device (e.g., FIG. 6S).

Determining whether the third device is a preferred device (e.g., based on display size) and transmitting the charge level of the first device to the third device provides improved feedback to the user about the charge status of the first and third device by allowing the charge status of at least the two devices to be provided on a device (e.g., the third device) that is better suited (e.g., preferred) for providing charge status information. It also reduces the number of inputs needed to obtain the charge status of both the first device and the third device by reducing or eliminating the need to provide a separate input at each device to obtain the respective charge levels. The benefits of providing improved feedback to the user and reducing the number of inputs required to perform an operation are described above.

In some embodiments, subsequent to displaying the indication of charge status for the second device, and while first device and the second device are being wirelessly charged by the same wireless charging device, the first device ceases to display the indication of charge status for the second device (e.g., FIG. 6N). Optionally, at block 726, while the display is inactive, the first device receives a user input (e.g., 651) associated with the device. In some embodiments, in response to receiving the user input associated with the device, the first device displays, on the display, the indication of charge status for the second device (e.g., FIG. 6P). In some embodiments, the indication of charge status for the second device is a visual indication (e.g., flashing or enlarging) associated with a charge status indicator (e.g., 644). In some embodiments, the first device receives user input selection of the charge status indicator (e.g., 650). In some embodiments, in response to receiving the user input selection of the charge status indicator, the first device displays, on the display, a charge status interface (e.g., 640) that includes the first charge status indicator (e.g., 641) associated with the first device and the second charge status indicator (e.g., 642) associated with the second device.

Optionally, at block 728, in response to receiving the user input associated with the device, the first device determines whether the user input associated with the device is detected for a threshold amount of time. Optionally, at block 730, in accordance with a determination that the user input associated with the device is detected for a threshold amount of time, and while the user input associated with the device continues to be detected, the first device displays, on the display, a charge status interface that includes the first charge status indicator associated with the first device and the second charge status indicator associated with the second device (e.g., FIG. 6P). Optionally, at block 732, in accordance with a determination that the user input associated with the device is not detected for a threshold amount of time, the first device forgoes displaying, on the display, the charge status interface. Optionally, at block 734, in accordance with a determination that the user input associated with the device is detected for a threshold amount of time, the first device ceases to detect the user input associated with the device. Optionally, at block 736, in response to ceasing to detect the user input associated with the device, the first device ceases displaying the charge status interface.

Optionally, at block 738, the first device detects that the second device has exited a wireless charging state (e.g., FIG. 6T). Optionally, at block 740, in response to detecting that the second device has exited the wireless charging state, and in accordance with a determination that the first device and the second device are no longer being wirelessly charged by the same wireless charging device, the first device displays, on the display, a second indication of charge status for the second device (e.g., highlighting of 642 in FIG. 6T). In some embodiments, displaying the second indication of charge status for the second device includes displaying a visual indication that the second device has exited a wireless charging state (e.g., removal of 642 in FIGS. 6U-6V).

Optionally, at block 742, in response to detecting that at least one of the first device or the second device has entered a wireless charging state, and in accordance with a determination that the first device and the second device are being wirelessly charged by the same wireless charging device, the first device determines whether the first device is in a low disturbance condition. Optionally, at block 744, in accordance with a determination that the first device is in a low disturbance condition, the first device displays, on the display, a low disturbance indication of charge status for the second device (e.g., 642 or 644 with a red-shifted and/or lower amount of light output). Optionally, at block 746, in accordance with a determination that the first device is not in a low disturbance condition, the first device displays, on the display, the indication of charge status for the second device (e.g., 642).

In some embodiments, the first device and the second device are included in a set of devices associated with each other. In some embodiments, the set of devices associated with each other includes one or more of: devices that are paired with at least one other device in the set, and devices that are associated with the same user account. Optionally, at block 748, the first device detects that a fourth device has entered a wireless charging state. Optionally, at block 750, the first device determines whether the fourth device is included in the set of devices associated with each other. Optionally, at block 752, in response to detecting that the fourth device has entered a wireless charging state, in accordance with a determination that the first device and the fourth device are being wirelessly charged by the same wireless charging device, and in accordance with a determination that the fourth device is included in the set of devices associated with each other, the first device displays, on the display, an indication (e.g., 642, 643, or 644) of charge status for the fourth device. Optionally, at block 754, in response to detecting that the fourth device has entered a wireless charging state, in accordance with a determination that the first device and the fourth device are being wirelessly charged by the same wireless charging device, and in accordance with a determination that the fourth device is not included in the set of devices associated with each other, the first device forgoes displaying, on the display, an indication of charge status for the fourth device.

In some embodiment, while the first device and the second device are being wirelessly charged by the same wireless charging device, the first device displays, on the display, an indication of charge status for the second device at predetermined intervals of time.

In some embodiment, the first device and the second device are connected via a communication link. In some embodiment, the first device receives, from the second device via the communication link, data representing a charge status of the second device.

In some embodiments, further in response to detecting that at least one of the first device or the second device has entered a wireless charging state, and in accordance with a determination that the first device and the second device are being wirelessly charged by the same wireless charging device, the first device displays, on the display, an indication of the physical position of the second device on the wireless charging device (e.g., 642A in FIG. 6AB).

Note that details of the processes described above with respect to method 700 (e.g., FIGS. 7A-7E) are also applicable in an analogous manner to the methods described below. For example, method 900 optionally includes one or more of the characteristics of the various methods described above with reference to method 700. For example, the display of an indication of charge status for a second device as described above with reference to block 704 of method 700 can be provided in addition to the non-visual indication(s) described in method 900. Similarly, the non-visual indication(s) described in method 900 can be provided in addition to the display of an indication of charge status for a second device as described above with reference to block 704 of method 700. For brevity, these details are not repeated below.

Figure 8A:
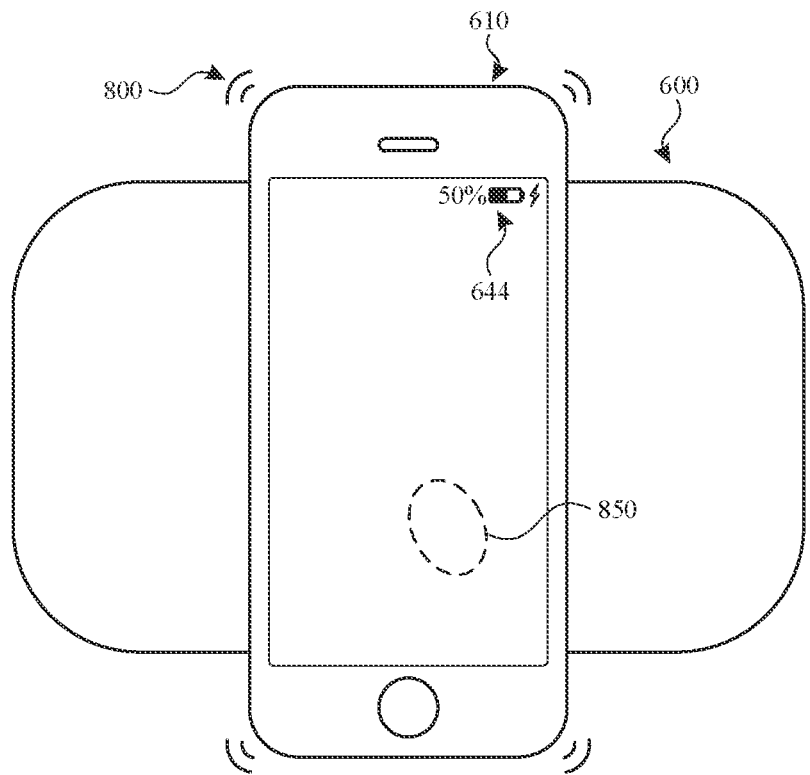
FIGS. 8A-8E illustrate exemplary user interfaces for charging electronic devices in accordance with some embodiments.

Turning now to FIGS. 8A-8E, techniques and non-visual interfaces for communicating the charge level of an electronic device are described. FIG. 8A illustrates charging device 600 and primary device 610 described above with reference to FIGS. 6A-6AG. Primary device 610 is charging on device 610 and displays charge status indicator 644, which indicates that primary device 610 has a first charge level of 50%. While charging on charging device 600 at the first charge level, primary device 610 receives user input 850 (e.g., a tap on display 612) representing a request for a charge level (e.g., a charge level of primary device 610). In response to receiving user input 850, primary device 610 outputs a first non-visual indication 800 (e.g., an audible tone and/or a haptic vibration) of the first charge level of primary device 610. A type (e.g., audible or haptic) or characteristic (e.g., amplitude, frequency, duration, modulation pattern) of first non-visual indication 800 is represented by the number of curves (e.g., two curves) adjacent to each corner of primary device 610. In some embodiments, first non-visual indication 800 is output in response to a transition of a wireless charging state of primary device 610 (e.g., placing primary device 610 onto charging device 600 or removing primary device 610 from charging device 600).

Figure 8B:
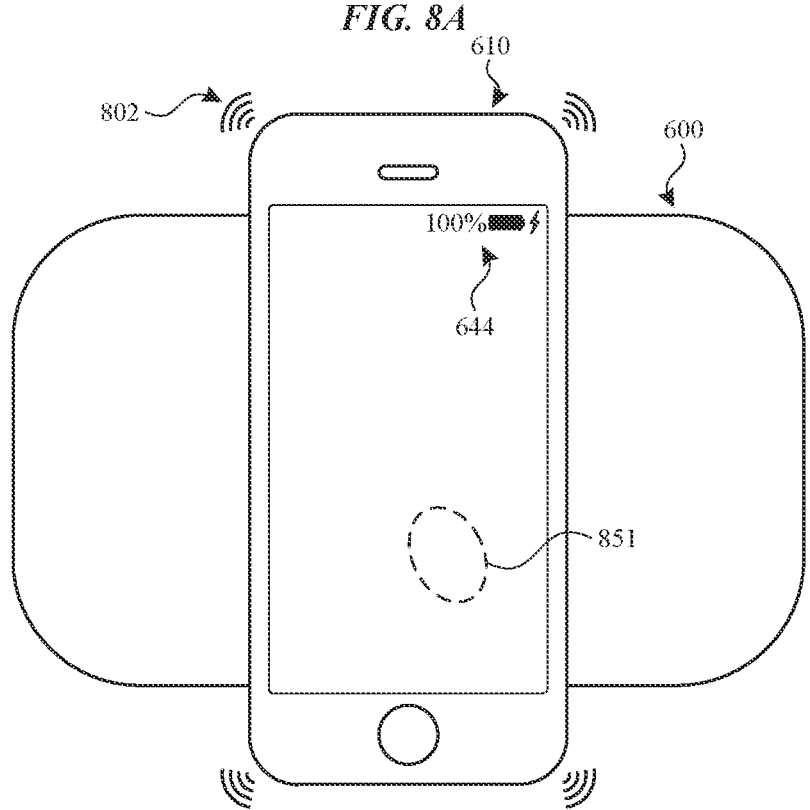
Figure 9A:
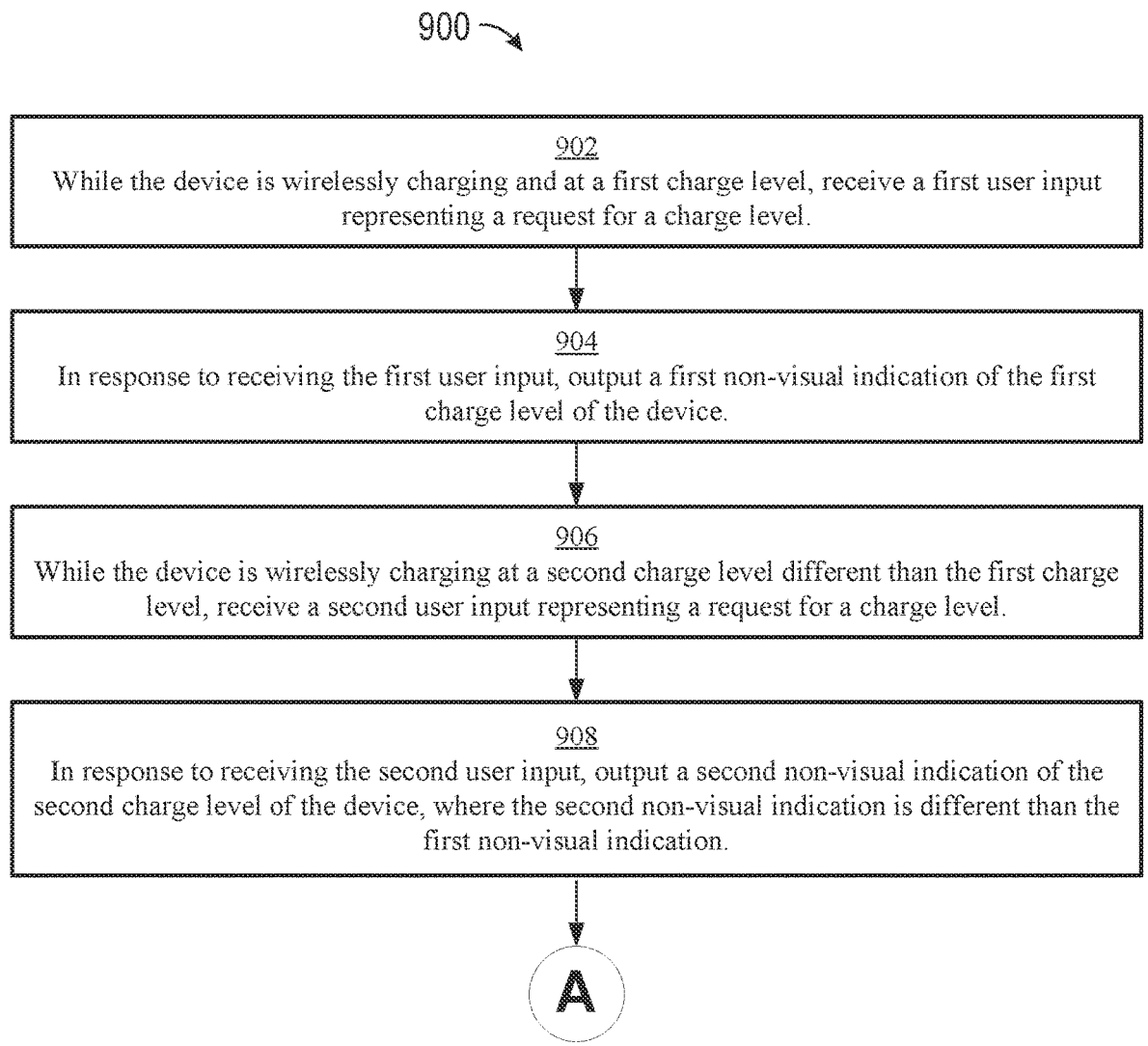
FIGS. 9A-9B are a flow diagram illustrating methods of charging electronic devices in accordance with some embodiments.
Figure 9B:
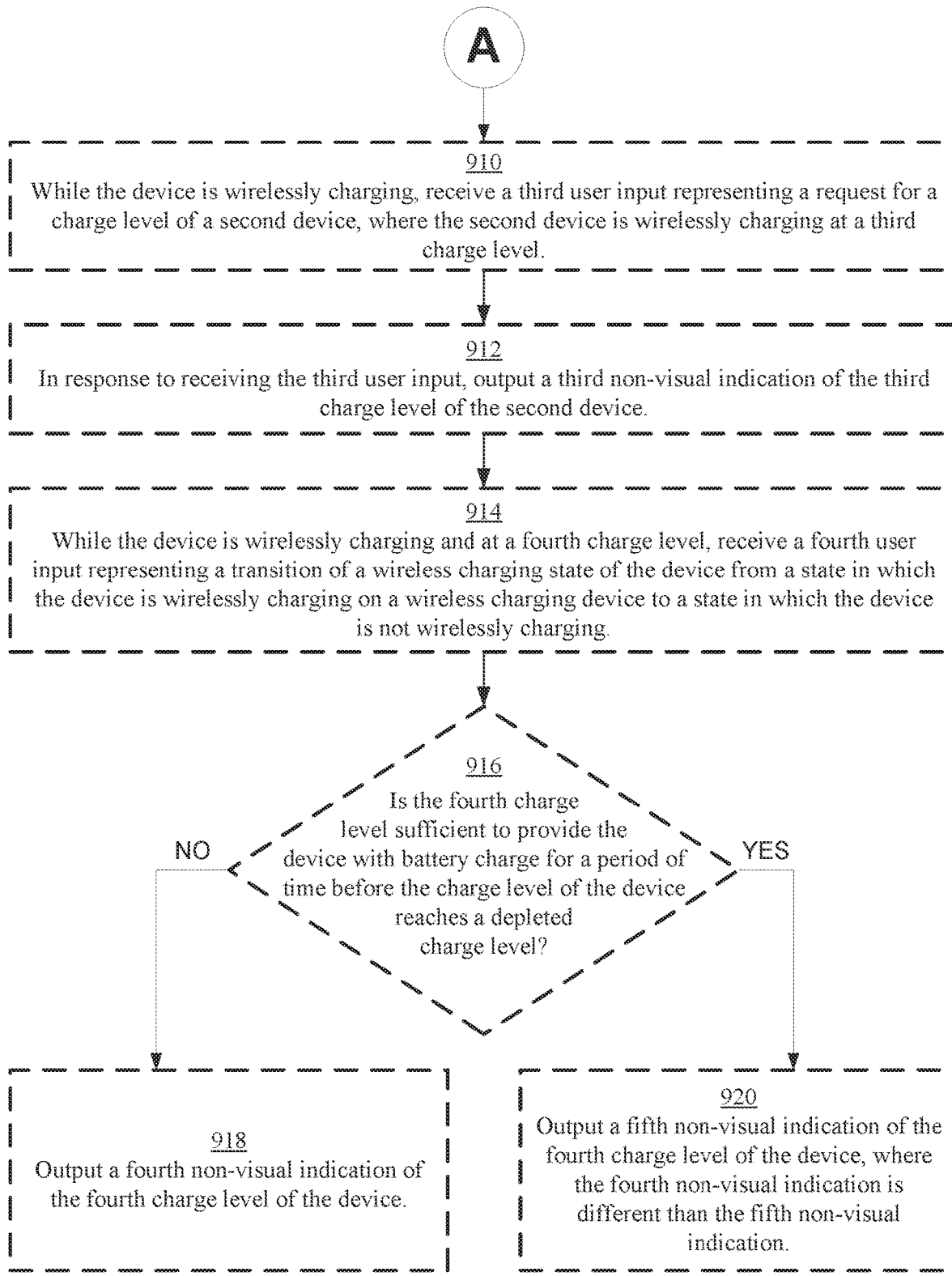

FIG. 8B illustrates primary device 610 charging on charging device 600 at a second charge level of 100% (e.g., after the device has been charging for some length of time since user input 850). While primary device 610 is charging on charging device 600 at the second charge level, primary device 610 receives user input 851 (e.g., a tap on display 612) representing another request for a charge level. In response to receiving user input 851, primary device 610 outputs a second non-visual indication 802 (e.g., an audible tone and/or a haptic vibration) of the second charge level of primary device 610. A type or characteristic of second non-visual indication 802 is again represented by the number of curves (e.g., four curves) adjacent to each corner of primary device 610. In some embodiments, second non-visual indication 802 is output in response to a transition of a wireless charging state of primary device 610 (e.g., placing primary device 610 onto charging device 600 or removing primary device 610 from charging device 600).

As shown in FIGS. 8A-8B, since the second charge level (100%) is different than the first charge level (50%), second non-visual indication 802 is different (e.g., includes a different type of indication or a different characteristic) than first non-visual indication 800. In some embodiments, second non-visual indication 802 and first non-visible indication 800 include the same type of indication (e.g., both include a haptic output or both include an audio output) but differ with respect to one or more characteristics (e.g., they have different amplitudes, frequencies, durations, and/or modulation patterns). In some embodiments, second non-visual indication 802 and first non-visible indication 800 include different types of indications.

Although user inputs 850 and 851 are described above as taps on display 612, in some embodiments, a request for a charge level includes a tap and hold on display 612, placing and holding a hand on display 612, or a user input voice command (e.g., "Hey Siri, what's my device's charge level?"). In some embodiments, before outputting a non-visual indication, primary device 610 determines whether the user input includes a touch input that is detected continuously for a threshold length of time and then outputs the indication in accordance with a determination that the touch input is detected continuously for the threshold length of time. In some embodiments, primary device 610 responds to a request for a charge level of primary device 610 when not charging on charging device 600.

In some embodiments, the non-visual indications include a haptic output representative of the current charge level of primary device 610. Optionally, one or more output characteristics of the haptic output depend on the charge level of primary device 610. Exemplary output characteristics of the haptic output include: a length of time of the haptic output, a number of discrete haptic pulses of the haptic output, and a frequency between discrete haptic pulses of the haptic output. In some embodiments, the length of the haptic output indicates (e.g., is directly proportional to) the level of charge. In one example applied to the charge levels described in FIGS. 8A-8B, since the second charge level is greater than the first charge level, first non-visual indication 800 includes a first haptic output for a first length of time and second non-visual indication 802 includes a second haptic output for a second length of time that is longer than the first length of time. In some embodiments, primary device 610 provides a series of decaying haptic taps to indicate a relatively low charge level and a series of haptic buzzes with increasing frequency to indicate a relatively higher charge level. In one example applied to the charge levels described in FIGS. 8A-8B, first non-visual indication 800 includes a first plurality of discrete haptic pulses that are provided with a decaying frequency between pulses, and second non-visual indication 802 includes a second plurality of discrete haptic pulses that are provided with an increasing frequency between pulses.

In some embodiments, the non-visual indications include an audible output representative of the current charge level of primary device 610. Optionally, one or more output characteristics of the audible output depend on the charge level of primary device 610. Exemplary output characteristic of the audible output include: a length of time of the audible output, a number of discrete audible signals of the audible output, a volume of the audible output, a modulation pattern, and a frequency of the audible output. In some embodiments, primary device 610 provides a short audible tone to indicate a relatively low charge level and a longer audible tone to indicate a relatively higher charge level (e.g., the length of the tone is proportional to charge, or discrete lengths of multiple tones are based on charge level threshold(s)). In one example applied to the charge levels described in FIGS. 8A-8B, first non-visual indication 800 includes a first audible output having a first length of time, and second non-visual indication 802 includes a second audible output having a second length of time that is longer than the first length of time. In some embodiments, the frequency of an audible tone indicates charge level (e.g., the frequency of the tone is directly proportional to charge level). In one example applied to the charge levels described in FIGS. 8A-8B, first non-visual indication 800 includes an audio signal having a first characteristic frequency, and second non-visual indication 802 includes an audio signal having a second characteristic frequency that is higher than the first characteristic frequency.

Figure 8C:
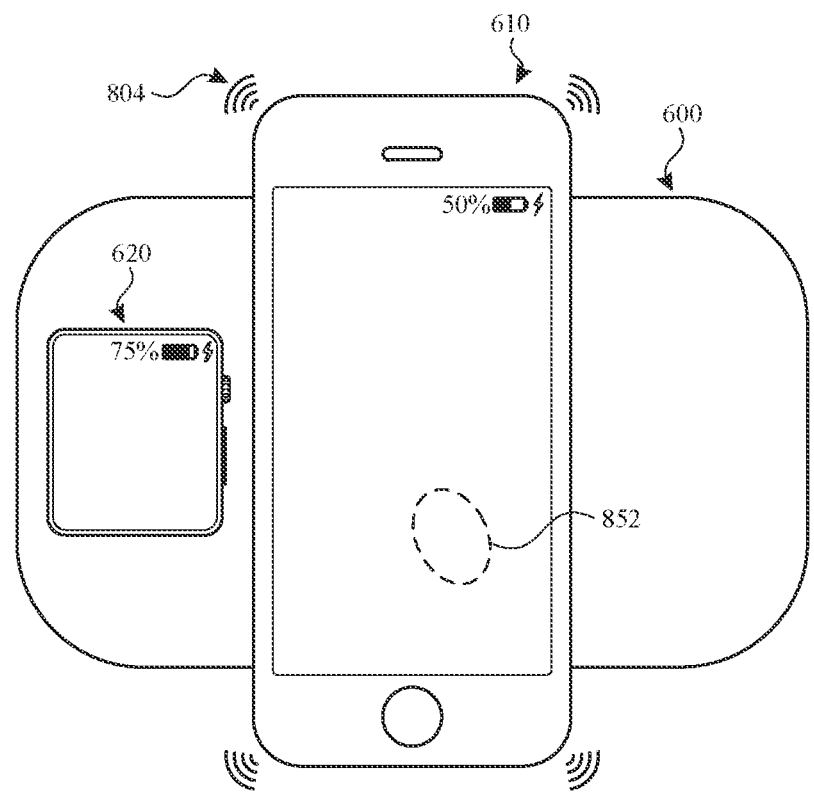

Turning now to FIG. 8C, while primary device 610 is charging on charging device 600, secondary device 620 is placed on charging device 600. Secondary device 620 has a charge level of 75%. Primary device 610 receives user input 852 (e.g., a tap on display 612) representing a request for a charge level of secondary device 620. In some embodiments, user input 852 includes a tap and hold on display 612, placing and holding a hand on display 612, or a user input voice command (e.g., "Hey Siri, how's the charge on my Apple Watch?").

In response to receiving user input 852, primary device 610 outputs non-visual indication 804 of the charge level of secondary device 620. In some embodiments, one or more of the techniques, features, and/or characteristics described above with respect to first and second non-visual indications 800 and 802 are applied to non-visual indication 804 to represent the charge level of secondary device 620. In some embodiments, non-visual indication 804 of the charge level of secondary device 620 is output in response to a transition of a wireless charging state of secondary device 620 (e.g., placing secondary device 620 onto charging device 600 or removing secondary device 620 from charging device 600).

Figure 8D:
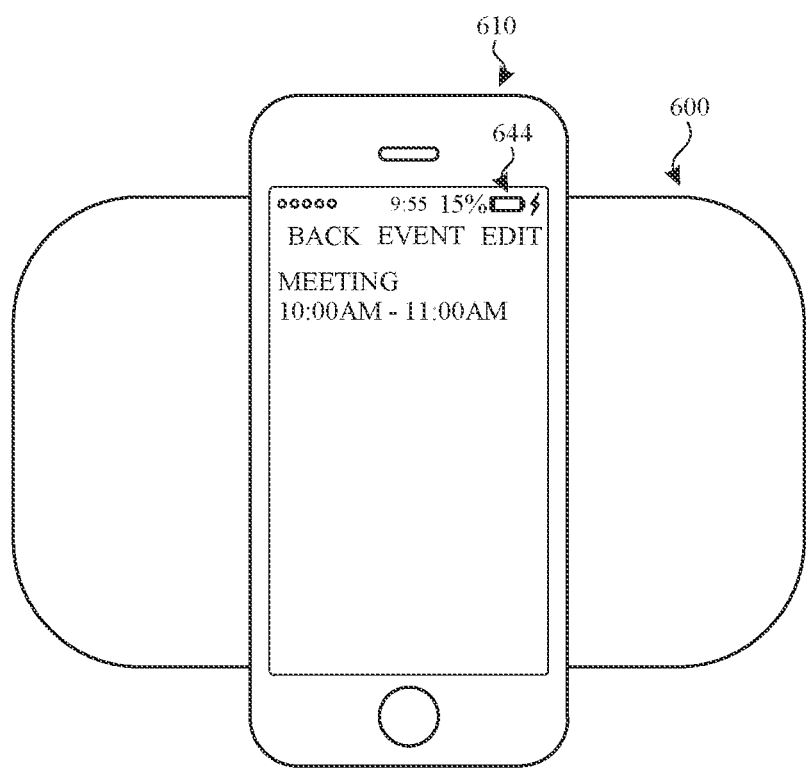
Figure 8E:
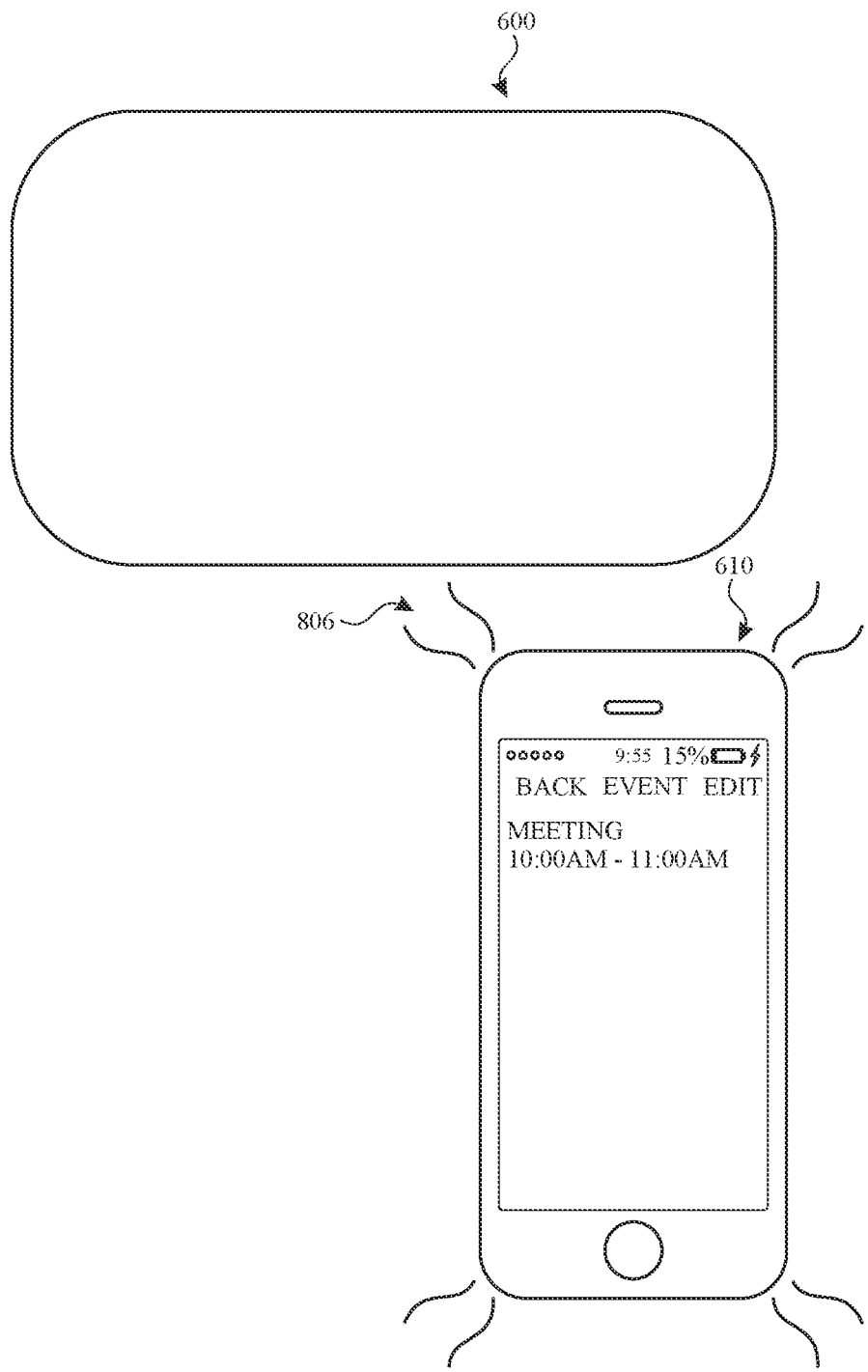

Turning now to FIGS. 8D-8E, techniques for providing a low-charge warning are described. FIG. 8D illustrates primary device 610 charging on charging device 600 and displaying a calendar application. Primary device 610 shows a time of 9:55 and the calendar application shows that there is a meeting scheduled for 10:00 AM to 11:00 AM. Charge status indicator 644 indicates that primary device 610 has a charge level of 15%.

In response to being removed from charging device 600, as shown in FIG. 8E (e.g., primary device 610 transitions from a state of wirelessly charging to a state in which it is not wirelessly charging), primary device 610 estimates whether the current charge level of primary device 610 (15%) is sufficient to provide primary device 610 with battery charge for a period of time before the charge level of primary device 610 reaches a depleted charge level (e.g., 0%, 5%, 10%, etc.). In the illustrated example, primary device 610 determines the period of time based on calendar data associated with primary device 610 (e.g., events on the calendar application, a user's calendar linked to primary device 610, or data from a user account logged into on primary device 610). Accordingly, primary device 610 estimates whether the 15% charge of primary device 610 is sufficient to provide primary device 610 with battery charge through the calendared meeting (e.g., for one hour and five minutes) before the charge level reaches the depleted charge level.

In accordance with an estimation that the charge level is sufficient, primary device 610 outputs a non-visual indication of the charge level of primary device 610 in accordance with one of the techniques described above (e.g., a normal audible or haptic output). In accordance with an estimation that the current charge level is not sufficient, primary device 610 outputs non-visual indication 806 (e.g., an audible or haptic low-charge alert) that represents the low charge level of primary device 610. In one example, non-visual indication 806 includes an audible voice output such as, "You might want to charge your phone if you want it to make through your next meeting." In some embodiments, primary device 610 delivers a low charge alert regardless of the current charge level (e.g., if the charge of primary device 610 is not expected to make it through the user's meetings for the day, even if the current charge is 50%).

FIGS. 9A-9B are a flow diagram illustrating a method for charging electronic devices in accordance with some embodiments. Method 900 is performed at a device (e.g., 100, 300, 500, or 610) with a display. Optionally, the device includes a touch-sensitive surface (e.g., a touch-sensitive display). Some operations in method 900 are, optionally, combined, the order of some operations is, optionally, changed, and some operations are, optionally, omitted.

As described below, method 900 provides an intuitive way for charging electronic devices. The method reduces the cognitive burden on a user for charging electronic devices, thereby creating a more efficient human-machine interface. For battery-operated computing devices, enabling a user to charge electronic devices faster and more efficiently improves the user experience, conserves power, and increases the time between battery charges.

At block 902, while the device is wirelessly charging and at a first charge level, the device receives a first user input (e.g., 850) representing a request for a charge level.

At block 904, in response to receiving the first user input, the device outputs a first non-visual indication (e.g., 800) of the first charge level of the device. Outputting a non-visual indication of the first charge level of the device provides the user with feedback that the device is charging and about the charge level of the device and reduces the number of inputs by providing charging information without the user having to view or activate the display or select another interface object. The benefits of providing improved feedback to the user and reducing the number of inputs needed to perform an operation are described above. Outputting a non-visual indication also improves the operability of the device by allowing the charge level of the device to be conveyed in a subtle or inconspicuous manner (e.g., without activating the display and illuminating the surrounding environment at night). The benefits of improving operation of the device are similar to those described above for providing improved feedback to the user and reducing the number of inputs needed to perform an operation.

At block 906, while the device is wirelessly charging at a second charge level different than the first charge level, the device receives a second user input (e.g., 851) representing a request for a charge level.

At block 908, in response to receiving the second user input, the device outputs a second non-visual indication (e.g., 802) of the second charge level of the device, where the second non-visual indication is different than the first non-visual indication. Here again, outputting a non-visual indication of the charge level of the device allows the device to provide the user with inconspicuous feedback that the device is charging and about the charge level of the device and reduces the number of inputs by providing charging information without the user having to view or activate the display or select another interface object. In addition, outputting a second non-visual indication that is different than the first non-visual indication provides the user with improved feedback by conveying information about the charge level of the device in not only the second output itself, but in the difference between the first output and second output. The difference in outputs can indicate the change in charge level between the first charge level and the second charge level. The benefits of these effects are described above.

In some embodiments, one or more of the first user input and the second user input is a transition of a wireless charging state of the device. In some embodiments, the transition of the wireless charging state is a transition from a state in which the device is not wirelessly charging to a state in which the device is wirelessly charging on a wireless charging device. In some embodiments, the transition of the wireless charging state is a transition from a state in which the device is wirelessly charging on a wireless charging device to a state in which the device is not wirelessly charging.

In some embodiments, one or more of the first user input and the second user input is a user input voice command.

In some embodiments, one or more of the first user input and the second user input is a touch input on a touch-sensitive surface (e.g., 612) of the device. In some embodiments, in accordance with a determination that the touch input is detected continuously for a threshold length of time, the device outputs a non-visual indication (e.g., 800) of the charge level of the device.

In some embodiments, outputting a non-visual indication of the charge level of the device includes providing a haptic output representative of the charge level of the device, where the haptic output has an output characteristic that depends on the charge level of the device. In some embodiments, the output characteristic is one or more of: a length of time of the haptic output, a number of discrete haptic pulses of the haptic output, and a frequency between discrete haptic pulses of the haptic output. In some embodiments, in response to the first user input, the device provides a first haptic output representative of the first charge level, where the first haptic output is provided for a first length of time; and in response to the second user input, the device provides a second haptic output representative of the second charge level, where the second haptic output is provided for a second length of time, the second user input is received subsequent to the first user input, and the second length of time is longer than the first length of time.

In some embodiments, in response to the first user input, the device provides a third haptic output representative of the first charge level, where the third haptic output includes a first plurality of discrete haptic pulses that are provided with a decaying frequency between pulses; and in response to the second user input, the device provides a fourth haptic output representative of the second charge level, where the fourth haptic output includes a second plurality of discrete haptic pulses that are provided with an increasing frequency between pulses and the second user input is received subsequent to the first user input.

In some embodiments, outputting a non-visual indication of the charge level of the device includes providing an audible output representative of the charge level, where the audible output has an output characteristic that depends on the charge level of the device. In some embodiments, the output characteristic is one or more of: a length of time of the audible output, a number of discrete audible signals of the audible output, a volume of the audible output, a modulation pattern, and a frequency of the audible output.

In some embodiments, in response to the first user input, providing a first audible output representative of the first charge level, wherein the first audible output is provided for a first length of time; and in response to the second user input, the device provides a second audible output representative of the second charge level, where the second audible output is provided for a second length of time, the second user input is received subsequent to the first user input, and the second length of time is longer than the first length of time. In some embodiments, in response to the first user input, the device provides a third audible output representative of the first charge level, where the third audible output includes an audio signal having a first characteristic frequency; and in response to the second user input, the device provides a fourth audible output representative of the second charge level, where the fourth audible output includes an audio signal having a second characteristic frequency, the second user input is received subsequent to the first user input, and the second characteristic frequency is higher than the first characteristic frequency.

Optionally, at block 910, while the device is wirelessly charging, the device receives a third user input (e.g., 852) representing a request for a charge level of a second device (e.g., 620), where the second device is wirelessly charging at a third charge level. Optionally, at block 912, in response to receiving the third user input, the device outputs a third non-visual indication (e.g., 804) of the third charge level of the second device. In some embodiments, the second device is wirelessly charging on the same wireless charging device (e.g., 600) as the first device. In some embodiments, the third user input is a transition of a wireless charging state of the second device. Outputting a non-visual indication of the charge level of the second device on the first device provides improved feedback to the user about the charge status of the second device by allowing charge status to be provided on a device that is better suited for providing charge status information, especially when the second device does not include means for providing non-visual (e.g., inconspicuous) output or has limited means for providing charge status. It also reduces the number of inputs needed to obtain the charge status of the second device by reducing or eliminating the need to provide a separate input at the second device to obtain the charge level of the second device. The benefits of providing improved feedback to the user and reducing the number of inputs required to perform an operation are described above.

Optionally, at block 914, while the device is wirelessly charging and at a fourth charge level, the device receives a fourth user input representing a transition of a wireless charging state of the device from a state in which the device is wirelessly charging on a wireless charging device to a state in which the device is not wirelessly charging. Optionally, at block 916, in response to receiving the fourth user input, the device estimates whether the fourth charge level is sufficient to provide the device with battery charge for a period of time before the charge level of the device reaches a depleted charge level. Optionally, at block 918, in accordance with an estimation that the fourth charge level is not sufficient, the device outputs a fourth non-visual indication (e.g., 806) of the fourth charge level of the device. Optionally, at block 920, in accordance with an estimation that the fourth charge level is sufficient, the device outputs a fifth non-visual indication of the fourth charge level of the device, where the fourth non-visual indication is different than the fifth non-visual indication. Providing a different output when the charge level of the device is deemed insufficient to last for the period of time compared to the output when the charge level of the device is determined to be sufficient provides improved feedback to the user by alerting the user that charging of the device is being stopped even though the charge of the device is relatively low and helps prevent the device from unexpectedly running out of charge. The alert gives the user the opportunity to take measures to make sure that the device does not run out of charge (e.g., to extend the battery life by setting the device to a low-power mode or to charge the device at another location). The benefits of providing improved user feedback are described above.

In some embodiments, estimating whether the fourth charge level is sufficient to provide the device with battery charge for a period of time before the charge level of the device reaches a depleted charge level includes determining the period of time based on calendar data associated with the device and determining whether the fourth charge level is sufficient to provide the device with battery charge until the end of the period of time before the charge level of the device reaches a depleted charge level. In some embodiments, the fourth non-visual indication of the fourth charge level of the device is an audible or haptic output indicating a low charge level of the device. In some embodiments, the fourth non-visual indication of the fourth charge level of the device is an audible voice output indicating a low charge level of the device.

Note that details of the processes described above with respect to method 900 (e.g., FIGS. 9A-9B) are also applicable in an analogous manner to the other methods described above with respect to method 700 (FIGS. 7A-7E). For example, method 700 optionally includes one or more of the characteristics of the various methods described above with reference to method 900.

The embodiments described herein set forth techniques for synchronizing information between one or more devices on a wireless charging device (which is also referred to as a "wireless charging apparatus"). According to some embodiments, the wireless charging apparatus can be configured to receive information from each computing device placed onto the wireless charging apparatus. This information can include, for example, a unique identifier (ID) associated with the computing device, one or more unique IDs of other computing devices known to the computing device (e.g., previously/actively paired computing devices, a set of a devices associated with each other or a common user account), and a battery status (also referred to as a "charge status") of the computing device. In this manner, as new computing devices are placed onto the wireless charging apparatus the wireless charging apparatus can reference the unique IDs to identify when at least two related computing devices are present. For example, when the wireless charging apparatus identifies that a first computing device and a second computing device are (1) placed on the wireless charging apparatus (e.g., are being wirelessly charged by the wireless charging apparatus, also referred to as each device being in a "wireless charging state"), and (2) related to one another, the wireless charging apparatus can cause the first computing device to display information about the second computing device on behalf of and/or in conjunction with information displayed by the second computing device.

Consider, for example, a scenario in which the first computing device is a smartphone device, and the second computing device is a smaller device that is related to the smartphone device (e.g., a smart watch device paired with the smartphone). In this scenario, when the smart watch device is placed onto the wireless charging apparatus (with the smartphone device already present), the wireless charging apparatus can (1) identify the relationship between the devices, and (2) notify the smartphone device of the presence/battery status of the smart watch device. In turn, the smartphone device can produce a notification associated with the battery status of the smart watch device, e.g., through one or more animations/sounds that provide a pleasant user experience. As mentioned above, the smart watch device can also be configured to produce a notification in conjunction with the notification produced by the smartphone device (e.g., a complementary notification). In particular, the smartphone device can be configured to indicate, to the wireless charging apparatus, a time delay that will be honored by the smartphone device prior to producing the notification associated with the battery status of the smart watch device. In turn, the wireless charging apparatus provides the time delay to the smart watch device. In this manner, the smart watch device can display, in accordance with the time delay, a notification that includes one or more animations/sounds that complement the animations/sounds included in the notification produced by the smartphone device.

Additionally, it is noted that the smartphone device and the smart watch device can periodically/responsively issue relevant updates to the wireless charging apparatus while they remain connected to the wireless charging apparatus. For example, the smartphone device can indicate to the wireless charging apparatus whether it is appropriate for the smartphone device to display a notification associated with the smart watch device. The appropriateness can be based on, for example, whether the smartphone device is locked/unlocked, in-use/not in-use, and so on. For example, when the smartphone device is in an unlocked state/in-use, the smartphone device can refuse to display any notifications associated with the smart watch device. In some examples, the smartphone device can display a notification (e.g., a popup or other visual indication) of the battery status of the smart watch device to keep a user informed. Additionally, each of the smartphone device and the smart watch device can provide battery status updates to the wireless charging apparatus as they are charged to enable a variety of useful features to be implemented. This can enable, for example, the smartphone device to display the latest battery status of the smart watch device when the smart watch device is removed from the wireless charging surface, thereby enhancing the user experience.

A more detailed discussion of these techniques is set forth below and described in conjunction with FIGS. 10 and 11A-11D, which illustrate detailed diagrams of systems and methods that can be used to implement these techniques.

Figure 10:
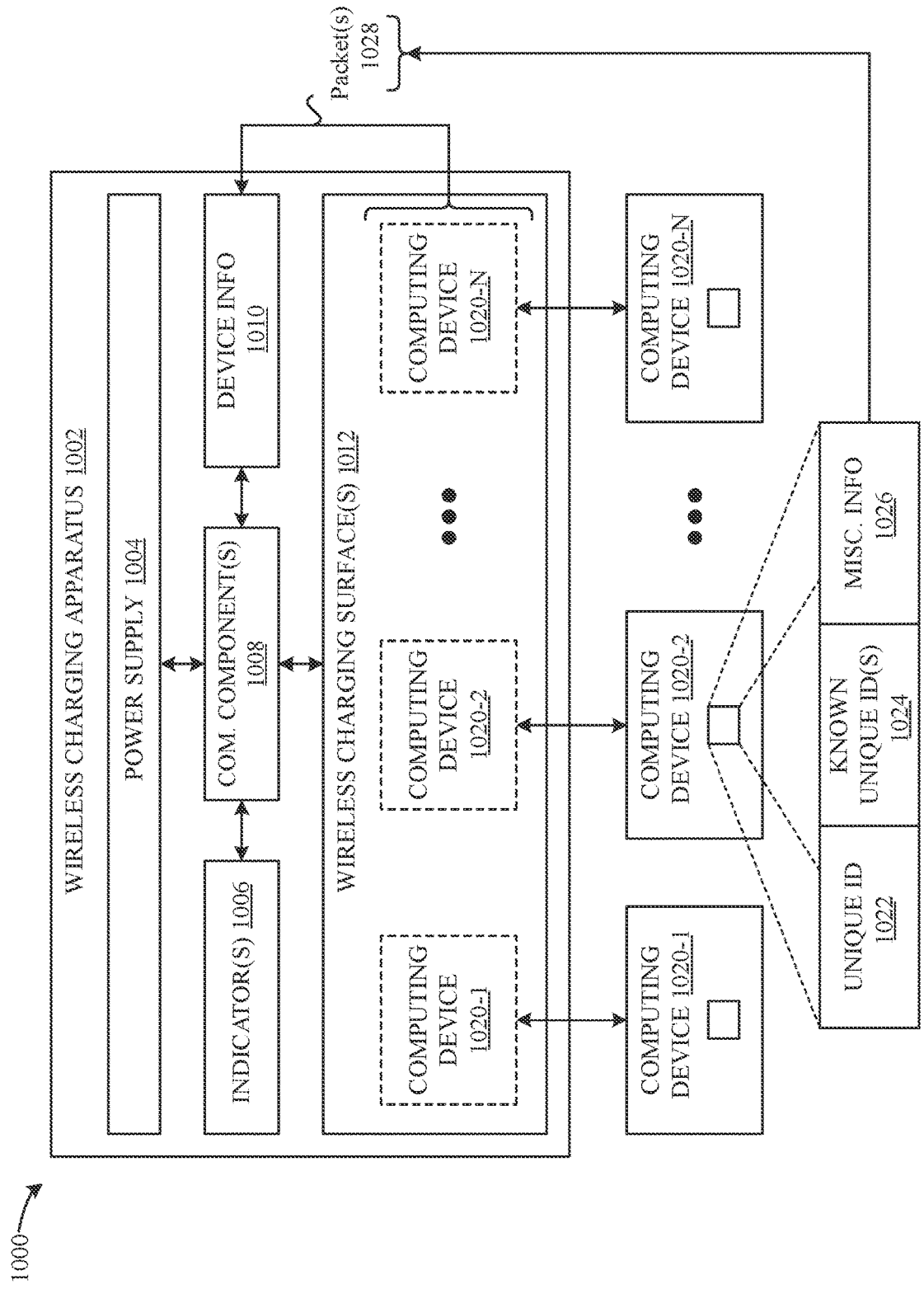
FIG. 10 is a block diagram of an exemplary wireless charging device in accordance with some embodiments.

FIG. 10 illustrates a block diagram 1000 of different computing devices that can be configured to implement various aspects of the techniques described herein, according to some embodiments. Specifically, FIG. 10 illustrates a high-level overview of a wireless charging apparatus 1002 that is configured to communicate with and provide an electrical charge to different computing devices 1020. Although not illustrated in FIG. 10, it is understood that the wireless charging apparatus 1002 (which is also referred to as device 1002) and the computing devices 1020 each can include at least one processor, at least one memory, and at least one storage device that collectively enable these devices to operate in accordance with this disclosure. For example, in a given device, instructions can be stored in the at least one storage device and loaded into the at least one memory for execution by the at least one processor to enable the techniques described herein to be implemented. In some embodiments, each of devices 1002 and 1020 include one or more features of devices 100, 300, or 500. In some embodiments, device 600 includes one or more features of devices 100, 300, 500, or 1002.

As shown in FIG. 10, the wireless charging apparatus 1002 can include a power supply 1004, one or more indicators 1006, a memory (not illustrated in FIG. 10) for storing device information 1010, one or more communications components 1008, and at least one wireless charging surface 1012. According to some embodiments, the wireless charging surface 1012 can implement any form of wireless (e.g., inductive) charging technology to enable one or more computing devices 1020 to receive a charge when placed in proximity to (e.g., directly onto, or otherwise within a functional range of the wireless charging technology of) the wireless charging surface 1012. For example, the wireless charging surface 1012 can implement Qi wireless charging technology, Power Matters Alliance (PMA) technology, or any other form of wireless charging technology. It is noted, however, that wireless charging techniques are not required to implement the techniques described herein. In some embodiments, the wireless charging surface 1012 can be replaced or supplemented by any component (e.g., a conductor-based charging component) that enables computing devices 1020 to receive a charge and communicate with the wireless charging apparatus 1002.

According to some embodiments, the indicators 1006 included in the wireless charging apparatus 1002 can include, for example, light emitting diodes (LEDs) that indicate a variety of information to an end-user of the wireless charging apparatus 1002. For example, the LEDs can indicate whether the power supply 1004 is receiving power from a power source, whether at least one computing device 1020 is properly connected to and being charged via the wireless charging surface 1012, and so on. According to some embodiments, the communications component 1008 can enable the wireless charging apparatus 1002 to transmit information to and receive information from the computing devices 1020 (e.g., via Bluetooth, Near Field Communication (NFC), WiFi, or any appropriate communication technology). According to some embodiments, computing devices 1020 communicate directly. For example, computing devices 1020-1 and 1020-2, if paired by Bluetooth, can exchange information related to battery status directly via their Bluetooth communication link. According to some embodiments, the above-described information can be transmitted between the wireless charging apparatus 1002 and the computing devices 1020 using "in-band" communications that coincide with any wireless charging technology implemented by the wireless charging apparatus 1002. For example, a data signal can be transmitted via the wireless charging technology medium (e.g., one or more communication signal pulses transmitted via an inductive coil). In this manner, pre-existing relationships—e.g., Bluetooth pairing, NFC pairing, WiFi pairing, or the like—are not required for the wireless charging apparatus 1002 to effectively communicate with the computing devices 1020. Moreover, implementing in-band communications can enable the wireless charging apparatus 1002 to communicate with a given computing device 1020 even when the computing device 1020 is operating in a minimal mode—e.g., airplane mode—where the primary communications components (e.g., cellular, Bluetooth, NFC, WiFi, etc.) within the computing device 1020 are disabled.

It is noted that the internal components of the wireless charging apparatus 1002 illustrated in FIG. 10 and described herein do not represent an exhaustive list of what can be included in the wireless charging apparatus 1002. In some embodiments, the wireless charging apparatus 1002 can include any number of components that contribute to or supplement the embodiments described herein. In some examples, the wireless charging apparatus 1002 can include display devices/speakers that can be used to inform end-users about information associated with the wireless charging apparatus 1002 and/or the computing devices 1020. In some examples, the wireless charging apparatus 1002 can include any form of input device to enable interactions with the wireless charging apparatus 1002 to take place, e.g., touch-screens, biometric sensors, buttons, dials, sliders, and so on. In some examples, the wireless charging apparatus 1002 can include any communication components (e.g., providing communication capability via technologies such as cellular, Bluetooth, NFC, WiFi, or the like) to enable the wireless charging apparatus 1002 to communicate with the computing devices 1020.

According to some embodiments, the device information 1010 can be used by the wireless charging apparatus 1002 to manage the flow of information between the computing devices 1020 in accordance with the techniques described herein. For example, when a computing device 1020 is placed onto the wireless charging apparatus 1002, the computing device 1020 can transmit, e.g., via the in-band or other communication techniques described herein, one or more packets 1028 that include relevant information to enable the techniques described herein to be effectively implemented. For example, as shown in FIG. 10, a packet 1028 transmitted by a computing device 1020 can include a unique identifier (ID) 1022 for the computing device 1020, one or more known unique IDs 1022 of other computing devices 1020 known to the computing device 1020, and miscellaneous information 1026 associated with the computing device 1020, the purposes of which are described below in greater detail.

According to some embodiments, the unique ID 1022 can take any form that enables the computing device 1020 to be uniquely identifiable. For example, the unique ID 1022 can be based on hardware/software properties (e.g., identifiers) associated with the computing device 1020. However, in some cases it can be desirable to separate the unique ID 1022 from properties of the computing device 1020, especially in the interest of preserving privacy. For example, the unique ID 1022 can be a randomly-generated string that is unrelated to the hardware/software properties of the computing device 1020. In this manner, nearby malicious devices attempting to snoop on information transmitted between the computing device 1020 and the wireless charging apparatus 1002 will only be able to gather innocuous data. Moreover, the embodiments described herein can involve periodically refreshing the unique IDs 1022 of the computing devices 1020 to further-thwart any malicious activity that may be attempted.

As described above, the packet(s) 1028 transmitted by the computing device 1020 can also include one or more known unique IDs 1024, which represent the unique IDs 1022 of other computing devices 1020 that are relevant to the computing device 1020. According to some embodiments, these other computing devices 1020 can represent devices with which the computing device 1020 is actively paired or previously paired, e.g., wearable devices, headphones, speakers, sensors, and so on, that can directly communicate with the computing device 1020 (e.g., via Bluetooth or NFC). In this manner, and as described in greater detail herein, the wireless charging apparatus 1002 can utilize the unique IDs 1022 and the known unique IDs 1024 provided by various computing devices 1020 to identify when interactions should take place between specific ones of the computing devices 1020.

Additionally, and as described above, the packet(s) 1028 transmitted by a computing device 1020 can include miscellaneous information 1026 about the computing device 1020 that can be utilized by the wireless charging apparatus 1002 to implement the techniques described herein. For example, the miscellaneous information 1026 can include an indication of a type of the computing device 1020, including model information associated with the computing device 1020 (e.g., a device name, model, color, display characteristics (e.g., size, dimensions, area), etc.), state information associated with the computing device 1020 (e.g., locked/unlocked), battery information associated with the computing device 1020, and so on.

Additionally, and although not illustrated in FIG. 10, it will be understood that the various computing devices 1020 described herein include hardware/software components that enable the computing devices 1020 to interface with the wireless charging apparatus 1002, which can include, for example, receiving energy (e.g., used to charge one or more batteries of the receiving device) from the wireless charging apparatus 1002 (e.g., via the wireless charging surface 1012), communicating with the wireless charging apparatus 1002, and so on. It will be further understood that the various computing devices 1020 can include hardware/software elements that enable the computing devices 1020 to implement the techniques described herein at varying levels. For example, computing devices 1020 having larger display devices (e.g., laptops, tablets, smartphones, etc.) can be designated as primary/high-priority devices that display information about known computing devices 1020 as they are placed onto/removed from the wireless charging apparatus 1002. Continuing with this example, computing devices 1020 having smaller displays (e.g., smart watches) can be designated as secondary/low priority devices that should only display information when the primary/high-priority devices are not present on the wireless charging apparatus 1002. For example, when only a smart watch computing device 1020 is present on the wireless charging apparatus 1002, and a pair of wireless headphones is placed onto the wireless charging apparatus 1002, the smart watch computing device 1020 can take on the responsibility of displaying information about the wireless headphones in conjunction with/on behalf of the wireless headphones. It is noted that the foregoing examples are not meant to be exhausting in any way, and that the computing devices 1020 described herein can be configured in any fashion to achieve different variations on the techniques described herein.

Accordingly, FIG. 10 sets forth an overview of different configurations of the wireless charging apparatus 1002/computing devices 1020 that can be utilized to enable the implementation of the embodiments described herein. As described in greater detail below, these components can be utilized to provide a rich user experience, for example, through synchronized/complementary notifications when two or more related computing devices 1020 are placed onto the wireless charging apparatus 1002 for charging.

Figure 11A:
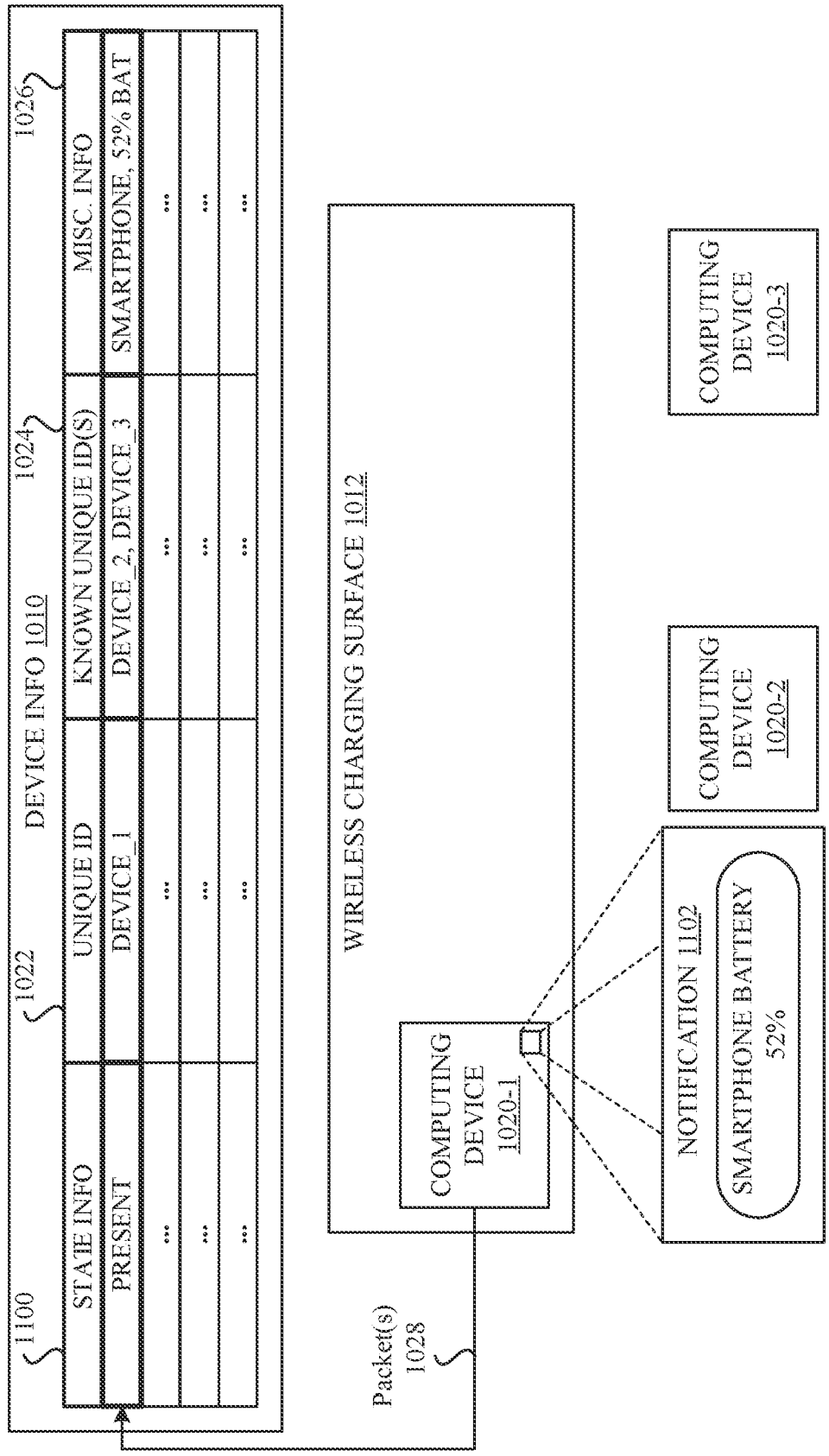
FIGS. 11A-11D illustrate exemplary scenarios for charging electronic devices in accordance with some embodiments.

FIGS. 11A-11D illustrate conceptual diagrams of example computing devices 1020 displaying complementary notifications in a synchronized manner as they are placed onto and removed from the wireless charging apparatus 1002, according to some embodiments. In some embodiments, fewer than all devices placed on or removed from a wireless charging apparatus provide a notification, in accordance with the techniques described herein (e.g., a primary device displays a charge status, and other device(s) do not provide a notification in response to placement/removal from the wireless charging apparatus). As shown in FIG. 11A, a first step 1110 can involve a computing device 1020-1 being placed onto the wireless charging apparatus 1002. This can represent, for example, when a user places the computing device 1020-1 onto the wireless charging apparatus 1002 with the intent to charge the computing device 1020-1 via the wireless charging techniques described herein. As shown in FIG. 11A, step 1110 can involve the computing device 1020-1 transmitting one or more packets 1028 to the wireless charging apparatus 1002. As previously described above, these packets 1028 can include information associated with the computing device 1020-1, e.g., a unique ID 1022, known unique IDs 1024, and miscellaneous information 1026.

As shown in FIG. 11A, example information transmitted by the packets 1028 is placed into the device information 1010 by the wireless charging apparatus 1002. For example, the value "DEVICE_1" can be assigned as the unique ID 1022, the values "DEVICE_2" and "DEVICE_3" can be assigned as the known unique IDs 1024, and the value "SMARTPHONE, 52% BAT" can be assigned as the miscellaneous information 1026. In this example, the computing device 1020-1 has an assigned unique ID 1022 of "DEVICE_1", where the computing device 1020-1 has been previously paired with two other computing devices 1020—a computing device 1020-2 having the unique ID 1022 "DEVICE_2", and a computing device 1020-3 having the unique ID 1022 "DEVICE_3". Moreover, in this example the computing device 1020-1 is a smartphone device whose battery level is at 52% when the computing device 1020-1 is placed onto the wireless charging apparatus 1002. Additionally, as shown in FIG. 11A, the wireless charging apparatus 1002 can assign, within the device information 1010 for the computing device 1020-1, a "STATE INFO" property 1100 that identifies whether the computing device 1020-1 is present on or absent from the wireless charging apparatus 1002. The "STATE INFO" property 1100 can also identify additional information about the computing device 1020-1, e.g., whether the computing device 1020-1 is assigned as a high-priority device/low-priority device for displaying complementary notifications associated with other related computing devices 1020 that are placed onto the wireless charging apparatus 1002 (as previously described above). As described in greater detail herein, the "STATE INFO" property 1100 can enable the wireless charging apparatus 1002 to appropriately respond to and instruct the other computing devices 1020-2 and 1020-3 when they are placed onto/removed from the wireless charging apparatus 1002. In some examples, "STATE INFO" is populated at least in part by information received from a computing device 1020 (e.g., via a received packet(s) 1028).

In the example illustrated in FIG. 11A, the computing device 1020-1 is the first and only computing device 1020 present on wireless charging apparatus 1002. In this regard, and according to some embodiments, the computing device 1020-1 can be responsible for displaying its own battery status, which is illustrated in FIG. 11A as the notification 1102. As shown in FIG. 11A, the notification 1102 can indicate, by way of one or more animations/sounds, (1) the type of the computing device 1020-1 (e.g., "SMART-PHONE"), and (2) the battery status for the computing device 1020-1. It is noted that the content associated with the notification 1102 illustrated in FIG. 11A is merely exemplary, and that any content, in any form, sequence, manner, etc., can be utilized when producing the notification 1102.

Figure 11B:
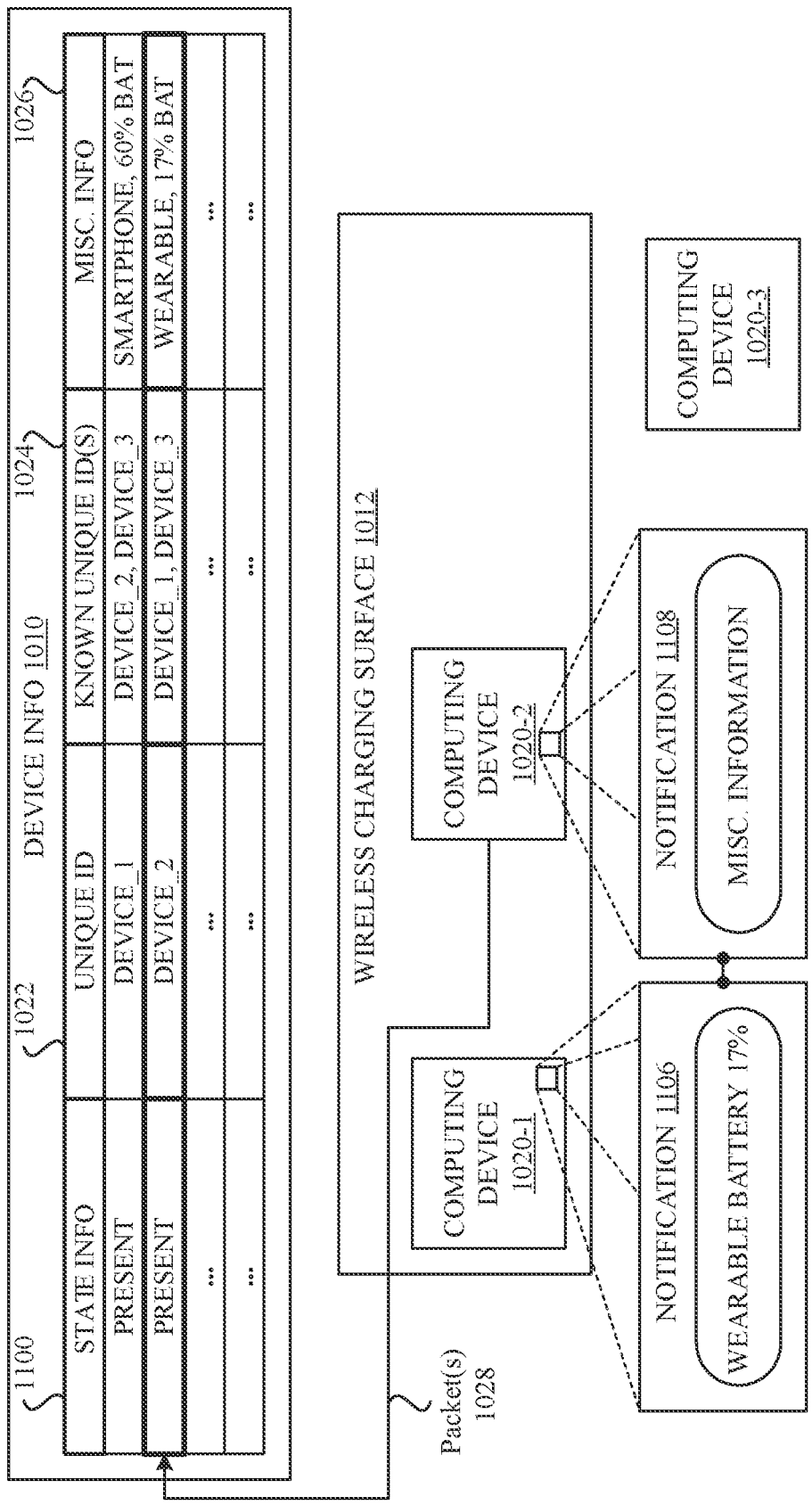

Accordingly, at the conclusion of the first step 1110 illustrated in FIG. 11A, the first computing device 1020-1 provides useful information via the notification 1102, and is receiving power from the wireless charging apparatus 1002 to charge any internal batteries included in the computing device 1020-1. At this point, the computing device 1020-1 can now function as a supplemental device for displaying complementary notifications associated with the computing devices 1020-2 and 1020-3 when they are placed onto the wireless charging apparatus 1002. For example, a second step 1120 illustrated in FIG. 11B can involve a second computing device, computing device 1020-2, being placed onto the wireless charging apparatus 1002. As shown in FIG. 11B, and in accordance with the techniques described herein, the computing device 1020-2 can provide, via one or more packets 1028, information about the computing device 1020-2 to the wireless charging apparatus 1002. For example, the computing device 1020-2 can provide the value "DEVICE_2" as the unique ID 1022, the values "DEVICE_1" and "DEVICE_3" as the known unique IDs 1024, and the value "WEARABLE, 17% BAT" as the miscellaneous information 1026. For example, in FIG. 11A, the computing device 1020-2 can represent a smart watch, a fitness tracker, an augmented reality device, a sensor, and so on.

As a brief aside, it is noted that each of the computing devices 1020 placed onto the wireless charging apparatus 1002 can periodically/responsively issue packets 1028 to provide relevant updates to the wireless charging apparatus 1002. For example, the device information 1010 can be updated to manage a status property for each computing device 1020 that indicates whether the computing device 1020 is capable of displaying a complementary notification. Again, this can be based on, for example, whether the computing device 1020 is locked/unlocked, in-use/not in-use, and so on. In another example, the device information 1010 can be updated to reflect the battery statuses of the computing devices 1020 as they are charged via the wireless charging apparatus 1002, e.g., as shown by the battery status of the computing device 1020-1 advancing from 52% to 60% between the times at which step 1110 of FIG. 11A and step 1120 of FIG. 11B occur. Notably, a variety of useful features can be implemented by keeping the battery statuses up-to-date within the device information 1010. For example, when a pair of headphones is removed from the wireless charging apparatus 1002, and an associated device having a display (e.g., a laptop, a tablet, a smartphone, a smart watch) remains on the wireless charging apparatus 1002, the associated device can display an indication of the latest battery status of the headphones. In this manner, a user who is removing the headphones from the wireless charging apparatus 1002 can promptly receive an easy-to-read indication (via the display of the associated device) of the battery status of the headphones, thereby enhancing the user experience. Accordingly, in some embodiments, a wireless charging apparatus (e.g., 1002) receives one or more packets transmitted by a computing device (e.g., 1020).

In some embodiments, a computing device (e.g., 1020) receives one or more packets transmitted by a wireless charging apparatus (e.g., 1002). For example, a smartphone device (e.g., device 1020-1 of FIG. 11B) can receive a packet 1028 that includes information regarding the battery status (e.g., battery charge level) of a wearable device (e.g., device 1020-2 of FIG. 11B). In this example, the smartphone device proceeds to display an indication of a battery status for itself and a battery status of the wearable device.

Additionally, by updating the device information, one or more of the computing devices 1020 can promptly display a summary of information about associated devices that are placed onto the wireless charging apparatus 1002. This can occur, for example, when a trigger occurs at a given computing device 1020, e.g., when a home/power button is pressed on the computing device 1020, when the computing device 1020 is moved while placed on the wireless charging apparatus 1002 (e.g., nudged by a user), when the computing device 1020 detects that a user is in proximity to the computing device 1020, and so on. For example, when a smartphone, a smart watch, and a pair of headphones are charging on the wireless charging apparatus 1002, the smartphone can be configured to display, in response to any of the aforementioned triggers, an up-to-date summary of its own battery status, the battery status of the smart watch, and the battery status of the headphones. According to some embodiments, the smartphone can also be configured to cause one or more of the smart watch/headphones to present information through the complementary notifications in a synchronous manner (or an asynchronous manner, if desired).

Returning back now to FIG. 11B, it is noted that, according to some embodiments, the computing devices 1002 and 1020 can be configured to omit known unique IDs 1024 from the packets 1028 any time they represent redundant information. Consider, for example, a first computing device 1020 that is paired only with a second computing device 1020 (and vice-versa). In this example, when the first computing device 1020 is placed onto the wireless charging apparatus 1002 and provides a known unique ID 1024 that corresponds to the unique ID 1022 of the second computing device, it would be redundant for the second computing device 1020 to provide a known unique ID 1024 that corresponds to the unique ID 1022 of the first computing device 1020. Instead, the wireless charging apparatus 1002 can readily identify the relationship by comparing the unique ID 1022 of the second computing device 1020 against the known unique IDs 1024 of the first computing device 1020 (managed within the device information 1010) to identify the relationship, and carry out the same techniques described herein in accordance with the identification of the relationship.

In any case, when the information associated with the computing device 1020-2 is incorporated into the device information 1010, the wireless charging apparatus 1002 can identify that the computing device 1020-1 and the computing device 1020-2 are relevant to one another (e.g., are in a paired relationship, or associated with a set of devices or a common user account). In turn, the wireless charging apparatus 1002 can query the computing device 1020-1 (e.g., via one or more packets 1028) to identify whether the computing device 1020-1 is willing (e.g., available or able to) to display a notification 1106 in association with the computing device 1020-2. According to some embodiments, the query can include the miscellaneous information 1026 provided by the computing device 1020-2 to minimize the number of messages transmitted between the computing device 1020-1, the wireless charging apparatus 1002, and the computing device 1020-2, thereby reducing overall latency and improving the overall user experience. In particular, this approach will enable the computing device 1020-1 to be in possession of the necessary information to display within the notification 1106 should the computing device 1020-1 accept the responsibility to do so. For example, the computing device 1020-1 can indicate an acceptance to display the notification 1106 when the computing device 1020-1 remains on the wireless charging apparatus 1002 and is in a locked and/or inactive state. Alternatively, the computing device 1020-1 can indicate a refusal to display the notification 1106 when the computing device 1020-1 is in an unlocked state and/or is being actively utilized by a user.

In the example illustrated in FIG. 11B, the computing device 1020-1 indicates, to the wireless charging apparatus 1002, an acceptance to display the notification 1106 in association with the computing device 1020-2 being placed onto the wireless charging apparatus 1002. According to some embodiments, the computing device 1020-1 can indicate the acceptance by transmitting one or more packets 1028 to the wireless charging apparatus 1002. According to some embodiments, the packets 1028 can indicate a time delay by which the computing device 1020-1 plans on displaying the notification 1106. In this manner, the wireless charging apparatus 1002 can forward the time delay to the computing device 1020-2, where the time delay also indirectly indicates to the computing device 1020-2 an acceptance by the computing device 1020-1 to display the notification 1106. Optionally, the computing device 1020-2 can prepare to display a complementary notification 1108 (e.g., a notification complementary to a notification by a primary device) in accordance with the time delay provided by the computing device 1020-1.

As shown in FIG. 11B, the notification 1106 is displayed by the computing device 1020-1 when the time delay is satisfied, and can indicate information about the computing device 1020-2 through one or more animations/sounds. For example, the animations/sounds can communicate the status of "WEARABLE BATTERY 17%". Moreover, in accordance with the satisfaction of the time delay, and in conjunction with the notification 1106, the notification 1108 produced by the computing device 1020-2 can include miscellaneous information presented through one or more animations/sounds, e.g., when the computing device 1020-2 includes a display device (e.g., a smart watch). In another example, when the computing device 1020-2 does not include a display device, but includes one or more LEDs, the LED(s) can be utilized to communicate information to a user, e.g., pulsating animations that coincide with the animations/sounds displayed by the computing device 1020-1. In another example, the LED(s) can display a solid light in a first color (e.g., orange) that indicates that the computing device 1020-2 is being charged, a solid light in a second color (e.g., green) that indicates that the computing device 1020-2 is fully charged, and so on. In any case, the user experience can be enhanced as useful information about the computing device 1020-2 is displayed in an aesthetically-pleasing manner between the computing device 1020-1 and the computing device 1020-2 even when the computing device 1020-2 includes only a small display device or no display device at all.

Figure 11C:
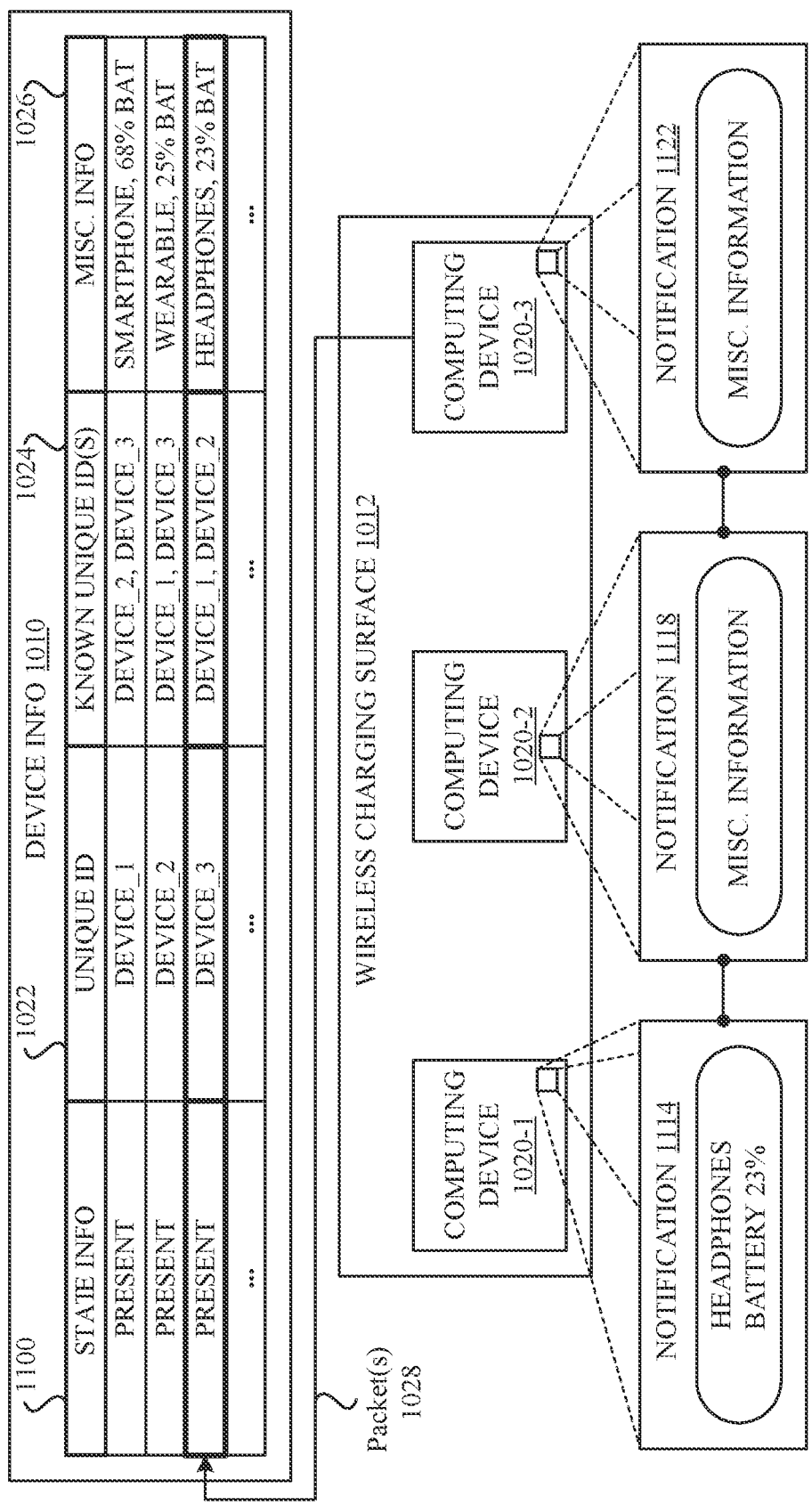

As described herein, computing devices 1020 will regularly be placed onto the wireless charging apparatus 1002 under expected use-case environments. To capture how the embodiments described herein manage such events, FIG. 11C illustrates a third step 1130 in which a third computing device 1020-3 is placed onto the wireless charging apparatus 1002 (while the computing device 1020-1 and the computing device 1020-2 remain on the wireless charging apparatus 1002). As shown in FIG. 11C, and in accordance with the techniques described herein, the computing device 1020-3 can provide, via one or more packets 1028, information about the computing device 1020-3 to the wireless charging apparatus 1002. For example, the computing device 1020-3 can provide the value "DEVICE_3" as the unique ID 1022, the values "DEVICE_1" and "DEVICE_2" as the known unique IDs 1024, and the value "HEADPHONES, 23% BAT" as the miscellaneous information 1026. For example, in FIG. 11C, the computing device 1020-3 can represent a pair of wireless headphones associated with both the computing device 1020-1 and the computing device 1020-2.

As shown in FIG. 11C, and as previously described above, the wireless charging apparatus 1002 can receive the packets 1028 and add the information about the computing device 1020-3 to the device information 1010. In turn, the wireless charging apparatus 1002 can identify that the computing device 1020-1 and the computing device 1020-2 are known to the computing device 1020-3, and issue messages (e.g., via packets 1028) that include information about the computing device 1020-3. Again, such information can include a type of the computing device 1020-3, a battery status of the computing device 1020-3, and so on. In turn, the computing device 1020-1 and the computing device 1020-2 can indicate whether they are willing (as described herein) to display a notification in association with the appearance of the computing device 1020-3. According to some embodiments, when two or more computing devices 1020 are involved in displaying a notification, a primary computing device (e.g., the computing device 1020-1) can indicate a time delay by which the notification should be displayed, where the other computing devices 1020 act in accordance with the time delay.

For example, in FIG. 11C, the computing device 1020-1 can indicate, to the wireless charging apparatus 1002, a time delay at which a notification 1114 will be displayed at the computing device 1020-1. In turn, the wireless charging apparatus 1002 can provide the time delay to both the computing device 1020-2 and the computing device 1020-3, whereupon the computing device 1020-2 and the computing device 1020-3 can prepare to display notifications 1118 and 1122, respectively. As shown in FIG. 11C, the notification 1114 displayed by the computing device 1020-1 can present the information "HEADPHONES BATTERY 23%" by way of one or more animations/sounds. Additionally, the notification 1118 produced by the computing device 1020-2 can communicate miscellaneous information about the computing device 1020-3 by way of one or more animations/sounds. For example, continuing with the example scenario described above in which the computing device 1020-2 represents a smart watch, the computing device 1020-2 can display miscellaneous information in conjunction with the notification 1114 displayed by the computing device 1020-1. Additionally, in this example scenario, the notification 1122 produced by the computing device 1020-3 can be optional, and can be used communicate miscellaneous information by way of one or more animations/sounds in accordance with the time delay and one or more of the notification 1114 and the notification 1118. For example, the computing device 1020-3—which, within FIG. 11C, can represent a pair of wireless headphones—can include an LED that operates in conjunction with the animations/sounds. In another example, one or more of the speakers included in the pair of wireless headphones can be used to play an audible sound that operates in conjunction with the animations/sounds.

Figure 11D:
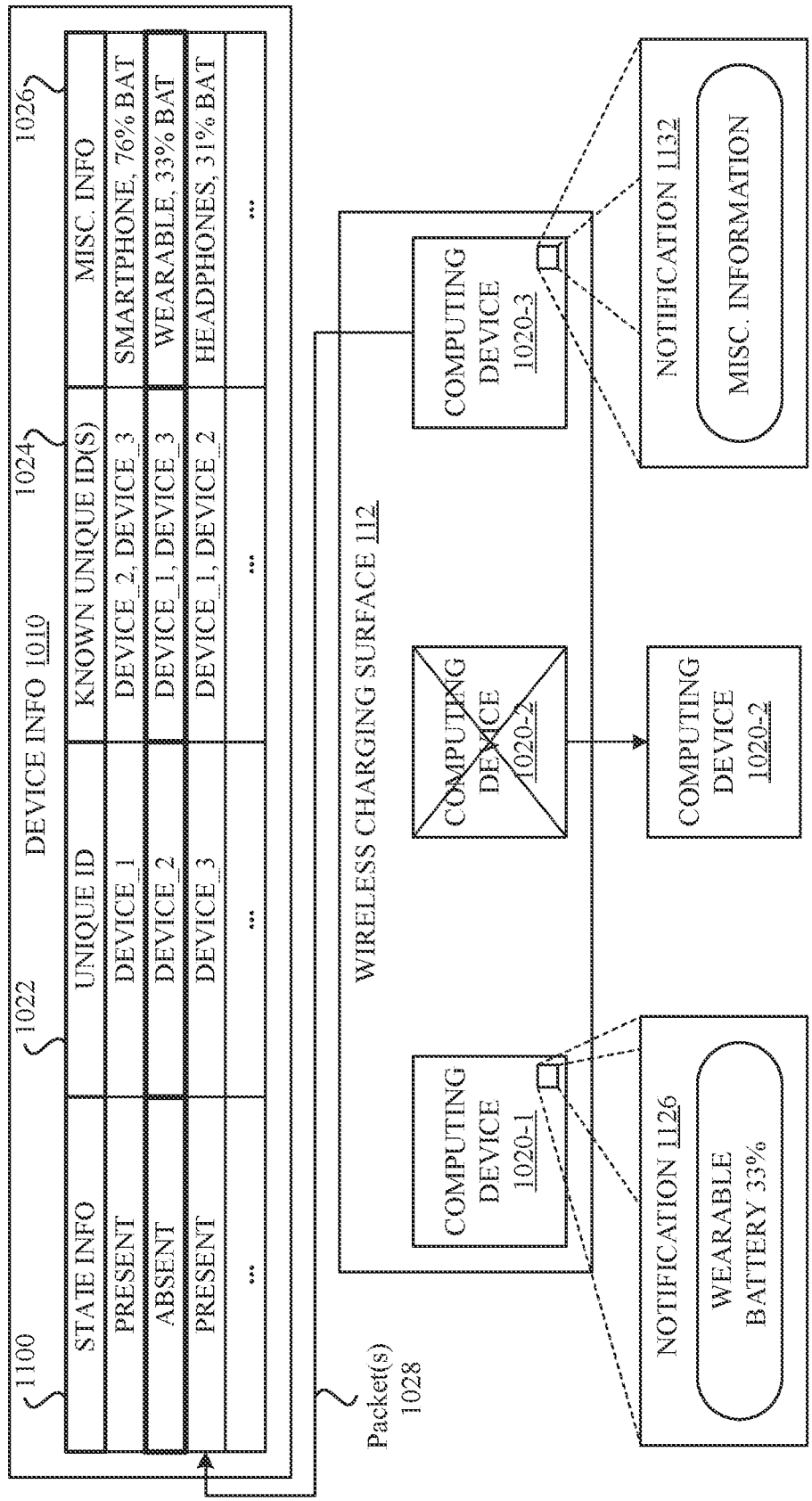

Additionally, it is noted that computing devices 1020 will regularly be removed from the wireless charging apparatus 1002 under expected use-case scenarios. To capture how the embodiments described herein manage such events, FIG. 11D illustrates a fourth step 1140 in which the computing device 1020-2 is removed from the wireless charging apparatus 1002 (device 1020-2 is shown marked out with an "X", while the computing device 1020-1 and the computing device 1020-3 remain on the wireless charging apparatus 1002). As shown in FIG. 11D, and in accordance with the techniques described herein, the device information 1010 can be updated to reflect that the computing device 1020-2 is now absent from the wireless charging apparatus 1002. In turn, the wireless charging apparatus 1002 can be configured to notify the related computing devices 1020—e.g., the computing device 1020-1 and the computing device 1020-3—that the computing device 1020-2 is no longer present. At this point, the computing device 1020-1 can optionally display (e.g., if locked/in use, as described herein) a notification 1126 that, for example, provides the up-to-date battery status of the computing device 1020-2 by way of one or more animations/sounds. Additionally, the computing device 1020-3 can optionally display a notification 1132 that provides miscellaneous information (as previously described herein) about the computing device 1020-2 by way of one or more animations/sounds.

Accordingly, FIGS. 11A-11D illustrate scenarios in which computing devices 1020 can provide information and notifications in accordance with (1) their placement onto/removal from the wireless charging apparatus 1002, and (2) the presence of other known computing devices 1020. One or more features described above with respect to FIGS. 10 and 11A-11D can be used to perform the techniques described with respect to FIGS. 6A-6AG, 7A-7E, 8A-8E, and 9A-9B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A first device, comprising:
    a display;
    one or more processors; and
    memory storing one or more programs configured to be executed by the one or more processors, the one or more programs including instructions for:
        while the first device and a second device are charging, displaying, on the display, a battery status indicator indicating a battery level of the first device without displaying a battery status indicator indicating a battery level of the second device different from the first device;

while the first device and the second device are charging and while the battery status indicator indicating the battery level of the first device is displayed without displaying the battery status indicator indicating the battery level of the second device different from the first device, detecting a first user input;

in response to detecting the first user input, concurrently displaying a first visual indicator of the battery level of the first device and a second visual indicator of the battery level of the second device different from the first visual indicator;

while concurrently displaying the first visual indicator of the battery level of the first device and the second visual indicator of the battery level of the second device, detecting that the second device is no longer in a charging state; and subsequent to detecting that the second device is no longer in the charging state, continuing to display the first visual indicator of the battery level of the first device concurrently with the second visual indicator of the battery level of the second device.

2. The first device of claim 1, the one or more programs further including instructions for:

while concurrently displaying the first visual indicator of the battery level of the first device and the second visual indicator of the battery level of the second device, ceasing to detect communication between the first device and the second device; and subsequent to ceasing to detect communication between the first device and the second device, ceasing to display the second visual indicator of the battery level of the second device while continuing to display the first visual indicator of the battery level of the first device.

3. The first device of claim 1, the one or more programs further including instructions for:

while concurrently displaying the first visual indicator of the battery level of the first device and the second visual indicator of the battery level of the second device, ceasing to detect communication between the first device and the second device; and in response to ceasing to detect communication between the first device and the second device, ceasing to display the second visual indicator of the battery level of the second device while continuing to display the first visual indicator of the battery level of the first device.

4. The first device of claim 1, wherein concurrently displaying the first visual indicator of the battery level of the first device and the second visual indicator of the battery level of the second device different from the first visual indicator further includes:

in accordance with a determination that the first device is in a charging state, concurrently displaying the first visual indicator with a first charging status indicator; and in accordance with a determination that the second device is in a charging state, concurrently displaying the second visual indicator with a second charging status indicator.

5. The first device of claim 1, wherein the first visual indicator and the second visual indicator include at least one of a graphical indicator and a textual indicator.

6. The first device of claim 1, the one or more programs further including instructions for:

while displaying the first visual indicator of the battery level of the first device and the second visual indicator of the battery level of the second device different from the first visual indicator:

detecting a third device in communication with the first device; and in response to detecting the third device, displaying a third visual indicator of the battery level of the third device, wherein the third visual indicator is different from the first visual indicator and the second visual indicator.

7. The first device of claim 1, the one or more programs further including instructions for:

in accordance with a determination that the first device is in a first state, displaying the first visual indicator in a first manner; and in accordance with a determination that the first device is in a second state, displaying the first visual indicator in a second manner different from the first manner.

8. The first device of claim 7, wherein the first state is a low battery state and the second state is a full battery state.

9. A non-transitory computer-readable storage medium storing one or more programs configured to be executed by one or more processors of a first device with a display, the one or more programs including instructions for:

while the first device and a second device are charging, displaying, on the display, a battery status indicator indicating a battery level of the first device without displaying a battery status indicator indicating a battery level of the second device different from the first device;

while the first device and the second device are charging and while the battery status indicator indicating the battery level of the first device is displayed without displaying the battery status indicator indicating the battery level of the second device different from the first device, detecting a first user input;

in response to detecting the first user input, concurrently displaying a first visual indicator of the battery level of the first device and a second visual indicator of the battery level of the second device different from the first visual indicator;

while concurrently displaying the first visual indicator of the battery level of the first device and the second visual indicator of the battery level of the second device, detecting that the second device is no longer in a charging state; and subsequent to detecting that the second device is no longer in the charging state, continuing to display the first visual indicator of the battery level of the first device concurrently with the second visual indicator of the battery level of the second device.

10. The non-transitory computer-readable storage medium of claim 9, the one or more programs further including instructions for:

while concurrently displaying the first visual indicator of the battery level of the first device and the second visual indicator of the battery level of the second device, ceasing to detect communication between the first device and the second device; and subsequent to ceasing to detect communication between the first device and the second device, ceasing to display the second visual indicator of the battery level of the second device while continuing to display the first visual indicator of the battery level of the first device.

11. The non-transitory computer-readable storage medium of claim 9, wherein the one or more programs further including instructions for:
    while concurrently displaying the first visual indicator of the battery level of the first device and the second visual indicator of the battery level of the second device, ceasing to detect communication between the first device and the second device; and
    in response to ceasing to detect communication between the first device and the second device, ceasing to display the second visual indicator of the battery level of the second device while continuing to display the first visual indicator of the battery level of the first device.

12. The non-transitory computer-readable storage medium of claim 9, wherein concurrently displaying the first visual indicator of the battery level of the first device and the second visual indicator of the battery level of the second device different from the first visual indicator further includes:
    in accordance with a determination that the first device is in a charging state, concurrently displaying the first visual indicator with a first charging status indicator; and
    in accordance with a determination that the second device is in a charging state, concurrently displaying the second visual indicator with a second charging status indicator.

13. The non-transitory computer-readable storage medium of claim 9, wherein the first visual indicator and the second visual indicator include at least one of a graphical indicator and a textual indicator.

14. The non-transitory computer-readable storage medium of claim 9, the one or more programs further including instructions for:
    while displaying the first visual indicator of the battery level of the first device and the second visual indicator of the battery level of the second device different from the first visual indicator:
        detecting a third device in communication with the first device; and
        in response to detecting the third device, displaying a third visual indicator of the battery level of the third device, wherein the third visual indicator is different from the first visual indicator and the second visual indicator.

15. The non-transitory computer-readable storage medium of claim 9, the one or more programs further including instructions for:
    in accordance with a determination that the first device is in a first state, displaying the first visual indicator in a first manner; and
    in accordance with a determination that the first device is in a second state, displaying the first visual indicator in a second manner different from the first manner.

16. The non-transitory computer-readable storage medium of claim 15, wherein the first state is a low battery state and the second state is a full battery state.

17. A computer-implemented method, comprising:
    at a first device with a display:
        while the first device and a second device are charging, displaying, on the display, a battery status indicator indicating a battery level of the first device without displaying a battery status indicator indicating a battery level of the second device different from the first device;
        while the first device and the second device are charging and while the battery status indicator indicating the battery level of the first device is displayed without displaying the battery status indicator indicating the battery level of the second device different from the first device, detecting a first user input;
        in response to detecting the first user input, concurrently displaying a first visual indicator of the battery level of the first device and a second visual indicator of the battery level of the second device different from the first visual indicator;
        while concurrently displaying the first visual indicator of the battery level of the first device and the second visual indicator of the battery level of the second device, detecting that the second device is no longer in a charging state; and
        subsequent to detecting that the second device is no longer in the charging state, continuing to display the first visual indicator of the battery level of the first device concurrently with the second visual indicator of the battery level of the second device.

18. The method of claim 17, the method further comprising:
    while concurrently displaying the first visual indicator of the battery level of the first device and the second visual indicator of the battery level of the second device, ceasing to detect communication between the first device and the second device; and
    subsequent to ceasing to detect communication between the first device and the second device, ceasing to display the second visual indicator of the battery level of the second device while continuing to display the first visual indicator of the battery level of the first device.

19. The method of claim 17, the method further comprising:
    while concurrently displaying the first visual indicator of the battery level of the first device and the second visual indicator of the battery level of the second device, ceasing to detect communication between the first device and the second device; and
    in response to ceasing to detect communication between the first device and the second device, ceasing to display the second visual indicator of the battery level of the second device while continuing to display the first visual indicator of the battery level of the first device.

20. The method of claim 17, wherein concurrently displaying the first visual indicator of the battery level of the first device and the second visual indicator of the battery level of the second device different from the first visual indicator further includes:
    in accordance with a determination that the first device is in a charging state, concurrently displaying the first visual indicator with a first charging status indicator; and
    in accordance with a determination that the second device is in a charging state, concurrently displaying the second visual indicator with a second charging status indicator.

21. The method of claim 17, wherein the first visual indicator and the second visual indicator include at least one of a graphical indicator and a textual indicator.

22. The method of claim 17, the method further comprising:
while displaying the first visual indicator of the battery level of the first device and the second visual indicator of the battery level of the second device different from the first visual indicator:
detecting a third device in communication with the first device; and
in response to detecting the third device, displaying a third visual indicator of the battery level of the third device, wherein the third visual indicator is different from the first visual indicator and the second visual indicator.

23. The method of claim 17, the method further comprising:
in accordance with a determination that the first device is in a first state, displaying the first visual indicator in a first manner; and
in accordance with a determination that the first device is in a second state, displaying the first visual indicator in a second manner different from the first manner.

24. The method of claim 23, wherein the first state is a low battery state and the second state is a full battery state.

* * * * *